US005751687A

United States Patent [19]
Ariyoshi et al.

[11] Patent Number: 5,751,687
[45] Date of Patent: May 12, 1998

[54] DISK LOADING APPARATUS

[75] Inventors: Yuji Ariyoshi, Toyonaka; Asayuki Matsumura, Katano, both of Japan

[73] Assignee: Matsushita Electric Industrial Co., Ltd., Osaka-fu, Japan

[21] Appl. No.: 682,205

[22] Filed: Jul. 17, 1996

[30] Foreign Application Priority Data

Jul. 21, 1995 [JP] Japan .................................. 7-185976
Oct. 23, 1995 [JP] Japan .................................. 7-299074

[51] Int. Cl.$^6$ .................................. G11B 17/08
[52] U.S. Cl. .................................. 369/202; 369/36; 369/178; 360/92
[58] Field of Search .................................. 369/34, 36, 38, 369/178, 191, 192, 202, 204; 360/92

[56] References Cited

U.S. PATENT DOCUMENTS

| | | | |
|---|---|---|---|
| 3,477,726 | 11/1969 | Laschenski | 360/92 |
| 3,603,597 | 9/1971 | Haake | 360/92 |
| 3,620,385 | 11/1971 | Emmasingel et al. | 360/92 |
| 3,805,970 | 4/1974 | Eash | 360/92 |
| 3,883,895 | 5/1975 | Kawaharasaki | 360/92 |
| 4,023,207 | 5/1977 | Cook | 360/92 |
| 5,119,354 | 6/1992 | Umesaki | 369/36 |
| 5,386,403 | 1/1995 | Morioka et al. | 369/37 |
| 5,524,002 | 6/1996 | Morita et al. | 369/191 |

FOREIGN PATENT DOCUMENTS 66536  7/1940  Czechoslovakia .................. 369/202

*Primary Examiner*—Stuart S. Levy
*Assistant Examiner*—William J. Klimowicz
*Attorney, Agent, or Firm*—Panitch Schwarze Jacobs & Nadel, P.C.

[57] ABSTRACT

In a disk loading apparatus of the present invention, a tray storage section for storing in a stacked manner a plurality of trays on which a tray is to be placed is disposed in the front side of the apparatus, and a reproduction device is disposed in the back side of the disk loading apparatus. A tray at the lowest position among the trays stacked in the tray storage section is transferred to a reproduction position by a tray driving mechanism which is operated by a single driving source. A disk which has been reproduced is returned onto a tray at the highest position in the tray storage section so that the stacked trays are sequentially circulated between the tray storage section and the reproduction device.

15 Claims, 51 Drawing Sheets

STATE A

STATE B

STATE C

STATE D

STATE E

STATE F

STATE G

FIG. 31
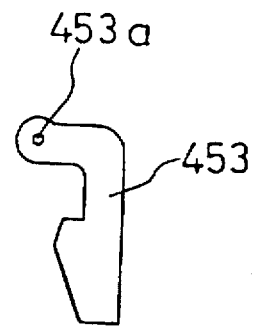
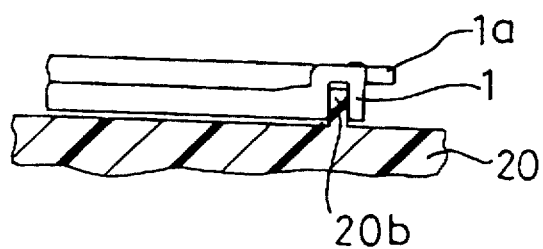
FIG. 32
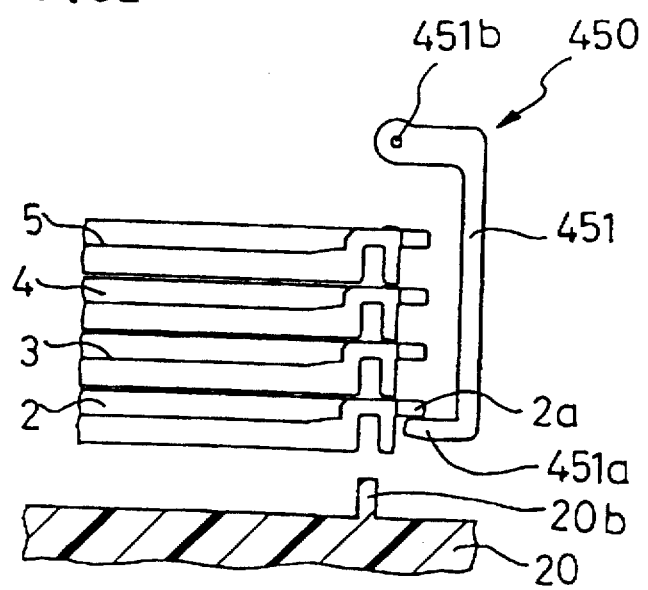

DISK LOADING APPARATUS

FIELD OF THE INVENTION AND RELATED ART STATEMENT

1. Field of the Invention

The present invention relates to a disk loading apparatus which can house a plurality of disks and reproduce the housed disks sequentially and selectively.

2. Description of the Related Art

Recently, various kinds of disk loading apparatuses which can house a plurality of disks and reproduce the disks sequentially or selectively have been developed. In some of such disk loading apparatuses of the prior art, such a rotary tray system is used that a plurality of disks are placed on the same plane of a single rotary tray and a desired disk is transferred to a reproduction position by rotating the rotary tray. In other disk loading apparatuses of the prior art, a stationary stock system is employed in which a plurality of disks are respectively housed at predetermined positions and a selected disk is transferred to a reproduction position for each reproduction. As an example of the former system or the rotary tray system, a disk loading apparatus is disclosed in, for example, U.S. Pat. No. 5,386,403. In the disclosed disk loading apparatus, five disks are placed on one rotary tray being arranged along the same circumference about the shaft of the rotary tray.

As an example of the latter system or the stationary stock system, a disk loading apparatus which is to be mounted on an automobile is disclosed in, for example, U.S. Pat. No. 5,119,354. The disk loading apparatus comprises a stationary stocker in which a plurality of disks are housed in a stacked manner, and a disk drive unit which can be moved in the direction of stacking the disks. In the disk loading apparatus, the disk drive unit is moved to a position where a selected disk is housed and takes out the selected disk from the stationary stocker, and the taken-out disk is transferred to a reproduction position to be reproduced.

Among such disk loading apparatuses of the prior art, an apparatus of the rotary tray system has a configuration in which a plurality of disks are placed on one rotary tray and hence requires a large rotary tray, thereby producing a problem such that the size of the apparatus is large.

In the stationary stock system, given disks must be housed at predetermined ones of plural trays. In order to move the housed disks to the reproduction position, therefore, the moving operations in handling of the disks must be conducted in different manners, respectively. This produces a problem such that the apparatus becomes complex in mechanism and the size of the apparatus is large.

OBJECT AND SUMMARY OF THE INVENTION

The present invention has been conducted in order to solve the above-discussed problems. It is an object of the present invention to provide a disk loading apparatus which is small and which can reproduce sequentially and selectively disks on stacked trays by a simple operation.

In order to achieve the object, the disk loading apparatus of the present invention comprises:

a plurality of trays on which a disk is to be placed;

a frame having storage means for supporting the trays in a stacked manner;

reproducing means for reproducing disks placed on the trays, at a reproduction position;

tray ejecting means for ejecting the trays to an outside of the frame; and tray driving means for, in the frame, moving a tray at a lowest position among the trays which are supported in a stacked manner by the storage means, to the reproduction position, and sequentially returning the tray from the reproduction position onto a tray at a highest position among the stacked trays in the storage means, thereby circulating the stacked trays.

In the disk loading apparatus of the present invention, a tray circulation system is employed in which a plurality of trays on which a disk is to be placed are housed in a stacked manner in a tray storage section, the trays are sequentially taken out from the lowest position to be set to enter a reproduction state, and the trays are then returned onto the tray at the highest position. As a result, the miniaturization of the apparatus can be accomplished, and the operations of taking out and returning the trays in the storage section can be simplified so that the reliability of the apparatus is enhanced.

In the disk loading apparatus of the present invention, the operations of circulating and ejecting the trays are conducted by a single driving source. Therefore, the circuit configuration can be simplified and the apparatus can be lightened.

In the disk loading apparatus of the present invention, a reproduction device is configured so as to be vertically driven to a reproduction waiting position, the reproduction position, and a tray return waiting position, by tray elevating means of a simple configuration. Therefore, the movement of the trays can be simplified so that the tray driving mechanism of the apparatus has a simple configuration.

In the disk loading apparatus of the present invention, when a disk at the reproduction position is to be moved to the tray ejection position by the single tray driving means, the disk is moved to an open region with passing through the tray storage position. Therefore, the time period required for ejecting a disk at the reproduction position can be largely shortened.

In order to achieve the object, the disk loading apparatus of the present invention comprises:

a plurality of trays on which a disk is to be placed;

reproducing means for reproducing disks placed on the trays, at a reproduction position;

a frame which houses the reproducing means and the stacked trays;

tray ejecting means for ejecting the trays to an outside of the frame;

tray driving means for, in the frame, sequentially returning a tray at a lowest position among the stacked trays from the reproduction position onto a tray at a highest position among the stacked trays, thereby circulating the stacked trays; and storage means for, in the frame, engaging with a tray at the lowest position among the stacked trays and supporting the tray at a predetermined position, canceling the engagement with the tray at the lowest position among the stacked trays and placing the stacked trays on the tray ejecting means, with interlocking with the circulating operation of the tray driving means and during the movement of the tray from the reproduction position to a tray return waiting position, and engaging with a tray at a second lowest position among the stacked trays and supporting this tray in a stacked manner.

In the disk loading apparatus of the present invention, a plurality of trays are caused by a hook portion to be surely housed in a stacked manner in a tray storage section, the engagement of the hook portion and the trays in the tray storage section is once canceled by the tray moving operation which is conducted in the tray circulating operation and after a reproduction state, only the tray at the lowest position in the tray storage section is placed at a predetermined position on a tray ejection frame, and the remaining trays are again surely held in the tray storage section in a stacked manner. Therefore, an apparatus of high reliability can be obtained.

In addition to the effects described above, the disk loading apparatus of the present invention can attain an effect that, when a tray on the tray ejection frame passes directly below the tray storage section, the tray can be moved smoothly and quietly without making any contact with the trays stacked in the tray storage section. Therefore, the disk loading apparatus of the present invention is a superior sound apparatus in which a collision noise which may be produced during the movement of a tray is prevented from being produced.

In other aspect of the present invention, the disk loading apparatus of the present invention comprises:

a plurality of trays on which a disk is to be placed;
reproducing means for reproducing disks placed on the trays, at a reproduction position;
a frame which houses the reproducing means and the stacked trays;
tray ejecting means having a tray ejection frame which ejects the trays to an outside of the frame;
tray driving means for, in the frame, sequentially returning a tray at a lowest position among the stacked trays from the reproduction position onto a tray at a highest position among the stacked trays, thereby circulating the stacked trays;
storage means for, in the frame, engaging with a tray at the lowest position among the stacked trays and supporting the tray at a predetermined position, canceling the engagement with the tray at the lowest position among the stacked trays and placing the stacked trays on the tray ejecting means, with interlocking with the circulating operation of the tray driving means and during the movement of the tray from the reproduction position to a tray return waiting position, and engaging with a tray at a second lowest position among the stacked trays and supporting this tray in a stacked manner; and
tray supporting means which is vertically moved below the stacked trays with interlocking with the tray driving means and which holds at a highest level the tray at the lowest position, the tray being disengaged from the storage means, and lowers the tray onto the tray ejection frame.

In the disk loading apparatus of the present invention, a tray support unit which is driven in accordance with the tray circulating operation is disposed directly below the tray storage section. During the tray circulating operation, therefore, a tray in the tray storage section is prevented from suddenly dropping onto the tray ejection frame and the tray at the lowest position in the tray storage section is placed surely and quietly on the tray ejection frame. Consequently, the apparatus is a disk loading apparatus having characteristics which are excellent for a sound apparatus.

While the novel features of the present invention are set forth particularly in the appended claims, the present invention, both as to organization and content, will be better understood and appreciated, along with other objects and features thereof, from the following detailed description taken in conjunction with the drawings.

BRIEF DESCRIPTION OF THE DRAWINGS

FIG. 31 is a section view showing an engagement state of a cam portion 453 and the tray 1 in the reproduction waiting state shown in FIG. 26.

FIG. 32 is a section view showing an engagement state of the first hook 451 and the trays 2, 3, 4, and 5 in the reproduction waiting state shown in FIG. 26.

It will be recognized that some or all of the Figures are schematic representations for purposes of illustration and do not necessarily depict the actual relative sizes or locations of the elements shown.

DESCRIPTION OF THE PREFERRED EMBODIMENT

Hereinafter, preferred embodiments of the present invention will be described with reference to FIGS. 1 to 55.

<First Embodiment>

A first embodiment of the disk loading apparatus of the present invention will be described in detail with reference to FIGS. 1 to 22.

Figure 1:
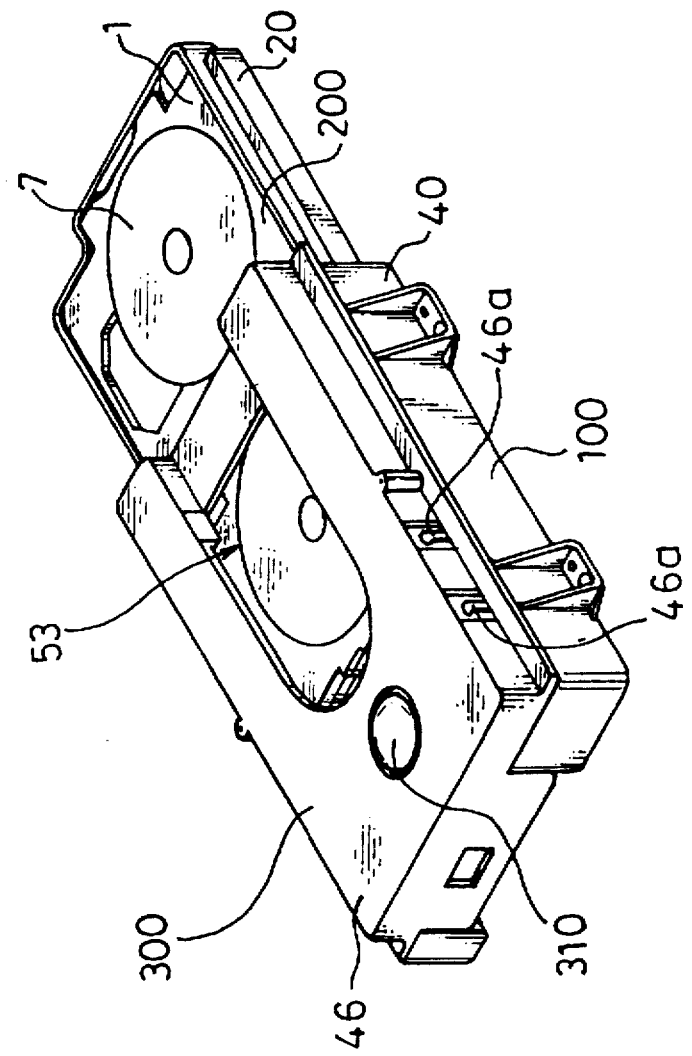
FIG. 1 is a perspective view showing a disk loading apparatus of a first embodiment of the present invention.
Figure 2:
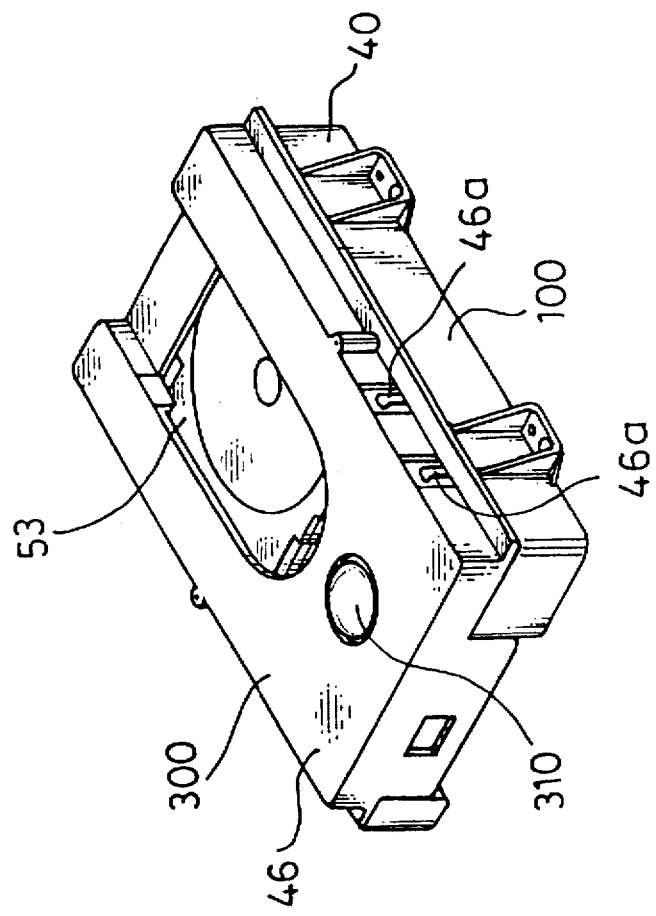
FIG. 2 is a perspective view showing an appearance of the disk loading apparatus of FIG. 1.

FIGS. 1 and 2 are perspective views showing the whole of a disk loading apparatus of the first embodiment. FIG. 1 shows the disk loading apparatus in a tray ejection state in which a disk 7 is ejected. FIG. 2 shows the disk loading apparatus in a tray storage state in which the disk 7 is housed.

As shown in FIGS. 1 and 2, the disk loading apparatus of the first embodiment comprises a base unit 100 which constitutes the lower portion of the apparatus and has a driving mechanism, and a cover unit 300 which covers the base unit 100 and constitutes the upper portion of the apparatus. A tray ejection unit 200 which serves as the tray ejecting means is slidably housed in the base unit 100 and the cover unit 300.

Figure 3:
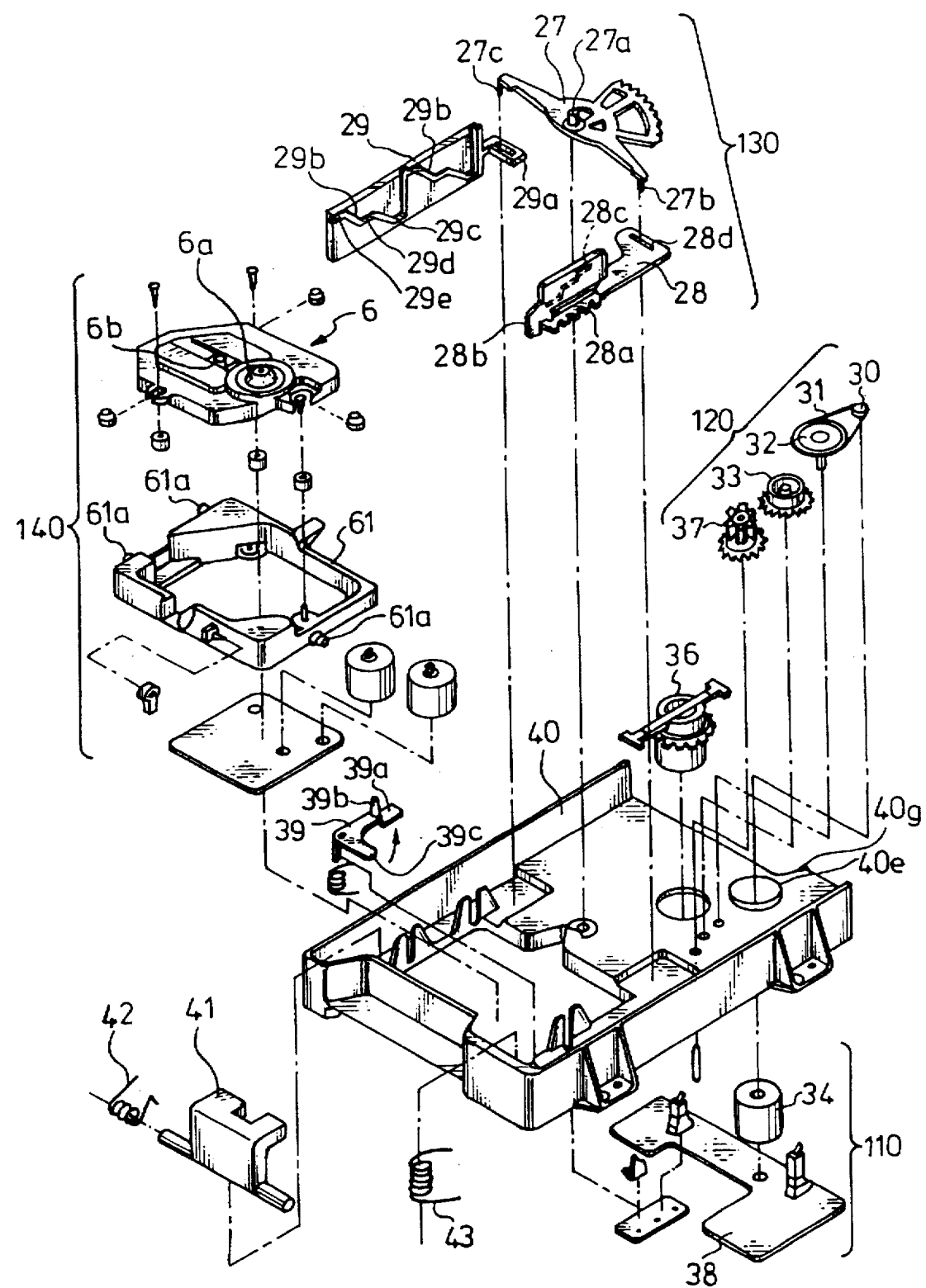
FIG. 3 is an exploded perspective view showing a base unit of the disk loading apparatus of FIG. 1.
Figure 4:
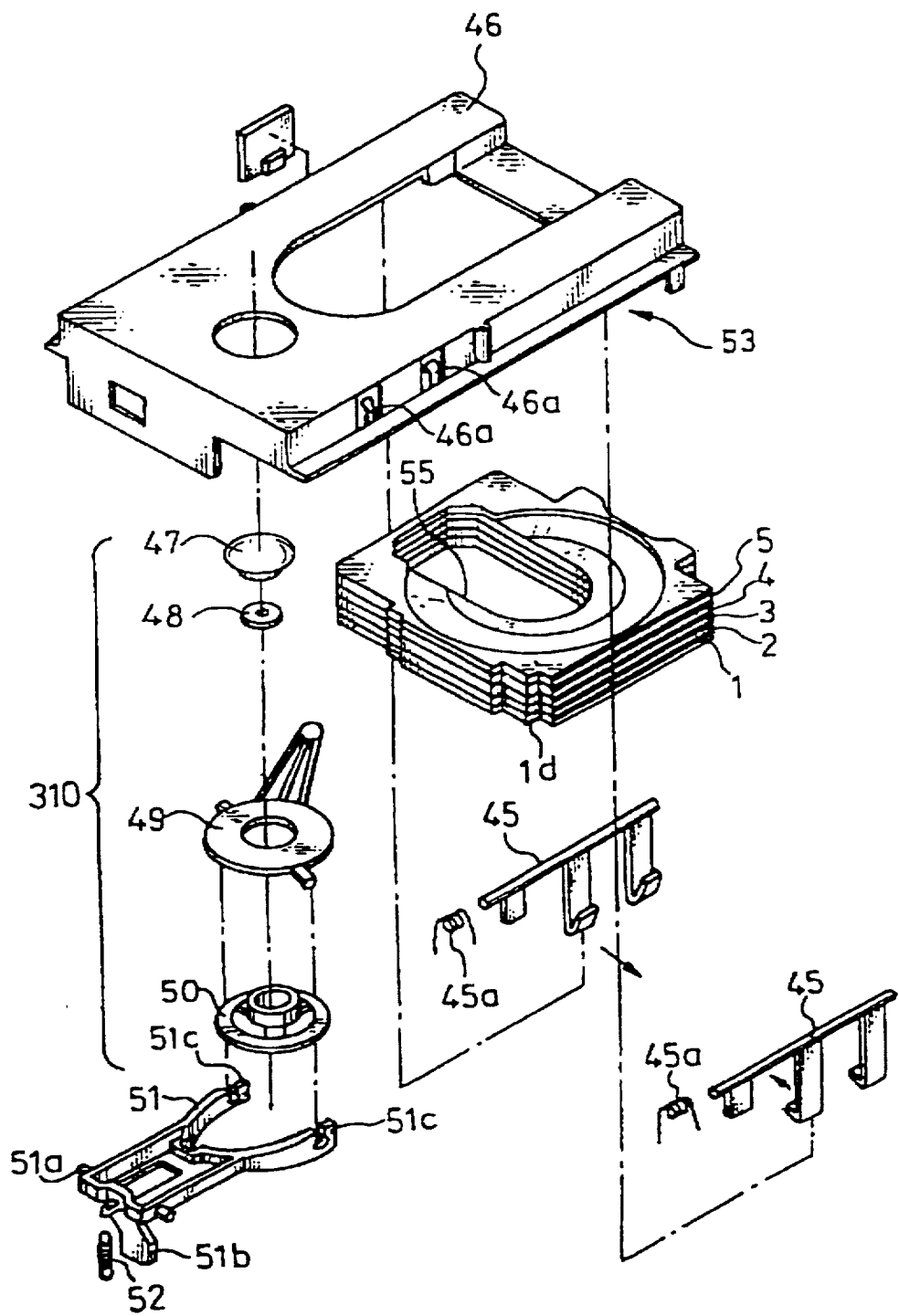
FIG. 4 is an exploded perspective view showing a cover unit of the disk loading apparatus of FIG. 1.
Figure 5:
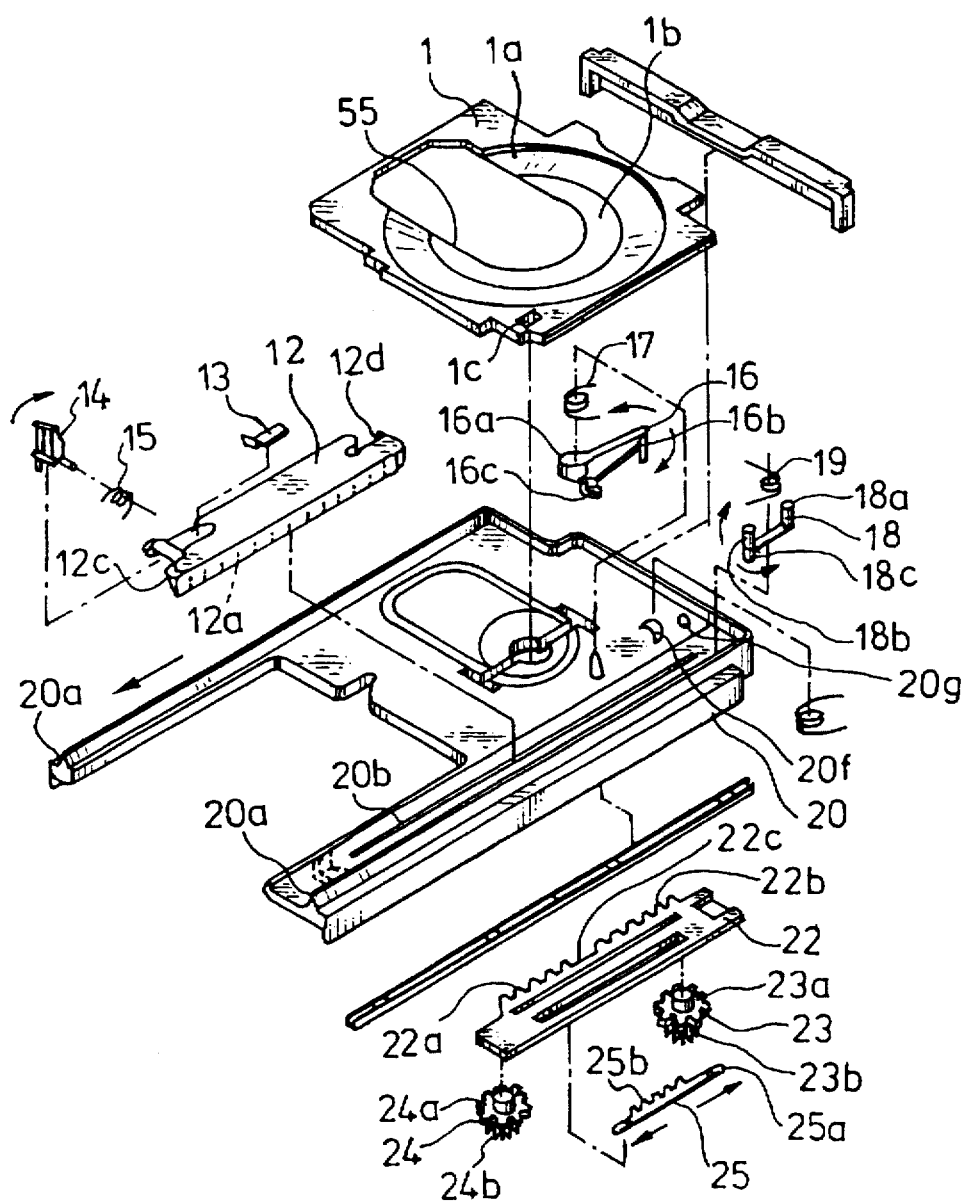
FIG. 5 is an exploded perspective view showing a tray ejection unit of the disk loading apparatus of FIG. 1.

FIG. 3 is an exploded perspective view of the base unit 100, FIG. 4 is an exploded perspective view of the cover unit 300, and FIG. 5 is an exploded perspective view of the tray ejection unit 200. The exploded perspective views of FIGS. 3 to 5 show the back, left side, and upper faces of the respective units.

[Configuration of the base unit 100]

In the base unit 100 shown in FIG. 3, disposed are various driving mechanisms serving as the tray driving means for driving trays, a reproduction unit 140 serving as reproducing means for reproducing the disk 7 on a tray, etc. The mechanisms are attached to a base frame 40 serving as the frame.

The tray driving means disposed in the base unit 100 include a driving section 110 having a tray driving motor 34 which is a sole driving source for driving the trays, a reduction gear section 120 which transmits the driving force of the driving section 110, a tray elevation unit 130 which elevates and lowers the reproduction unit 140 in the disk loading apparatus, and the like.

The tray driving motor 34 of the driving section 110 is mounted on a motor board 38 which is attached to the back face of the bottom of the base frame 40. The tray driving motor 34 is placed in a recess 40e which is formed in the base frame 40 and opens in the back face. The reduction gear section 120 to which the driving force of the tray driving motor 34 is transmitted is configured by a motor pulley 30, a belt 31, a pulley gear 32, an intermediate gear 33, and a driving gear 37.

The tray elevation unit 130 comprises a converting lever 27, a first slide plate 28, and a second slide plate 29. First and second pins 27b and 27c formed at the ends of the converting lever 27 slidably engage with a slot 28d formed in the first slide plate 28, and a slot 29a of the second slide plate 29, respectively. The converting lever 27 is disposed so as to be rotatable with respect to the base frame 40 about a shaft 27a. According to this configuration, the second slide plate 29 is slidingly moved by the sliding movement of the first slide plate 28, in a direction opposite to the sliding movement.

The reproduction unit 140 comprises a reproduction device 6, a chassis 61 which holds the reproduction device 6, and a driving motor which drives a turn table 6a and an optical pickup 6b of the reproduction device 6. One projection 61a which engages with a cam groove 28c formed in the first slide plate 28 of the tray elevation unit 130 is formed on one side face of the chassis 61. Two projections 61a which engage with cam grooves 29b formed in the second slide plate 29 are formed on the other side face of the chassis 61. Consequently, the chassis 61 is surely supported at three points by the tray elevation unit 130.

As shown in FIG. 3, the reproduction unit 140 which reproduces the disk 7 is disposed in the back side (the left side in FIG. 3) of the base frame 40. A tray storage section 53 which stores a plurality of stacked trays is disposed on the front side of the base frame 40. A tray support 36 which supports the plural stacked trays from the beneath is disposed directly below the tray storage section 53.

A tray holding lever 41 is disposed in the vicinity of the reproduction unit 140 of the base frame 40. The tray holding lever 41 is urged by a spring 42 so as to be rotatable, and engages with a part of the base frame 40 so as to be held in a substantially vertical state.

The tray holding lever 41 functions so as to hold a tray in a reproduction state at a reproduction position and particularly to prevent the tray from being upward moved. When the tray is to be transferred from the reproduction state to another state, e.g., a tray storage state, the tray holding lever 41 is rotated with interlocking with the second slide plate 29 of the tray elevation unit 130 so that the upward movement of the tray is enabled.

[Configuration of the cover unit 300]

FIG. 4 is an exploded perspective view showing the cover unit 300 which is disposed above the aforementioned base unit 100.

In FIG. 4, hook portions 45 which serve as the storage means are disposed on the inner side faces of a cover frame 46 serving as the frame, respectively. The hook portions 45 are configured so as to engage with the tray 2 at the lowest position among the plural stacked trays 2, 3, 4, and 5 and support the tray. The hook portions 45 are urged by torsion coil springs 45a so as to be rotated in opposite directions. Therefore, the tray 2 at the lowest position is surely held. When the tray 2 at the lowest position is to be moved, the hook portions 45 are pushed in a direction along which the hook portions are opened, so that the engagement of the tray 2 and the hook portions 45 is canceled.

In the first embodiment, the region where trays are stacked by the hook portions 45 serving as the storage means is the tray storage section 53. The tray storage section 53 is disposed on the tray ejection side (front side) of the cover frame 46.

Plural (four in the first embodiment) trays 2, 3, 4, and 5 are held in a stacked manner in the tray storage section 53. The tray 1 which is directly below the tray 2 at the lowest position in the tray storage section 53 is placed on a tray ejection frame 20 which is in the tray storage state and slidably supported by the base frame 40.

Under the state in which the hook portions 45 disengage from the tray 1, the trays 2, 3, 4, and 5 of the tray storage section 53 are placed by means of their own weight on the tray 1 at the lowest position. In this state, projections formed inside the cover frame 46 engage with the trays. Therefore, the stacked trays 1, 2, 3, 4, and 5 can be moved only in vertical directions and are inhibited from being moved in the longitudinal directions.

An opening 55 in which the reproduction device 6 is to be placed during reproduction is formed at the center portion of each of the trays 1, 2, 3, 4, and 5. A disk fitting recess for placing a disk of a diameter of 12 cm at a predetermined position, and a minidisk fitting recess for placing a minidisk (of a diameter of 8 cm) at a predetermined position are formed in the face of each of the trays 1, 2, 3, 4, and 5 on which the disk 7 is to be placed.

As shown in FIG. 4, a clamp unit 310 is disposed on the back face of the cover frame 46. The clamp unit 310 cooperates with the turn table 6a of the reproduction device 6 so as to clamp the disk 7 placed on the reproduction device 6, thereby surely securing the disk 7 to the reproduction position.

A clamp lever 51 of the clamp unit 310 disposed inside the cover frame 46 is supported by the cover frame 46 so as to be rotatable about a pin 51a. The clamp lever 51 is pushed by a clamp lever spring 52 so as to be moved upward. A clamp base 49 which secures the disk 7 on the turn table 6a of the reproduction device 6 to the reproduction position is disposed at the tip end portion of the clamp lever 51. The clamp base 49 is rotatably supported by supporting portions 51c. A receiving portion 51b projected from the lower face of the clamp lever 51 is configured so that it is pushed by the rear edge of the tray on the way of moving the tray from the tray storage position to the reproduction waiting position. So that the clamp unit 310 is rotated in the downward direction or the direction along which the disk 7 at the reproduction position is pressed. As a result, in the disk loading apparatus of the first embodiment, the disk 7 is secured onto the turn table 6a by the operation of pushing down the clamp unit 310, thereby attaining the reproduction enabled state. In the clamp base 49, a magnet 48 for securing the disk 7 is sandwiched between a damper 50 and a securing plate 47.

[Configuration of the tray ejection unit 200]

FIG. 5 is an exploded perspective view showing the tray ejection unit 200. As shown in FIG. 5, the tray ejection unit 200 comprises the tray ejection frame 20 on which the tray 1 is detachably placed, a carrier 12 which enables the tray 1 on the tray ejection frame 20 to slidingly move in the longitudinal directions, and a driving rack plate 22 which drives the carrier 12.

The tray ejection frame 20 on which a selected tray is to be placed has slide portions 20a elongating toward the reproduction device 6, so that the tray on the tray ejection frame 20 is transferred to the reproduction position.

The driving rack plate 22 is configured so that the driving force of the driving motor 34 of the driving section 110 is transmitted to the plate via the reduction gear section 120 and the plate is driven in the same directions as the sliding directions of the tray ejection unit 200 or the longitudinal directions of the apparatus. First and second racks 22a and 22b which mesh with the driving gear 37 of the reduction gear section 120 are formed in the driving rack plate 22. The region between the first and second racks 22a and 22b is formed as a toothless portion 22c. A cushion rack 25 is disposed at a position corresponding to the toothless portion 22c. In the same manner as the driving rack plate 22, the cushion rack 25 is disposed so as to be slidable by a predetermined distance in the longitudinal directions of the apparatus. The pitch line of the rack 25b of the cushion rack 25 overlaps with the pitch lines of the first and second racks 22a and 22b of the driving rack plate 22 so that each of the racks meshes with the driving gear 37.

As shown in FIG. 5, the driving rack plate 22 is provided with first and second speed increasing gear means 23 and 24. The first speed increasing gear means 23 has a large gear 23a and a small gear 23b, which are fixed coaxially to each other. In the same manner as the first speed increasing gear means 23, the second speed increasing gear means 24 has a large gear 24a and a small gear 24b, which are fixed coaxially to each other. The large gear 23a of the first speed increasing gear means 23 meshes with a carrier rack 12a of the carrier 12. The small gear 23b meshes with a base frame rack 40c formed on the base frame 40. The large gear 24a of the second speed increasing gear means 24 meshes with the carrier rack 12a of the carrier 12. The small gear 24b is configured so as to mesh with the base frame rack 40c of the base frame 40 or a slide plate rack 28a formed on the first slide plate 28.

As shown in FIG. 5, the carrier 12 is provided with a hook 13 which is configured by a plate spring and used for catching a hook receiving portion 1c of, for example, the tray 1. It is configured so that the tray 1 is moved in accordance with a longitudinal movement of the carrier 12. In this embodiment, as the hook receiving portion, a hole which is to engage with the hook 13 of the carrier 12 is formed in each of the trays 1, 2, 3, 4, and 5.

A carrier arm 14 is rotatably disposed on the carrier 12. The carrier arm 14 is upward projected from the upper face of the carrier 12. When the carrier 12 reaches a predetermined position, the carrier arm 14 is housed in a space below the carrier 12.

The tray ejection frame 20 is provided with a frame lock lever 16. The frame lock lever 16 engages with the base frame 40, thereby securing the tray ejection frame 20 to the base frame 40. When the frame lock lever 16 is rotated, the engagement of the base frame 40 and the tray ejection frame 20 is canceled so as to attain a state in which the tray ejection frame 20 is slidable.

The tray ejection frame 20 is provided with a carrier lock lever in. When the tray ejection frame 20 is in a tray ejection enabled state, a pin 18a of the carrier lock lever 18 engages with the carrier 12 so that the tray ejection frame 20 is slidingly moved with interlocking with the carrier 12. When the tray ejection frame 20 is to be housed in the disk loading apparatus, the pin 18a of the carrier lock lever 18 disengages from the carrier 12, thereby enabling the carrier 12 to be slidingly moved on the tray ejection frame 20.

[Configuration of the disk loading apparatus]

Figure 6:
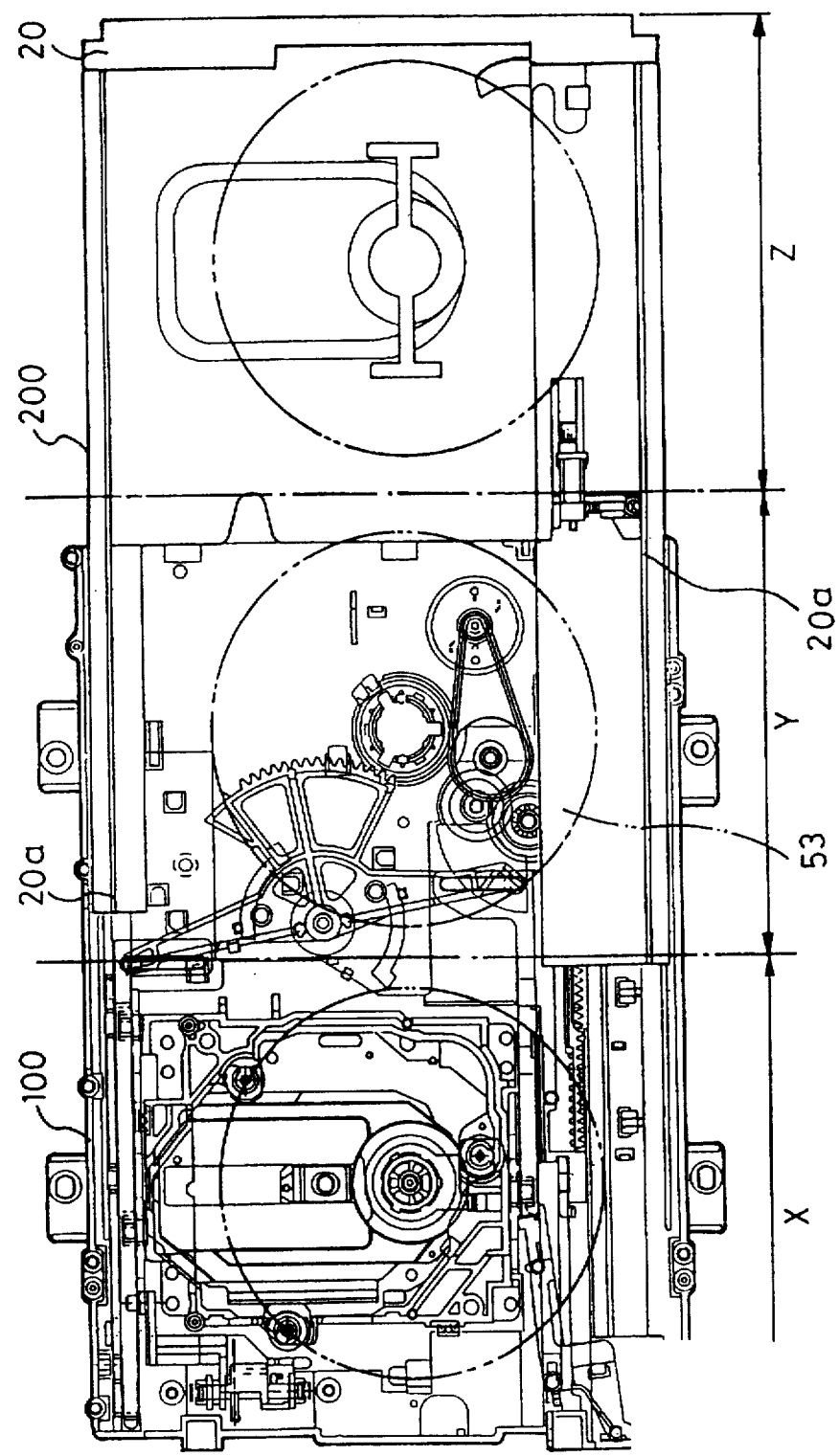
FIG. 6 is a plan view showing a state of the disk loading apparatus of FIG. 1 in which the cover unit is detached.

FIG. 6 is a plan view showing a state of the disk loading apparatus of the first embodiment in which the cover unit 300 is detached and showing only the main internal mechanism. In FIG. 6, the disk loading apparatus of the first embodiment comprises a reproduction region X, which is in a rear portion of the apparatus (the left side in FIG. 6) with the center portion of the apparatus as the boundary, and a nonreproduction region Y which serves as the tray storage section 53 and is in a front portion of the apparatus. An open region Z where is an ejection position at which the tray ejection unit 200 is taken out to the outside from the front face of the apparatus is adjacent to the nonreproduction region Y.

[Tray circulating operation of the disk loading apparatus]

Figure 7A:
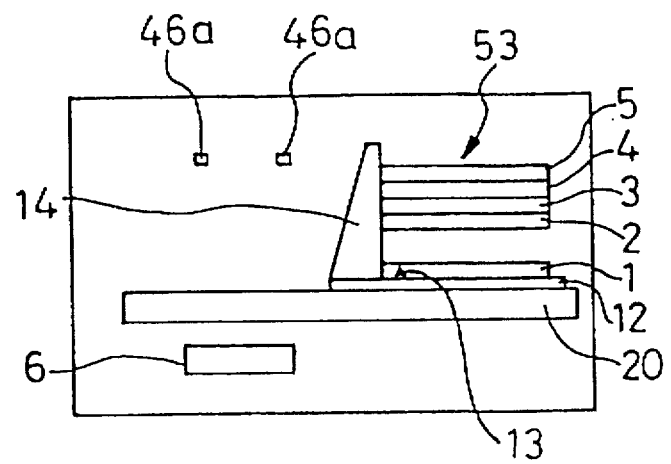
FIGS. 7A–7C are an operation diagram showing a tray storage state, a reproduction waiting state, and a reproduction state in a tray driving operation in the disk loading apparatus of the first embodiment.
Figure 7B:
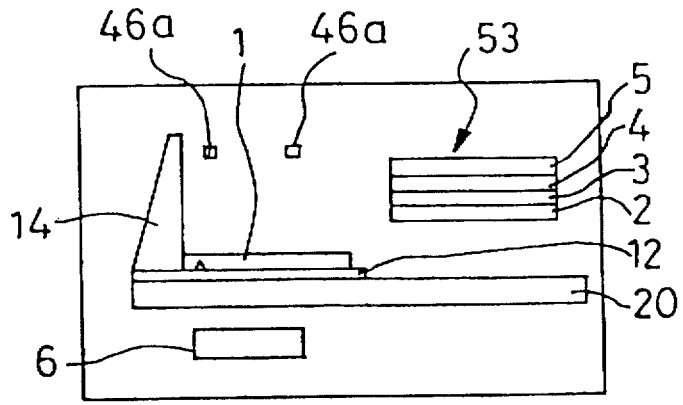
Figure 7C:
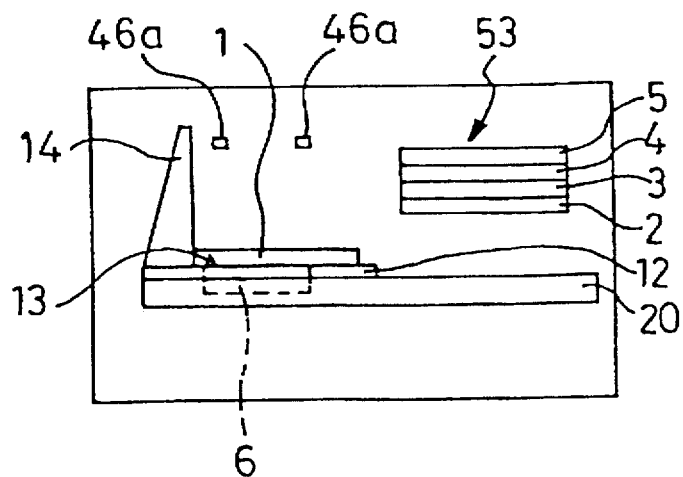
Figure 8A:
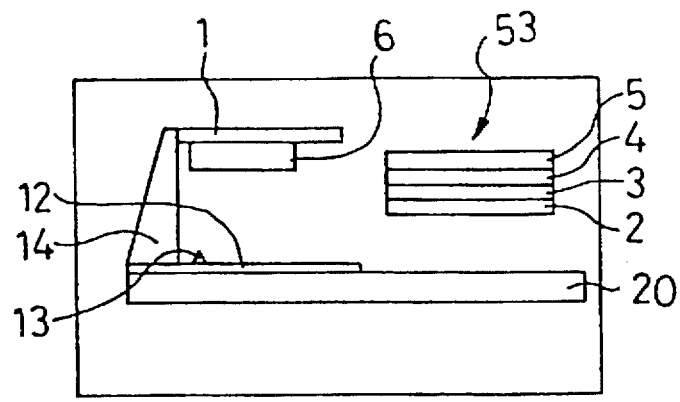
FIGS. 8D–8F are an operation diagram showing a tray return waiting state, a reproduction device return state, and the tray storage state in the tray driving operation in the disk loading apparatus of the first embodiment.
Figure 8B:
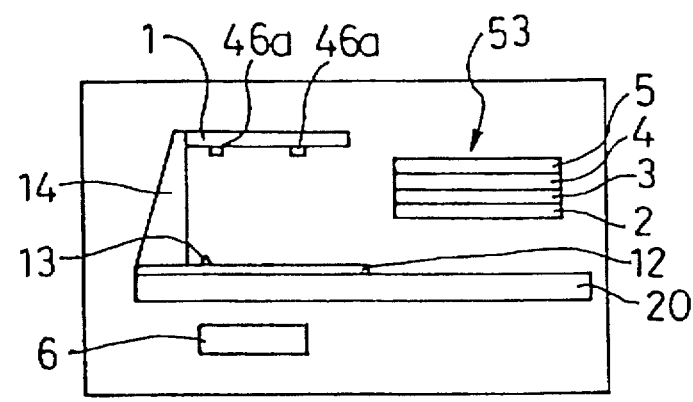
Figure 8C:
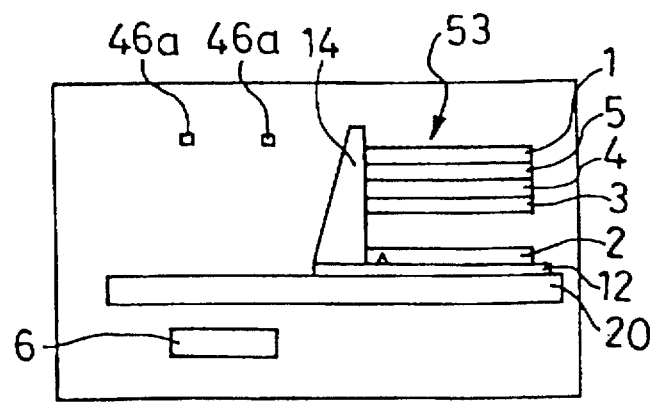
Figure 9:
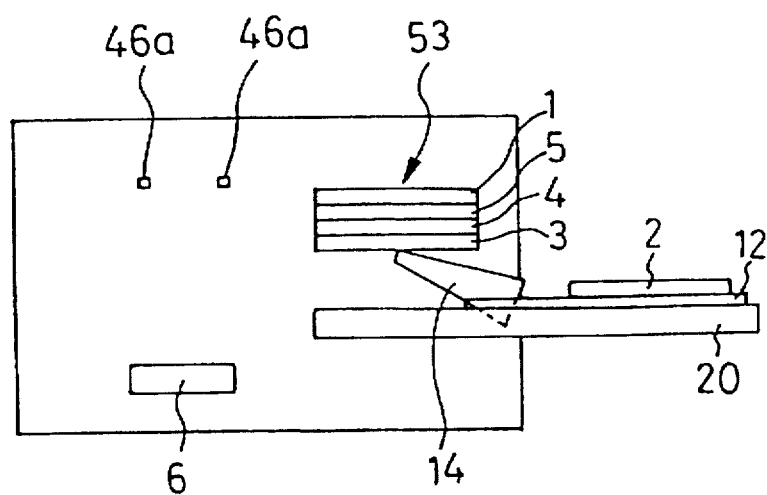
FIG. 9 is an operation diagram showing a tray ejection state in the tray driving operation in the disk loading apparatus of the first embodiment.

FIGS. 7, 8, and 9 are schematic side views illustrating the tray circulating operation of the disk loading apparatus of the first embodiment.

In FIG. 7, A shows the tray storage state, B shows a reproduction waiting state, and C shows the reproduction state. In FIG. 8, D shows a tray return waiting state, E shows a reproduction device return state, and F shows the next tray storage state. In FIG. 9, G is a schematic side view showing the disk loading apparatus in a tray ejection state in which the disk 7 is ejected.

In the tray storage state shown in A of FIG. 7, the tray 1 at the lowest position of the tray storage section 53 is placed on the tray ejection frame 20 and engages with the carrier 12.

The reproduction waiting state shown in B of FIG. 7 is a state in which the tray 1 is transferred to the reproduction region by the carrier 12. In this state, the reproduction device 6 is at a lower position in the reproduction region.

The reproduction state shown in C of FIG. 7 is a state in which the reproduction device 6 is moved by the tray elevation unit 130 to a middle position in the reproduction region. In this state, the disk 7 on the tray 1 is secured by the clamp unit 310 to the reproduction position and then reproduced.

The tray return waiting state shown in D of FIG. 8 is a state in which the reproduction device 6 is elevated by the tray elevation unit 130 to a higher position in the reproduction region. The tray 1 is held at a tray return waiting position by supporters 46a which are disposed on the cover unit 300.

In the reproduction device return state shown in E of FIG. 8, the reproduction device 6 is lowered to a lower position in the reproduction region and only the tray 1 is held at the tray return waiting position.

The tray storage state shown in F of FIG. 8 is a state in which the carrier 12 is returned to the tray storage section 53 which is the nonreproduction region. The tray 1 which, when the carrier 12 is returned, is at the tray return waiting position is transferred onto the tray at the highest position of the tray storage section 53. When the carrier 12 is returned to the tray storage section 53, the tray 2 which is set to the lowest position is placed on the tray ejection frame 20, thereby attaining a state in which the transfer to the reproduction waiting state is enabled.

The tray ejection state shown in G of FIG. 9 is a state in which the tray 2 is ejected into the open region.

The states shown in FIGS. 7 and 8 are shifted in the sequence of A-B-C-D-E-F. The trays 1, 2, 3, 4, and 5 stacked in the tray storage section 53 are subjected to the circulating operation so as to be sequentially transferred to the reproduction position.

When one of the disks 7 placed on the trays which are stacked in the tray storage section 53 is to be ejected, the disk loading apparatus of the first embodiment is shifted from the tray storage state shown in A (or F) to the tray ejection state shown in G at the timing when the selected disk 7 reaches the lowest position of the tray storage section 53 as a result of the above-described circulating operation. When the disk 7 at the reproduction position is to be ejected, however, the disk loading apparatus of the first embodiment is reversely shifted from the reproduction state C to the reproduction waiting state shown in B, passes through the tray storage state shown in A, and is then shifted to the tray ejection state shown in G.

[Elevating Mechanism of the Tray Elevation Unit 130]

Figure 10:
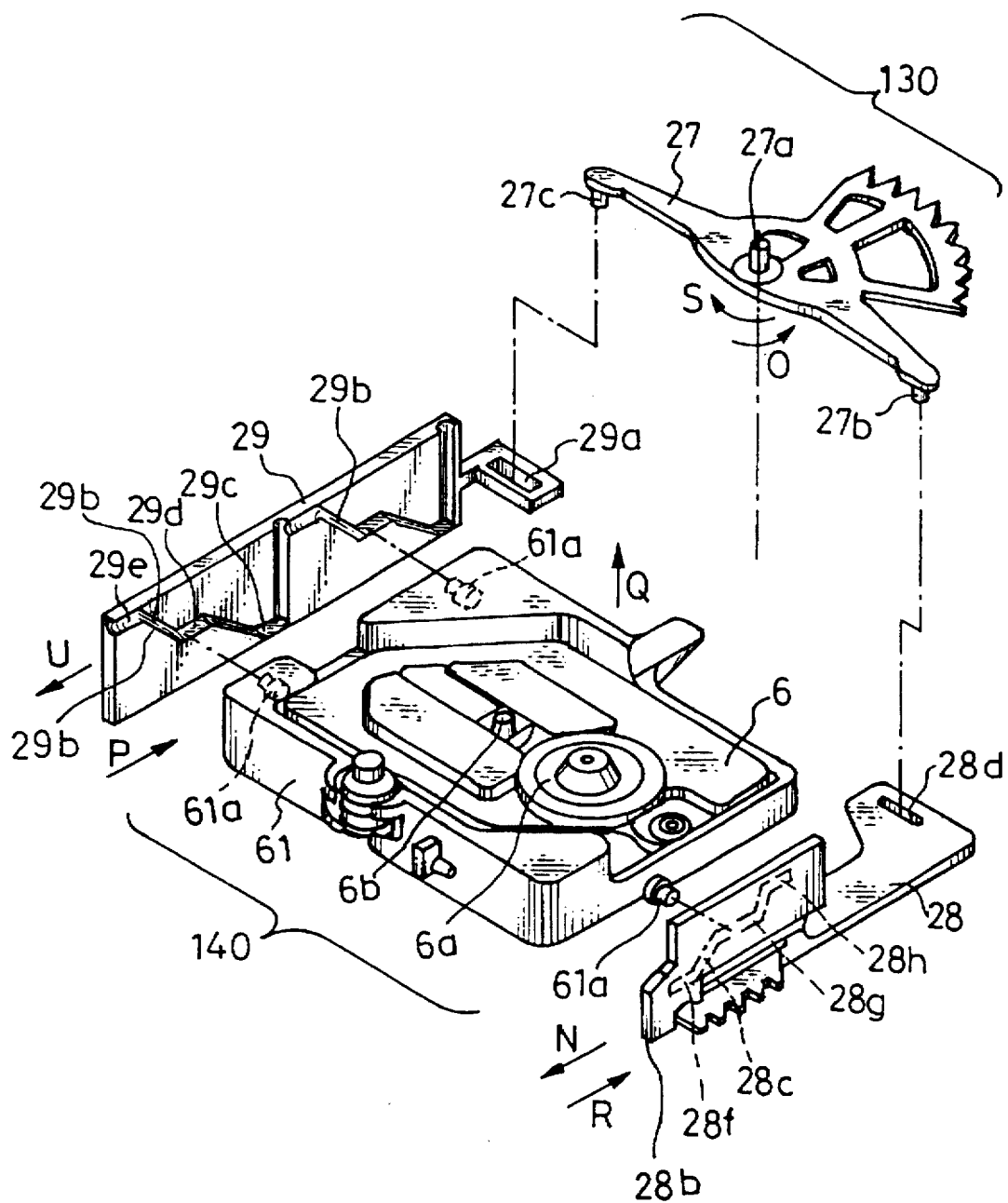
FIG. 10 is an exploded perspective view showing a tray elevation unit, etc. of the disk loading apparatus of FIG. 1.

FIG. 10 is an exploded perspective view showing the tray elevation unit 130 in the disk loading apparatus of the first embodiment. The tray elevation unit 130 comprises the converting lever 27, the first slide plate 28, the second slide plate 29, and the chassis 61 on which the reproduction device 6 is mounted. The tray elevation unit 130 elevates the reproduction device 6 in the reproduction waiting state to the reproduction position at a higher level, and then further elevates the reproduction device to the tray return waiting position at a further higher level, and also the tray 1 at the reproduction position to the tray return waiting position.

The converting lever 27 is rotatably attached at the center portion to the base frame 40 via the shaft 27a. The first and second pins 27b and 27c are formed at the ends of the converting lever 27, respectively. The first pin 27b slidably engages with the slot 28d of the first slide plate 28. The second pin 27c slidably engages with the slot 29a of the second slide plate 29.

Consequently, by the movement of the first slide plate 28 in the direction of the arrow N, for example, the converting lever 27 is rotated in the direction of the arrow S and the second slide plate 29 is moved in the direction of the arrow P.

When the first slide plate 28 is moved in the opposite direction or the direction of the arrow R, also the converting lever 27 and the second slide plate 29 are driven in the directions which are opposite to those mentioned above, respectively. The cam groove 28c which is inclined in a stepped manner is formed in the first slide plate 28. The two cam grooves 29b which are inclined similarly in a stepped manner are formed in the second slide plate 29. The inclination of the cam groove 28c of the first slide plate 28 is opposite in direction to that of the cam grooves 29b of the second slide plate 29. In the cam groove 28c of the first slide plate 28, horizontal portions 28f, 28g, and 28h are formed in lower, middle, and upper portions of the groove, respectively. In each of the cam grooves 29b of the second slide plate 29, horizontal portions 29c, 29d, and 29e are formed in lower, middle, and upper portions of the groove, respectively.

As shown in FIG. 10, the chassis 61 which holds the reproduction device 6 is located between the first and second slide plates 28 and 29. The projections 61a which respectively slidably engage with the cam grooves 28c and 29b are formed on both the sides of the chassis 61. The projections 61a of the chassis 61 engage also with vertical grooves (not shown) formed in the base frame 40. Therefore, the chassis 61 is supported by the first and second slide plates 28 and 29 so as to be movable only in the vertical directions.

In the tray elevation unit 130 which is configured as described above, when the first slide plate 28 is moved in the direction of the arrow N, the second slide plate 29 is moved in the direction of the arrow P and the chassis 61 is moved in an upward direction or the direction of the arrow Q. The horizontal portions 28f, 28g, or 28h, and 29c, 29d, or 29e have a desired length so that the projections 61a of the chassis 61 are supported stably surely by the horizontal portions 28f, 28g, or 28h, and 29c, 29d, or 29e of the corresponding cam grooves 28c and 29b.

When the first slide plate 28 is inversely moved in the direction of the arrow R, the converting lever 27 and the second slide plate 29 are driven in the opposite directions and the chassis 61 is lowered.

When the projections 61a of the chassis 61 are supported by the lower horizontal portions 28f and 29c, the reproduction device 6 is at the position of the reproduction waiting state. When the projections 61a are supported by the middle horizontal portions 28g and 29d, the reproduction device 6 is at the position of the reproduction state. When the projections 61a are supported by the upper horizontal portions 28h and 29e, the reproduction device 6 is at the position of the tray return waiting state.

When the carrier 12 transferring a tray reaches the position of the reproduction waiting state and the first slide plate 28 is then moved in the direction of the arrow N (FIG. 10), thereby elevating the reproduction device 6 and attaining the reproduction state. When reproduction is terminated, the first slide plate 28 is further moved in the direction of the arrow N so that the reproduction device 6 is further elevated together with the tray. As a result, the tray is situated at the tray return waiting position.

[Tray Holding Mechanism in the Tray Return Waiting State]

Figure 11:
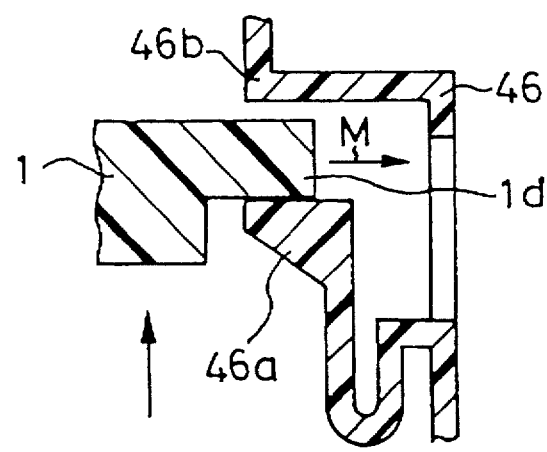
FIG. 11 is an enlarged section view showing a part of a cover frame of the disk loading apparatus of FIG. 1.

FIG. 11 is a section view showing the supporters 46a disposed on the cover frame 46. Each of the supporters 46a is configured by an elastic material which can be deformed in the direction of the arrow M, so that, when the tray 1 is elevated from the position of the reproduction state to that of the tray return waiting state, the edge 1d of the tray 1 overrides the supporter 46a. The supporters 46a serve also as guides for returning the tray 1 supported thereby to the tray storage section 53.

A guide portion 46b is formed on the cover frame 46 so as to be situated above the edge 1d of the tray 1 supported by the supporters 46a. Consequently, the upward movement of the tray 1 is restricted so that the tray storage section 53 is surely moved.

[Operation of the tray driving mechanism]

Figure 12:
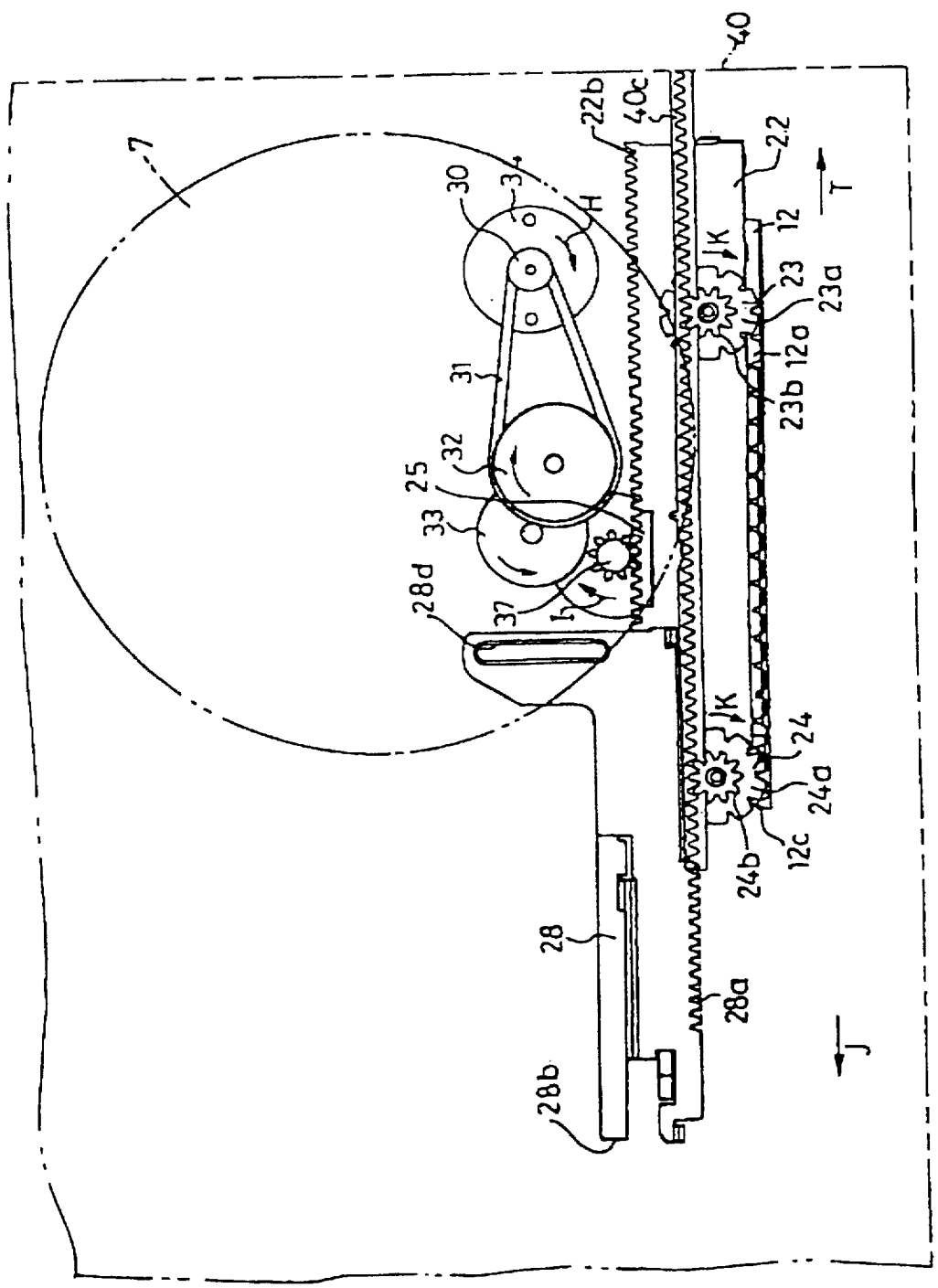
FIG. 12 is an operation diagram showing a tray driving mechanism in the tray storage state in the disk loading apparatus of the first embodiment.

FIGS. 12 to 16 are operation diagrams showing the tray driving mechanism consisting of the driving rack plate 22, etc. FIG. 12 shows the tray storage state, FIG. 13 the reproduction waiting state, FIG. 14 the reproduction state, FIG. 15 the tray return waiting state, and FIG. 16 the tray ejection state. In FIGS. 12 to 16, in order to illustrate the operation of the tray driving mechanism, a part of the components are shown with being positionally changed.

In FIG. 12, the driving force of the tray driving motor 34 is transmitted to the driving rack plate 22 via the reduction gear section 120 consisting of the motor pulley 30, the belt 31, the pulley gear 32, the intermediate gear 33, and the driving gear 37. When the motor pulley 30 is rotated in the direction of the arrow H in the tray storage state shown in FIG. 12, the driving gear 37 is rotated in the direction of the arrow I, thereby driving the driving rack plate 22 meshing with the driving gear 37, in the direction of the arrow J.

The first and second speed increasing gear means 23 and 24 are rotatably supported by the driving rack plate 22. In the speed increasing gear means 23 and 24, the large gears 23a and 24a and the small gears 23b and 24b are fixed coaxially to each other. The large gears 23a and 24a mesh with the carrier rack 12a of the carrier 12, and the small gears 23b and 24b with the base frame rack 40c formed on the base frame 40.

In the first embodiment, the first and second speed increasing gear means 23 and 24 are disposed in the vicinity of the ends of the driving rack plate 22, respectively. The carrier rack 12a of the carrier 12 meshes with both the first and second speed increasing gear means 23 and 24. Consequently, the moving distance of the carrier 12 is very larger than that obtained in the case where only a single speed increasing gear is used.

As described above, the driving rack plate 22 engages via the speed increasing gear means with the movable carrier 12 and the base frame 40. Therefore, when the driving rack plate 22 is moved in the direction of the arrow J, the carrier 12 is moved similarly in the direction of the arrow J. Accordingly, the moving speed of the carrier 12 becomes greater than that of the driving rack plate 22. This is caused by the configuration that the small gears 23b and 24b of the first and second speed increasing gear means 23 and 24 are rotated with meshing with the base frame rack 40c which is stationary, and the large gears 23a and 24a having a larger diameter than the small gears 23b and 24b are rotated in the direction of the arrow K so as to drive the carrier 12. The moving speed depends on the relationship between the tooth numbers of the large gears 23a and 24a and the small gears 23b and 24b. In the first embodiment, the moving speed of the carrier 12 is three times that of the driving rack plate 22. The carrier 12 is driven in this way and the tray 1 is transferred to the reproduction waiting position.

Figure 13:
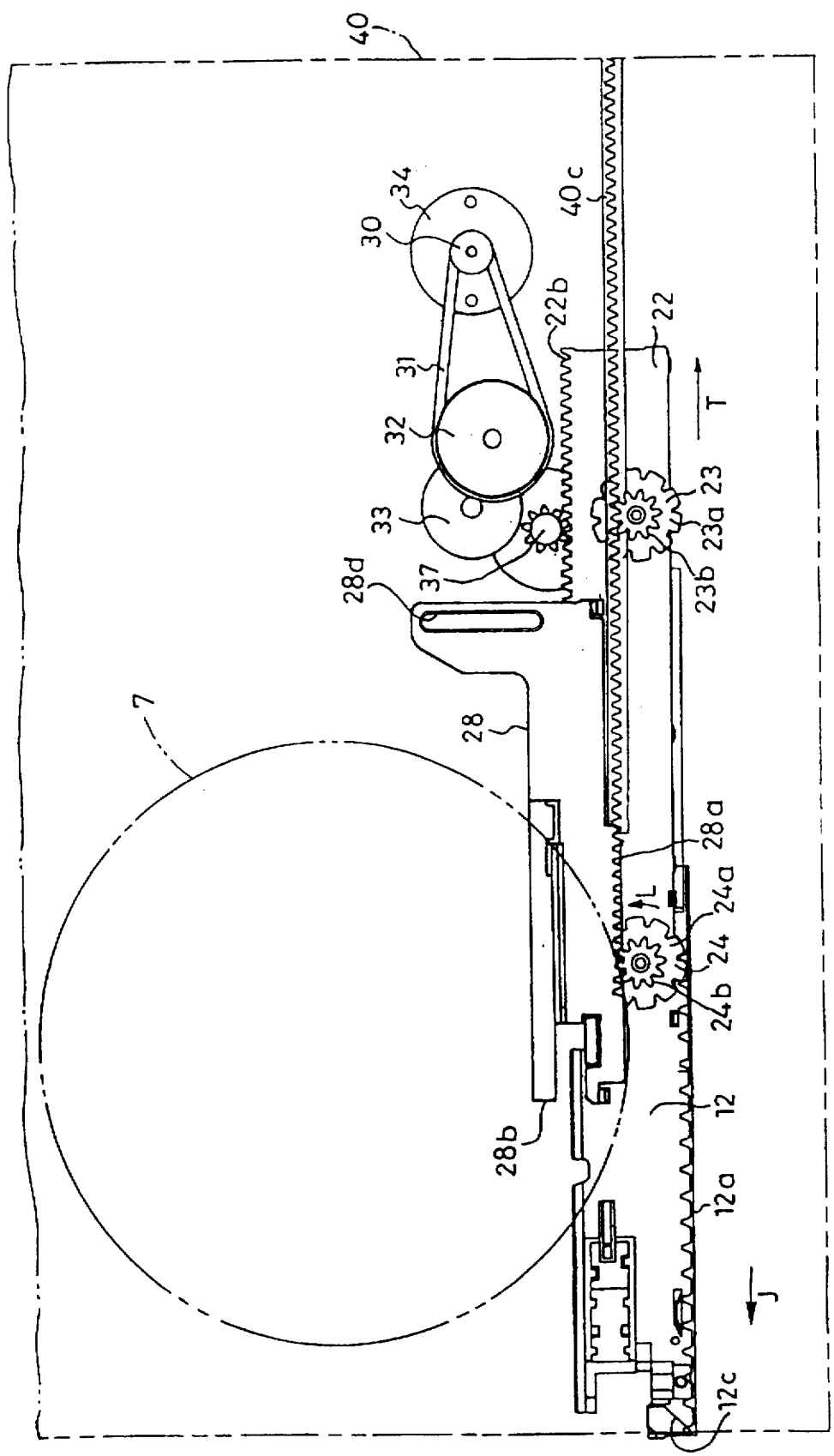
FIG. 13 is an operation diagram showing the tray driving mechanism in the reproduction waiting state in the disk loading apparatus of the first embodiment.

FIG. 13 shows the tray driving mechanism in the reproduction waiting state in which the carrier 12 is moved to the innermost position of the apparatus. In this state, the carrier 12 engages with a lock lever 39 which will be described later, so that the movement in the direction of the arrow J is inhibited. The small gear 24b of the second speed increasing gear means 24 unmeshes from the base frame rack 40c, and meshes with the slide plate rack 28a of the first slide plate 28. After this state is attained, the movement of the driving rack plate 22 in the direction of the arrow J is continued. Since the movement of the carrier 12 in the direction of the arrow J is inhibited, the second speed increasing gear means 24 is rotated inversely or in the direction of the arrow L. Accordingly, the slide plate rack 28a of the first slide plate 28 which meshes with the small gear 24b of the second speed increasing gear means 24 is moved in the direction of the arrow J so that the disk loading apparatus of the first embodiment is shifted to the reproduction state. The moving distance of the first slide plate 28 in this process depends on the relationship between the tooth numbers of the large gear 24a and the small gear 24b. In the first embodiment, the moving speed of the first slide plate 28 is 4/3 times that of the driving rack plate 22.

Figure 14:
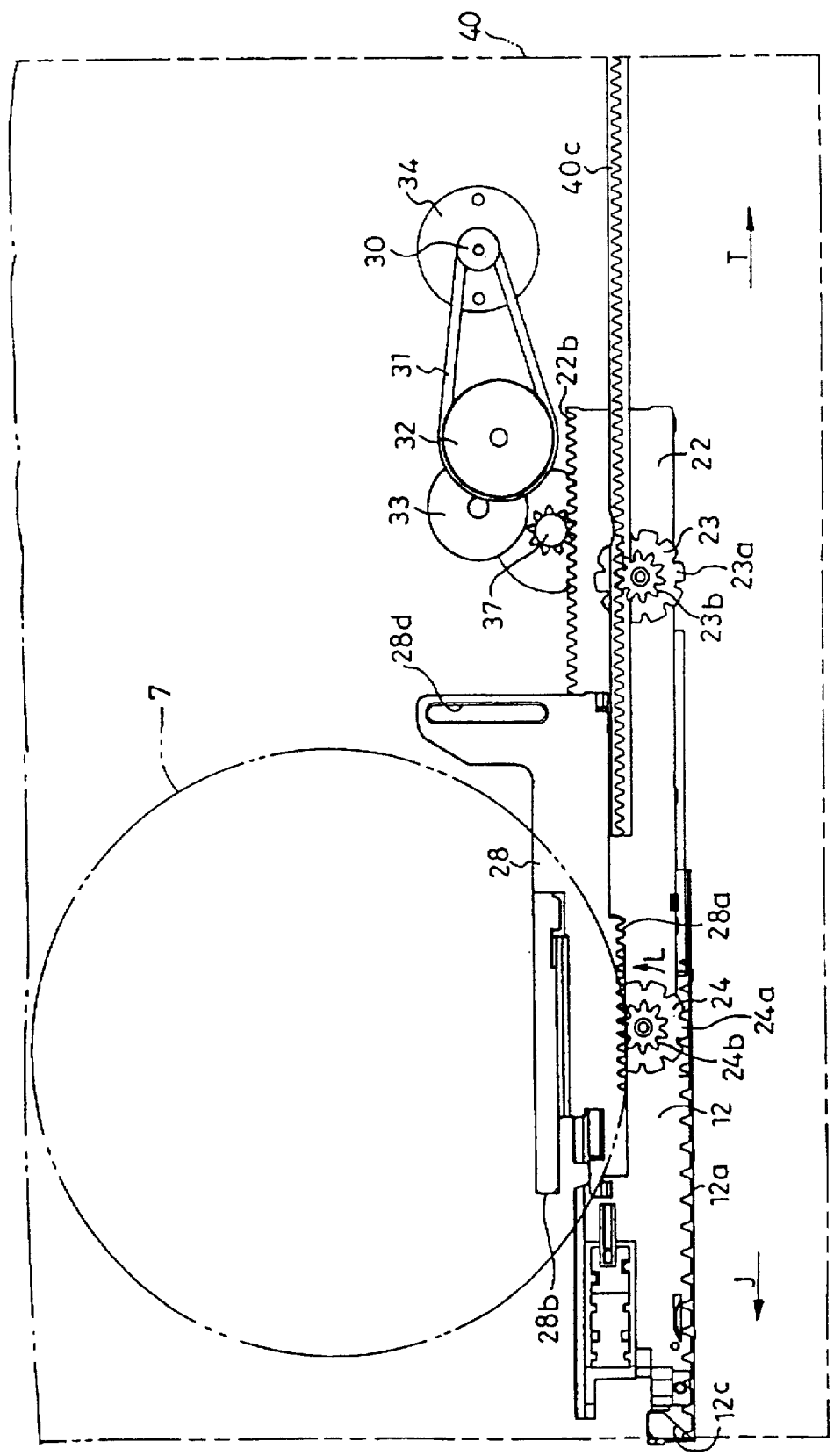
FIG. 14 is an operation diagram showing the tray driving mechanism in the reproduction state in the disk loading apparatus of the first embodiment.

FIG. 14 shows the tray driving mechanism in the reproduction state. In accordance with the movement of the driving rack plate 22 in the direction of the arrow J, also the first slide plate 28 is further moved in the direction of the arrow J. When the first slide plate 28 is moved as described above, the reproduction device 6 is moved from the lower position to the middle position by the operation of the tray elevation unit 130. Consequently, the disk 7 is secured onto the reproduction device 6 and the reproduction state is established.

Figure 15:
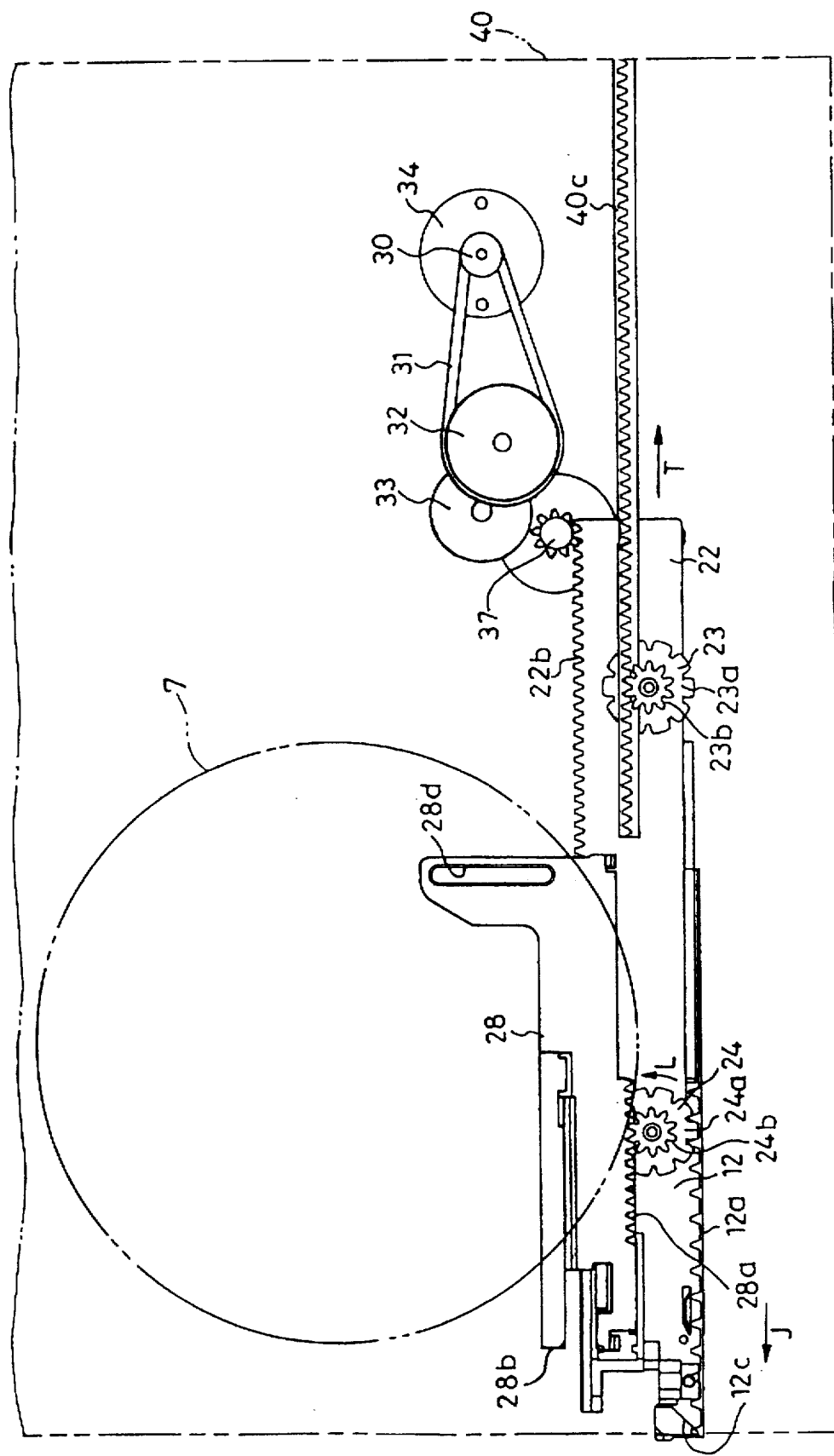
FIG. 15 is an operation diagram showing the tray driving mechanism in the tray return waiting state in the disk loading apparatus of the first embodiment.

FIG. 15 shows the tray driving mechanism in the tray return waiting state in which the driving rack plate 22 is further moved in the direction of the arrow J. In this state, the driving rack plate 22 is located at the innermost position. After the tray return waiting state shown in FIG. 15, the driving gear 37 is inversely rotated so that the driving rack plate 22 is moved in the opposite direction. As a result, the first slide plate 28 is returned to the reproduction waiting position and the carrier 12 to the tray storage state, thereby attaining the above-described tray storage state of FIG. 12.

Figure 16:
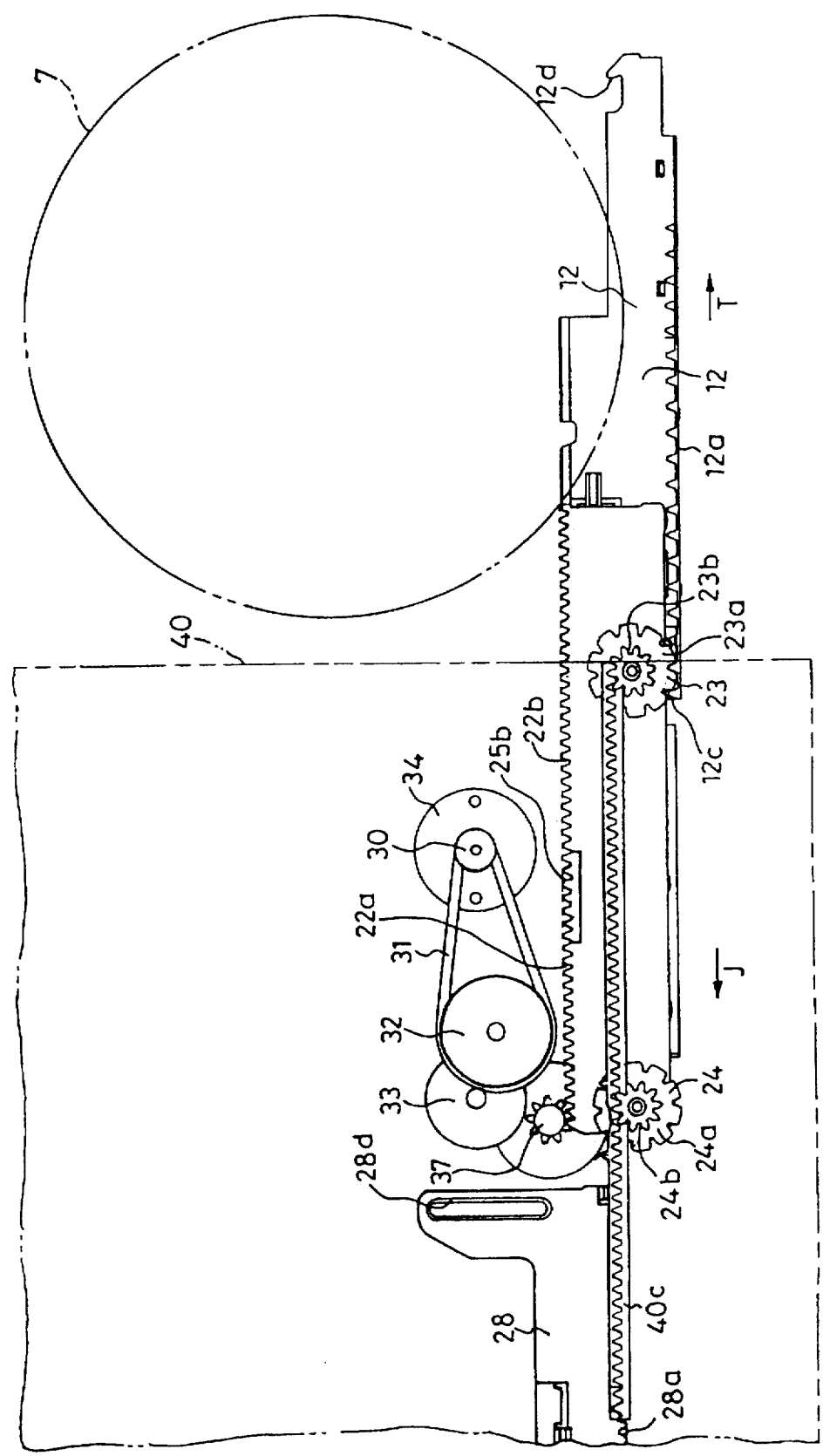
FIG. 16 is an operation diagram showing the tray driving mechanism in the tray ejection state in the disk loading apparatus of the first embodiment.

FIG. 16 shows the tray driving mechanism in the tray ejection state. In FIG. 16, the driving rack plate 22 is at the front position and the carrier 12 places the disk 7 on the tray in the open region.

[Description of the Operation of the Tray Elevation Unit 130]

As shown in FIG. 10, the first slide plate 28 of the tray elevation unit 130 interlocks with the sliding movement of the driving rack plate 22. The movement of the first slide plate 28 causes the converting lever 27 of the tray elevation unit 130 to be rotated about its shaft 27a. Consequently, the second slide plate 29 is slidingly moved in the direction opposite to the movement direction of the first slide plate 28. In this way, the reproduction device 6 is vertically moved by the sliding movements of the first and second slide plates 28 and 29.

Figure 17:
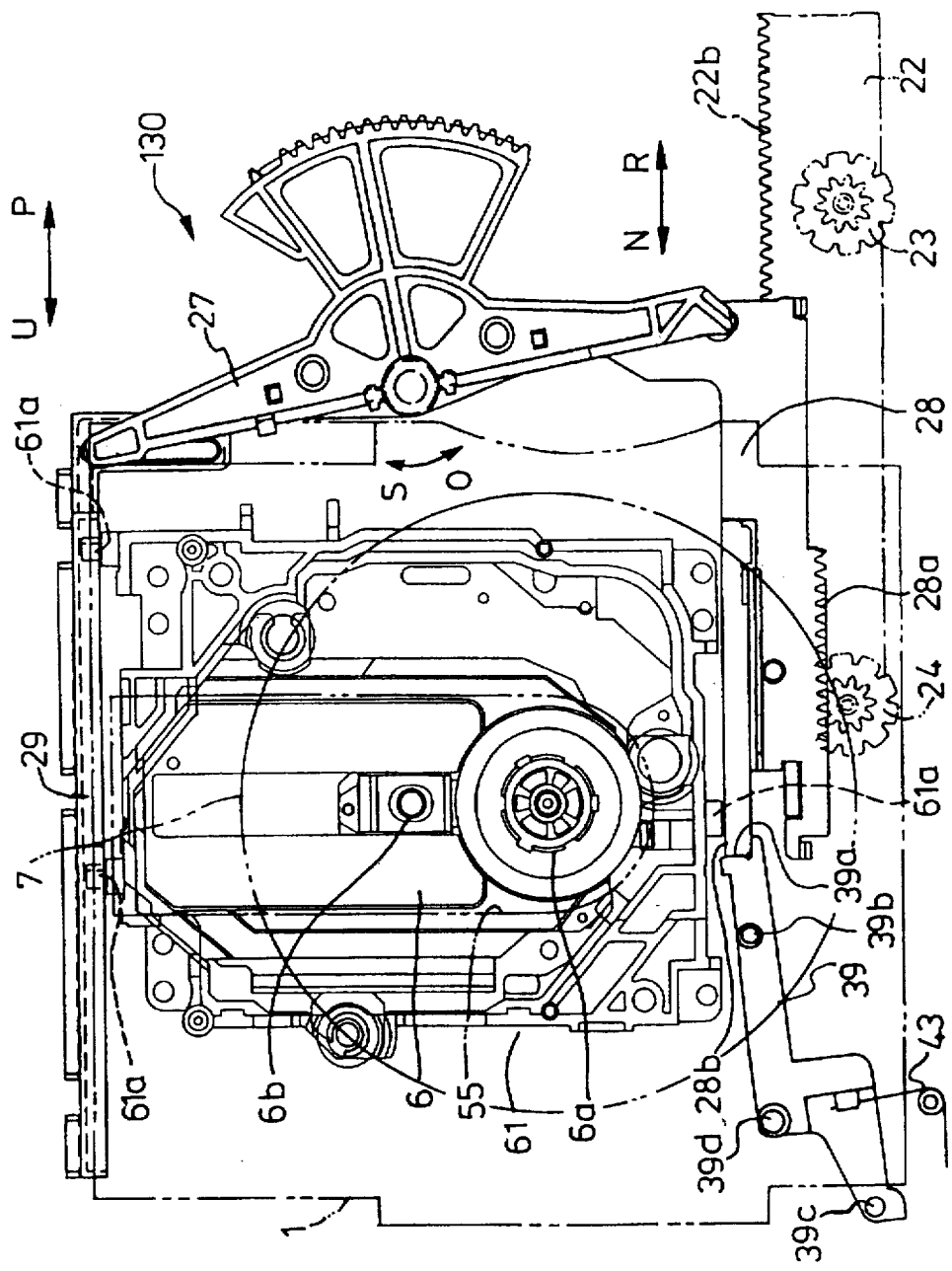
FIG. 17 is an operation diagram showing the tray elevation unit, etc. in the reproduction waiting state in the disk loading apparatus of the first embodiment.
Figure 18:
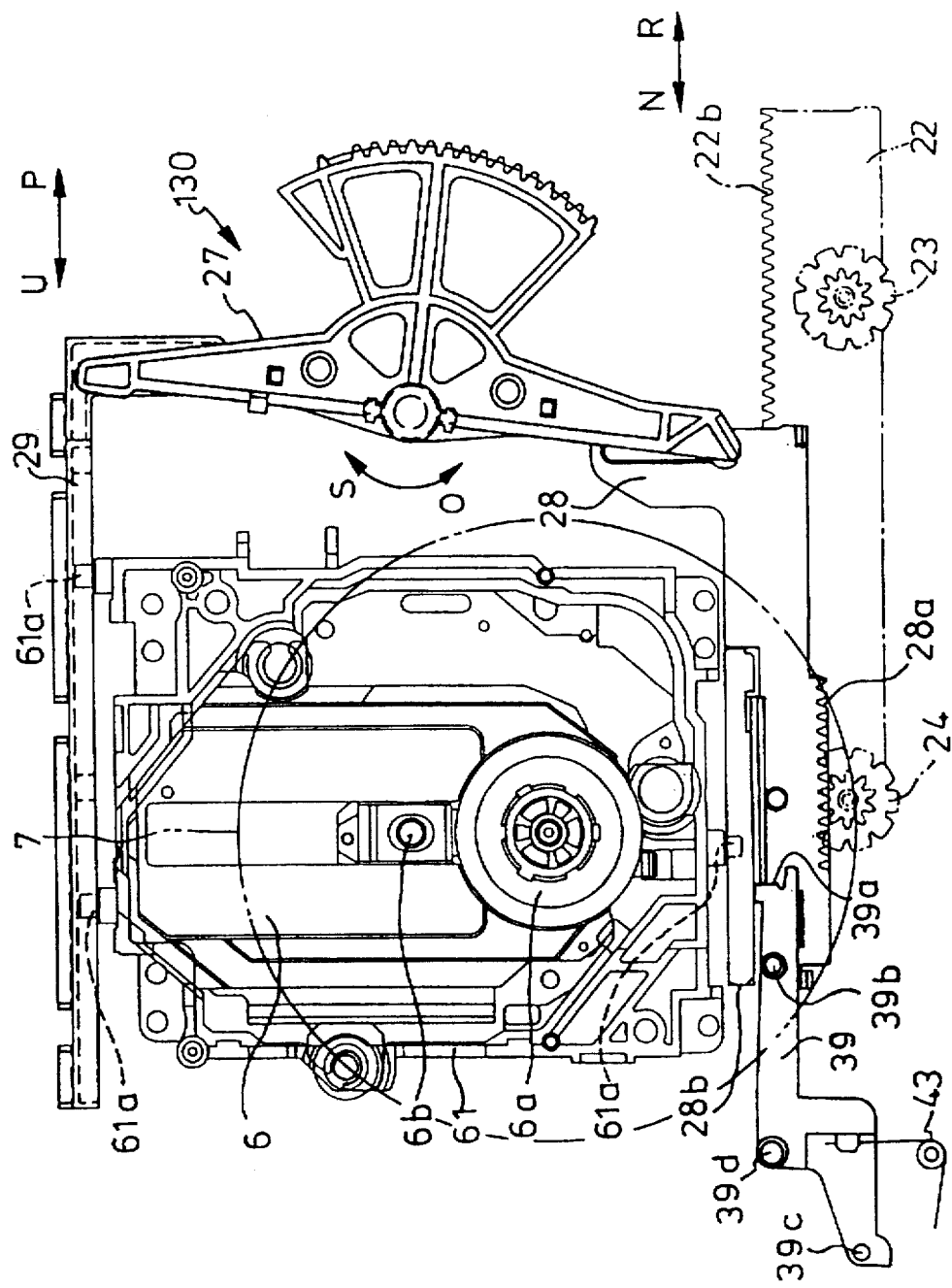
FIG. 18 is an operation diagram showing the tray elevation unit, etc. in the reproduction state in the disk loading apparatus of the first embodiment.
Figure 19:
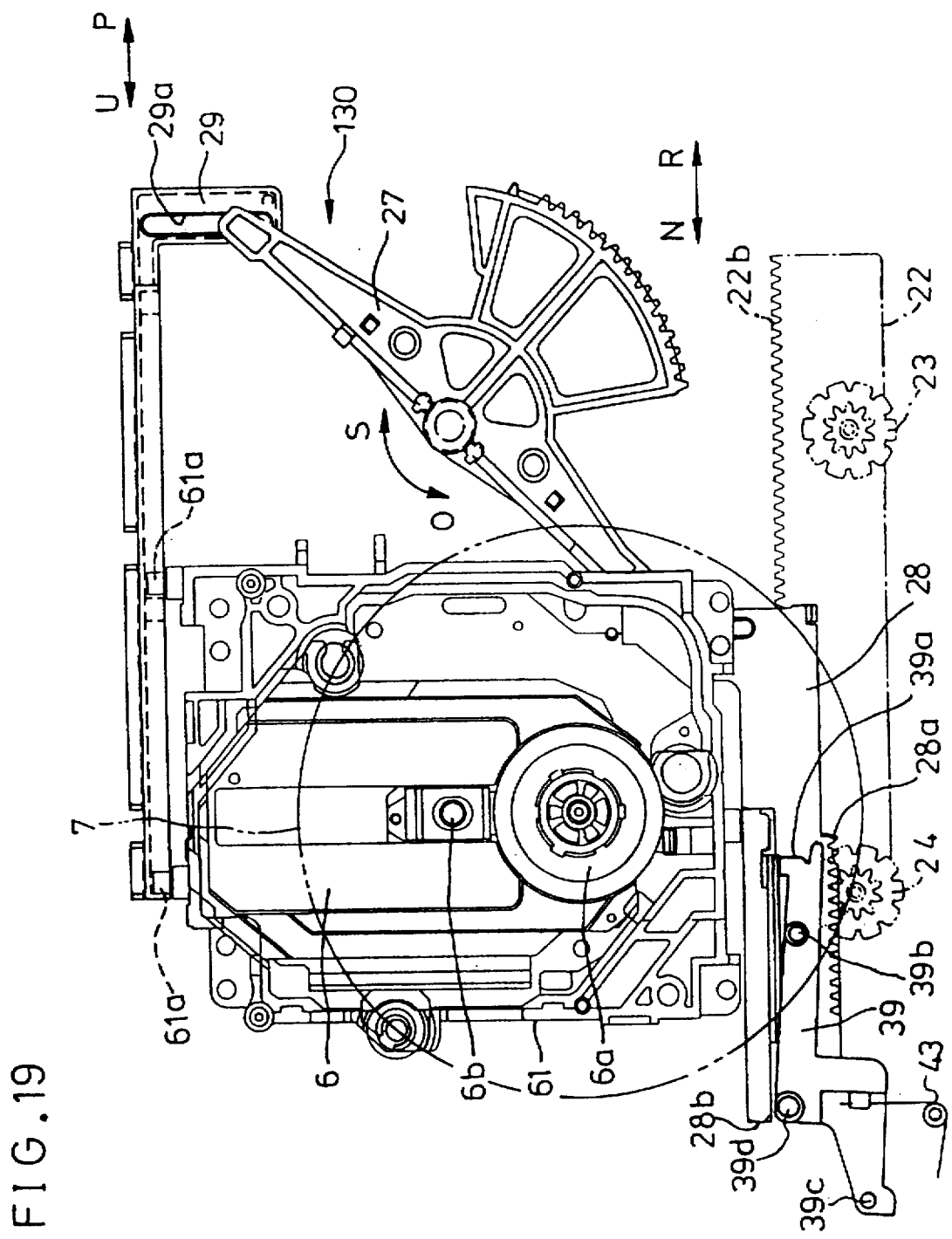
FIG. 19 is an operation diagram showing the tray elevation unit, etc. in the tray return waiting state in the disk loading apparatus of the first embodiment.

FIGS. 17 to 19 are plan views of the tray elevation unit 130 and the reproduction unit 140. FIG. 17 shows the reproduction waiting state, FIG. 18 the reproduction state, and FIG. 19 the tray return waiting state.

In the reproduction waiting state shown in FIG. 17, the operation of the tray elevation unit 130 causes the turn table 6a of the reproduction device 6 to enter the opening 55 of the tray 1 while the turn table is raised, and the disk 7 is placed on the turn table 6a. At this time, the disk 7 is raised from the tray 1, and held by the above-described operation of the clamp unit 310 to the reproduction state in which the rotation is enabled.

The reproduction device 6 in the first embodiment is configured so that the optical pickup 6b conducts the reproduction operation on the disk 7 while being moved in a radial direction of the disk 7 which is in the reproduction state.

The tray 1 wherein the reproduction of the disk 7 is terminated is elevated to the tray return waiting position which is higher than the reproduction position, by the movement of the first slide plate 28. The tray 1 which is elevated to the tray return waiting position is supported by the supporters 46a (FIG. 11) projected from the inside of the cover frame 46, and pushed by the carrier arm 14 as a result of the returning operation of the carrier 12. Then the tray 1 is returned to the tray storage section 53.

[Locking Operation of the Lock Lever 39]

As shown in FIG. 17, the lock lever 39 is disposed in the vicinity of the rear end of the first slide plate 28. In the lock lever 39, formed are a locking portion 39a which engages with the first slide plate 28, a pin portion 39b which engages with the carrier 12, and an abutting portion 39c which abuts against the carrier 12. The lock lever 39 is attached to the base frame 40 so as to be rotatable about a shaft 39d. The lock lever 39 is always urged by a lock lever spring 43 so as to be rotated counterclockwise.

During the period when the carrier 12 is shifted by the driving rack plate 22 from the tray storage state to the reproduction waiting state, the lock lever 39 engages with the first slide plate 28 so as to inhibit the movement of the plate. When the carrier 12 reaches the reproduction waiting state, the abutting portion 39c of the lock lever 39 is pushed by the carrier 12 so that the lock lever 39 is rotated clockwise. This rotation of the lock lever 39 causes the first slide plate 28 to enter a sliding movement enabled state, and the pin portion 39b of the lock lever 39 to engage with the carrier 12, thereby inhibiting the carrier 12 from being further moved.

After the reproduction waiting state, the carrier 12 is locked but the driving rack plate 22 continues the driving operation. Consequently, the first slide plate 28 is driven to the reproduction state. At this time, the reproduction device 6 is upward moved from the reproduction waiting state and enters the reproduction enabled state (FIG. 18) in which reproduction is enabled.

After reproduction is terminated, the driving rack plate 22 is driven so that the tray elevation unit 130 is moved to the tray return waiting state (FIG. 19).

[Tray Transferring Operation of the Carrier Arm 14]

Figure 20:
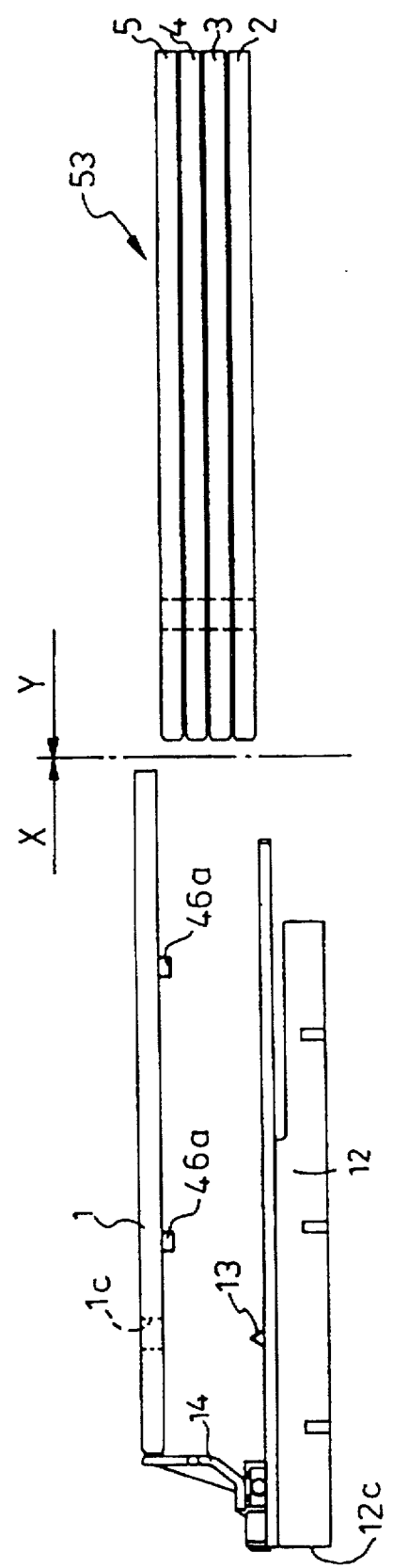
FIG. 20 is an operation diagram showing a carrier arm, etc. in the tray return waiting state in the disk loading apparatus of the first embodiment.
Figure 21:
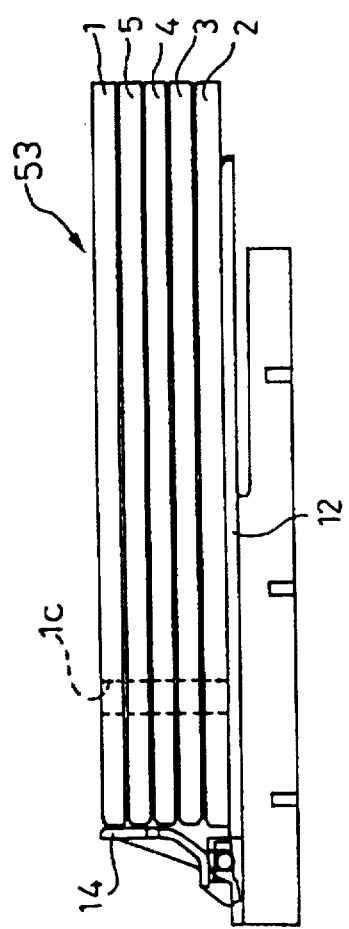
FIG. 21 is an operation diagram showing the carrier arm, etc. in the tray storage state in the disk loading apparatus of the first embodiment.
Figure 22:
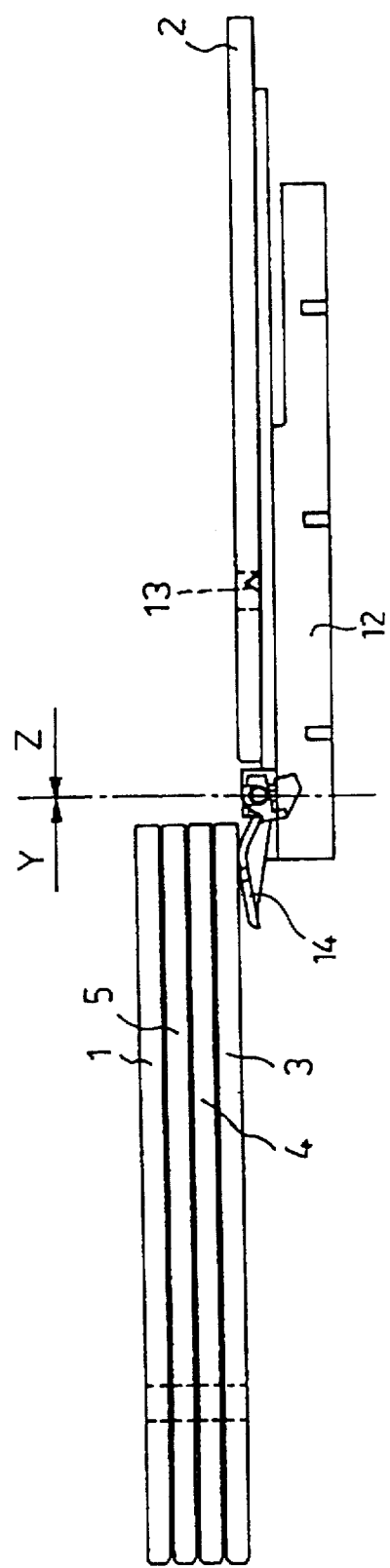
FIG. 22 is an operation diagram showing the carrier arm, etc. in the tray ejection state in the disk loading apparatus of the first embodiment.

FIGS. 20 to 22 are side views illustrating the operation of the carrier arm 14 and showing the trays 1, 2, 3, 4, and 5, the carrier 12, and the carrier arm 14. FIG. 20 shows the tray return waiting state, FIG. 21 the tray storage state, and FIG. 22 the tray ejection state.

In the tray return waiting state shown in FIG. 20, the driving rack plate 22 is slidingly moved from the reproduction region X to the tray storage section 53 which is the nonreproduction region Y, while the trays 1 is supported by the supporters 46a (FIG. 11). This causes the carrier 12 which interlocks with the driving rack plate 22 moves the tray 1 from the reproduction region X to the tray storage section 53 which is the nonreproduction region Y. At this time, the carrier arm 14 which is upward projected from the upper face of the carrier 12 engages with the rear end of the tray 1 and pushes the tray 1 toward the tray storage section 53. The tray 1 pushed by the carrier arm 14 is slidingly moved on the supporters 46a so as to be guided onto the trays 2, 3, 4, and 5 which are stacked in the tray storage section 53.

In the tray storage state shown in FIG. 21, the tray ejection frame 20 interlocking with the carrier 12 is shifted to the tray ejection state which is the open region. At this time, as shown in FIG. 22, the carrier 12 moves the tray 2 at the lowest position to the tray ejection position, and the carrier arm 14 abuts against the edges of the stacked trays 3, 4, 5, and 1 so as to be rotated. The carrier arm 14 is slidingly moved on the lower face of the tray 3 at the lowest position.

The carrier arm 14 in the tray return waiting state shown in FIG. 20 engages with the tray ejection frame 20 so as not to be rotated. On the other hand, an opening is formed in the tray ejection frame 20, in order to enable the carrier arm 14 to be rotated as shown in FIG. 22 when the carrier 12 is slidingly moved on the tray ejection frame 20 and is then situated in the tray storage section 53 which is at the front end of the tray ejection frame 20.

[Cushion Operation of the Cushion Rack 25]

Referring to FIG. 5, the cushion rack 25 which is slidably supported by the driving rack plate 22 is situated so as to overlap with the toothless portion 22c which is formed between the first and second racks 22a and 22b of the driving rack plate 22. In other words, the pitch line of the cushion rack 25 overlaps with the pitch lines of the first and second racks 22a and 22b of the driving rack plate 22. Consequently, each of the racks meshes with the driving gear 37. The cushion rack 25 can be reciprocally moved in a predetermined distance with respect to the driving rack plate 22 by the driving gear 37.

Since the cushion rack 25 is disposed in the driving rack plate 22 as described above, the driving gear 37 for transmitting the driving force of the tray driving motor 34 meshes with the second rack 22b of the driving rack plate 22, so that the driving rack plate 22 is transferred by a predetermined distance. When the driving gear 37 then reaches the toothless portion 22c of the driving rack plate 22, the driving rack plate 22 is stopped. However, the driving gear 37 meshes with the rack 25b of the cushion rack 25, so that only the cushion rack 25 is moved. In the configuration in which the cushion rack 25 is disposed in the driving rack plate 22 as described above, even when the number of rotations of the driving gear 37 is made somewhat larger than a predetermined one by the inertial force of the gear, the driving rack plate 22 can be accurately stopped at a predetermined position.

When the driving gear 37 is further rotated and the cushion rack 25 is further moved, the front end of the cushion rack 25 abuts against the frame lock lever 16, thereby setting the tray ejection frame 20 to the tray ejection enabled state. After the cushion rack 25 is moved by a predetermined distance, the driving gear 37 meshes with the first rack 22a of the driving rack plate 22, and the carrier 12 is set together with the tray ejection frame 20 to the tray ejection state.

[Locking Operation the Frame Lock Lever 16]

As shown in FIG. 5, the tray ejection frame 20 is provided with the frame lock lever 16 which secures the tray ejection frame 20 to the base frame 40. The frame lock lever 16 is supported by the tray ejection frame 20 so as to be rotatable about a pin 16a. The frame lock lever 16 is urged by a torsion coil spring 17 so as to be rotated in a clockwise direction as seen from the top. A lock pin 16b which is downward projected is formed at the front end of the frame lock lever 16.

When the tray ejection frame 20 is housed in the body of the apparatus, the lock pin 16b passes through an opening 20f of the tray ejection frame 20 and engages with the base frame 40. Consequently, the tray ejection frame 20 is locked by the base frame 40.

A lever 16c is formed in the frame lock lever 16. When the tray storage state is shifted to the tray ejection state, the lever 16c is pushed by a front portion 25a of the cushion rack 25 which is driven by the driving gear 37. As a result, the frame lock lever 16 is rotated counterclockwise so as to establish a state in which the tray ejection frame 20 can be driven to the tray ejection state.

[Locking Operation of the Carrier Lock Lever 18]

As shown in FIG. 5, the carrier lock lever 18 is disposed in the vicinity of the front side of the tray ejection frame 20. The carrier lock lever 18 is supported by the tray ejection frame 20 so as to be rotatable about the pin 18a. The carrier lock lever 18 is urged by a torsion coil spring 19 in a counterclockwise direction as seen from the top. A lever 18c which is downward projected is formed at the front end of the carrier lock lever 18. When the tray ejection frame 20 is housed in the body of the apparatus, the lever 18c passes through an opening 20g formed in the tray ejection frame 20 and abuts against a lever receiving portion 40g of the base frame 40 so as to be rotated clockwise. At this time, a lock pin 18b which is upward projected from the carrier lock lever 18 is rotated clockwise. Therefore, the lock pin does not engage with a hook portion 12d formed in the carrier 12, and the carrier 12 is in the state in which the carrier can be moved on the tray ejection frame 20 in the longitudinal directions.

When the tray 1 on the tray ejection frame 20 is to be transferred from the tray storage state to the open region which is the tray ejection state, the meshing state between the driving gear 37 and the cushion rack 25 is terminated and the driving gear 37 meshes with the first rack 22a. Consequently, the carrier 12 is driven in the tray ejecting direction, and the tray ejection frame 20 is pushed by the front end of the carrier 12 so as to be driven toward the front side of the apparatus. As a result, the contact between the lever 18c of the carrier lock lever 18 and the lever receiving portion 40g of the base frame 40 is canceled and the lock pin 18b of the carrier lock lever 18 engages with the hook portion 12d formed in the carrier 12. Accordingly, the carrier 12 is connected to the tray ejection frame 20 and the tray ejection frame 20 enters a state in which the tray 1 can be transferred to the tray ejection position with interlocking with the movement of the carrier 12.

In the first embodiment, when a tray in the tray ejection state is to be housed in the tray storage section 53, the lock pin 18b of the carrier lock lever 18 is connected to the hook portion 12d of the carrier 12. When the driving rack plate 22 moves the carrier 12 toward the rear side of the apparatus, i.e., in the housing direction, therefore, the tray ejection frame 20 is shifted to the tray storage state.

[Tray Driving Operation of the Disk Loading Apparatus]

The operation of the whole of the thus configured disk loading apparatus of the first embodiment will be described with reference to the figures.

[From the Storage State to the Reproduction Waiting State]

The operation of transferring the disk 7 on the tray 1 at the lowest position of the tray storage section 53 will be described. FIG. 12 is a plan view showing the tray driving mechanism in the tray storage state in the disk loading apparatus of the first embodiment.

In the tray storage state of the disk 7 shown in FIG. 12, when the disk loading apparatus of the first embodiment receives an instruction of reproducing the disk 7, the tray driving motor 34 rotates in the direction of the arrow H. The driving force of the motor is transmitted via the reduction gear section 120 having the motor pulley 30, the belt 31, the pulley gear 32, and the intermediate gear 33, so that the driving gear 37 is rotated in the direction of the arrow I. Consequently, the driving rack plate 22 is moved in the direction of the arrow J and the second speed increasing gear means 24 is rotated in the direction of the arrow K, thereby driving the carrier 12 in the direction of the arrow J. At this time, the small gears 23b and 24b of the first and second speed increasing gear means 23 and 24 mesh with the base frame rack 40c formed on the base frame 40.

When the carrier 12 is driven in the direction of the arrow J, the hook 13 attached to the carrier 12 engages with the hook receiving portion 1c of the tray 1 at the lowest position. Accordingly, the tray 1 at the lowest position among the trays stacked in the tray storage section 53 is transferred together with the disk 7 to the position of the reproduction waiting state.

[From the Reproduction Waiting State to the Reproduction State]

Immediately before the carrier 12 reaches the position of the reproduction waiting state, a lock operation portion 12c which is formed at the rear end of the carrier 12 pushes the abutting portion 39c of the lock lever 39 which engages with the first slide plate 28, thereby rotating the lock lever 39. As a result, the locking state of the first slide plate 28 is canceled (FIGS. 13 and 17) and the carrier 12 is secured to the position of the reproduction waiting state. In this way, the carrier 12 which meshes with the large gear 24a of the second speed increasing gear means 24 is secured to the position of the reproduction waiting state, and the small gear 24b meshes with the first slide plate 28 which is in the movable state. Consequently, the second speed increasing gear means 24 is rotated inversely or in the direction of the arrow L (FIG. 13), with the result that the first slide plate 28 is driven in the direction of the arrow J which is the same as the sliding direction of the driving rack plate 22.

As described with reference to FIG. 10, when the first slide plate 28 is moved from the reproduction waiting state to the reproduction state (in the direction of the arrow N in FIG. 10), the converting lever 27 is rotated in the direction of the arrow S in FIG. 10 because the first pin 27b of the converting lever 27 engages with the slot 28d of the first slide plate 28. This causes the second slide plate 29 engaging with the converting lever 27 to be slidingly moved in the direction of the arrow P. In the chassis 61 which holds the reproduction device 6, the projections 61a slidably engage with the cam groove 28c of the first slide plate 28 and the cam grooves 29b of the second slide plate 29. Therefore, the chassis 61 is elevated along the shape of the cam grooves 28c and 29b. Specifically, the projections 61a are slidingly moved from the horizontal portions 28f and 29c at the lower level to the horizontal portions 28g and 29d at the middle level, so that the reproduction device 6 is elevated together with the tray 1 to the position of the reproduction state.

On the way of shifting the tray 1 from the tray storage state to the reproduction waiting state, the receiving portion 51b (FIG. 4) of the clamp lever 51 is pushed by the rear edge of the tray 1, and the clamp lever 51 is rotated in the direction of pressing the upper face of the disk 7 on the tray 1. As a result, in the disk loading apparatus of the first embodiment, the disk 7 on the tray 1 is secured in the reproduction state onto the turn table 6a of the reproduction device 6 by the clamp unit 310, thereby attaining the reproduction enabled state.

[From the Reproduction State to the Tray Return Waiting State]

In the reproduction state in which the tray 1 is at the reproduction position as shown in FIG. 14, when the disk loading apparatus receives an instruction of reproducing the disk 7 on the next tray or the tray 2 at the lowest position of the tray storage section 53, the driving rack plate 22 starts the movement in the direction of the arrow J which is the same as that of moving the tray 1 to the reproduction position. The movement of the driving rack plate 22 in the direction of the arrow J causes the first slide plate 28 to be moved similarly in the direction of the arrow J. At this time, the projections 61a of the chassis 61 which holds the reproduction device 6 are upward moved along the shape of the cam groove 28c of the first slide plate 28 and the cam grooves 29b of the second slide plate 29. Specifically, the projections 61a are slidingly elevated from the horizontal portions 28g and 29d at the middle level to the horizontal portions 28h and 29e at the higher level, with the result that the tray 1 is elevated together with the reproduction device 6 in the direction of the arrow Q (FIG. 10) to the tray return waiting position.

When the tray 1 is transferred to the tray return waiting position, the tray 1 pushes the supporters 46a disposed on the cover frame 46 in the direction of the arrow M and overrides them as shown in FIG. 11. As a result, the edge 1d of the tray 1 is supported by the upper faces of the supporters 46a so that the tray 1 is held at the upper position of the reproduction region which is the tray return waiting position.

[From the Tray Return Waiting State to the Storage State]

Next the driving rack plate 22 shown in FIG. 15 is moved inversely or in the direction of the arrow T, whereby the first slide plate 28 is moved similarly in the direction of the arrow T. Accordingly, the converting lever 27 is rotated counterclockwise (in the direction of the arrow O in FIG. 10) and the second slide plate 29 is slidingly moved in the direction of the arrow U (FIG. 10). At this time, the projections 61a of the chassis 61 are slidingly downward moved along the cam grooves 28c and 29b, pass through the horizontal portions 28g and 29d at the middle level, and finally reach the horizontal portions 28f and 29c at the lower level. In this state, the tray 1 is supported to the tray return waiting position by the supporters 46a, and hence only the reproduction device 6 and the chassis 61 are lowered.

The driving rack plate 22 further continues the movement toward the front side of the apparatus. Therefore, the first slide plate 28 is returned to the reproduction waiting position and the locking portion 39a of the lock lever 39 engages with the end portion of the first slide plate 28, resulting in that the first slide plate 28 is locked (FIG. 17). At this time, the lock lever 39 disengages from the carrier 12 so that the carrier 12 is set to the sliding movement enabled state. At the same time, the slide plate rack 28a of the first slide plate 28 is connected to the base frame rack 40c of the base frame 40. The guiding operation is conducted while the meshing state of the small gear 24b of the second speed increasing gear means 24 which meshes with the slide plate rack 28a is taken over by the base frame rack 40c.

After the first slide plate 28 is connected to the base frame rack 40c, the driving rack plate 22 continues the movement. Consequently, the first and second speed increasing gear means 23 and 24 are inversely rotated so that the carrier 12 is moved toward the front side of the apparatus (in the direction of the arrow T in FIG. 13). During the movement of the carrier 12 toward the front side, the tray 1 at the tray return waiting position which is supported by the supporters 46a is pushed by the carrier arm 14 disposed on the carrier 12, so as to be slidingly moved on the upper faces of the supporters 46a. Then the tray 1 is moved into the tray storage section 53, whereby the tray 1 is stacked on the tray at the highest position of the tray storage section 53. At this time, the hook 13 attached to the carrier 12 is slidingly moved on the lower face of the tray 2 at the lowest position and then engages with the hook receiving portion of the lower face of the tray 2.

As described above, the tray 1 in the disk loading apparatus is moved from the tray storage position at the lowest position of the tray storage section 53 to the reproduction position. After reproduction is terminated, the tray 1 is elevated to the tray return waiting position and then guided by the supporters 46a so as to be returned onto the tray 5 at the highest position among the trays which are stacked in the tray storage section 53. The tray circulating operation is conducted in this way so that the disks 7 on the trays which are stacked in the tray storage section 53 are sequentially reproduced in the disk loading apparatus.

[From the Tray Storage State to the Tray Ejection State]

Next the operation of transferring the disk 7 in the tray storage state to the tray ejection state in which the disk is to be ejected from the body of the apparatus will be described.

When the disk loading apparatus of the first embodiment receives an instruction of ejecting the disk 7 in the tray storage state to the position of the tray ejection state, the above-described tray circulating operation is conducted until the designated disk 7 reaches the lowest position of the tray storage section 53. When the tray 1 on which the selected disk 7 is placed reaches the lowest position, the tray 1 engages with the hook 13 of the carrier 12 and placed on the tray ejection frame 20.

In the tray storage state (FIG. 12), the driving gear 37 which has driven the driving rack plate 22 is at the position of the toothless portion 22c of the driving rack plate 22. At this time, the driving gear 37 meshes with the cushion rack 25. Therefore, the driving rack plate 22 and the carrier 12 are temporarily stopped but the cushion rack 25 meshing with the driving gear 37 is driven toward the front side of the apparatus (in the direction of the arrow T in FIG. 12). Consequently, the cushion rack 25 pushes the frame lock lever 16 so as to move it, whereby the tray ejection frame 20 which is locked by the base frame 40 is set to the movable state.

When the cushion rack 25 is further forward moved by a predetermined distance as a result of the rotation of the driving gear 37, the cushion rack 25 is secured to the driving rack plate 22 and the rotating operation of the driving gear 37 is taken over by the first rack 22a of the driving rack plate 22. At this time, the lock pin 18b of the carrier lock lever 18 engages with the hook portion 12d of the carrier 12 so that the carrier 12 is connected to the tray ejection frame 20. In this way, the driving rack plate 22 which has been stopped is further moved toward the front side of the apparatus (in the direction of the arrow T in FIG. 16). Then the carrier 12 moves the disk 7 on the tray 1 and the tray ejection frame 20 to the tray ejection position.

In the tray ejection state (FIG. 16) of the disk 7, when the disk loading apparatus receives an instruction of reproducing the disk 7, the apparatus conducts the operation which is opposite to the above-described tray driving operation in the direction from the reproduction state to the tray ejection state. Specifically, in the disk loading apparatus, the driving rack plate 22 is moved in the direction of the arrow J (FIG. 16). Since the carrier 12 interlocking with the driving rack plate 22 is connected to the tray ejection frame 20 via the carrier lock lever 18, the carrier 12 moves the disk 7 on the tray 1 together with the driving rack plate 22 in the disk housing direction. The housed disk 7 passes below the tray at the lowest position in the tray storage section 53 as described above and is then driven to the reproduction position by way of the reproduction waiting state.

[From the Reproduction State to the Tray Ejection State]

Next the tray transferring operation in which the disk 7 on the tray 1 in the reproduction state is shifted to the tray ejection state will be described.

When the disk loading apparatus of the first embodiment receives an instruction of ejecting the disk 7 at the reproduction position to the tray ejection position, the driving rack plate 22 is driven toward the front side of the apparatus (in the direction of the arrow T in FIG. 14), and the first slide plate 28 is moved in the same direction. Referring to FIG. 10, when the first slide plate 28 is moved in the direction of the arrow R, the converting lever 27 is rotated in the direction of the arrow O and the second slide plate 29 is moved in the direction of the arrow U. As a result, the reproduction device 6 is lowered to the reproduction waiting state and the disk 7 is placed on the tray 1 supported by the slide portions 20a of the tray ejection frame 20.

The driving rack plate 22 further continues the movement toward the front side of the apparatus so that the first slide plate 28 is secured to the reproduction waiting position and the carrier 12 is set to the sliding movement enabled state. At this time, the first and second speed increasing gear means 23 and 24 are inversely rotated so that the carrier 12 is driven toward the front side of the apparatus (in the direction of the arrow T in FIG. 13). Since the hook 13 formed on the carrier 12 engages with the hook receiving portion 1c of the tray 1, the tray 1 is slidingly moved together with the carrier 12 on the slide portions 20a of the tray ejection frame 20 and then moved to the tray storage section 53. Consequently, the tray 1 passes below the tray 2 at the lowest position among the stacked trays in the tray storage section 53 and is then shifted to the tray ejection state.

The operation of moving the tray 1 so as to pass below the tray 2 to enter the tray ejection state is conducted in the same manner as the tray ejecting operation in the above-described tray driving operation of shifting from the tray storage state to the tray ejection state.

As described above, the disk loading apparatus of the first embodiment is configured such that, when the disk 7 at the reproduction position is to be moved to the tray ejection position, the tray 1 is directly shifted from the reproduction state to the tray ejection state, thereby enabling the disk 7 to be exchanged with another disk and transferring the exchanged disk directly to the reproduction position.

In the disk loading apparatus of the first embodiment, the trays stacked in the tray storage section 53 are situated in the front side of the apparatus. Therefore, the apparatus may be modified so as to have a configuration in which the exchange of a desired disk is further facilitated. Namely, a manually-operated door is formed in the front of the apparatus so that the trays in the tray storage section 53 are arbitrarily pulled out even in a period when reproduction is performed.

<Second Embodiment>

Hereinafter, a second embodiment of the disk loading apparatus of the present invention will be described in detail with reference to FIGS. 23 to 37. In the second embodiment, components which are similar in configuration and function as those of the first embodiment are designated by the same reference numerals and their description is omitted.

In the same manner as the first embodiment, the disk loading apparatus of the second embodiment comprises the base unit 100 shown in FIG. 3, and the tray ejection unit 200 shown in FIG. 5, and is configured so that disks on the trays which are stacked in the tray storage section 53 are circulated so as to be sequentially reproduced.

Figure 23:
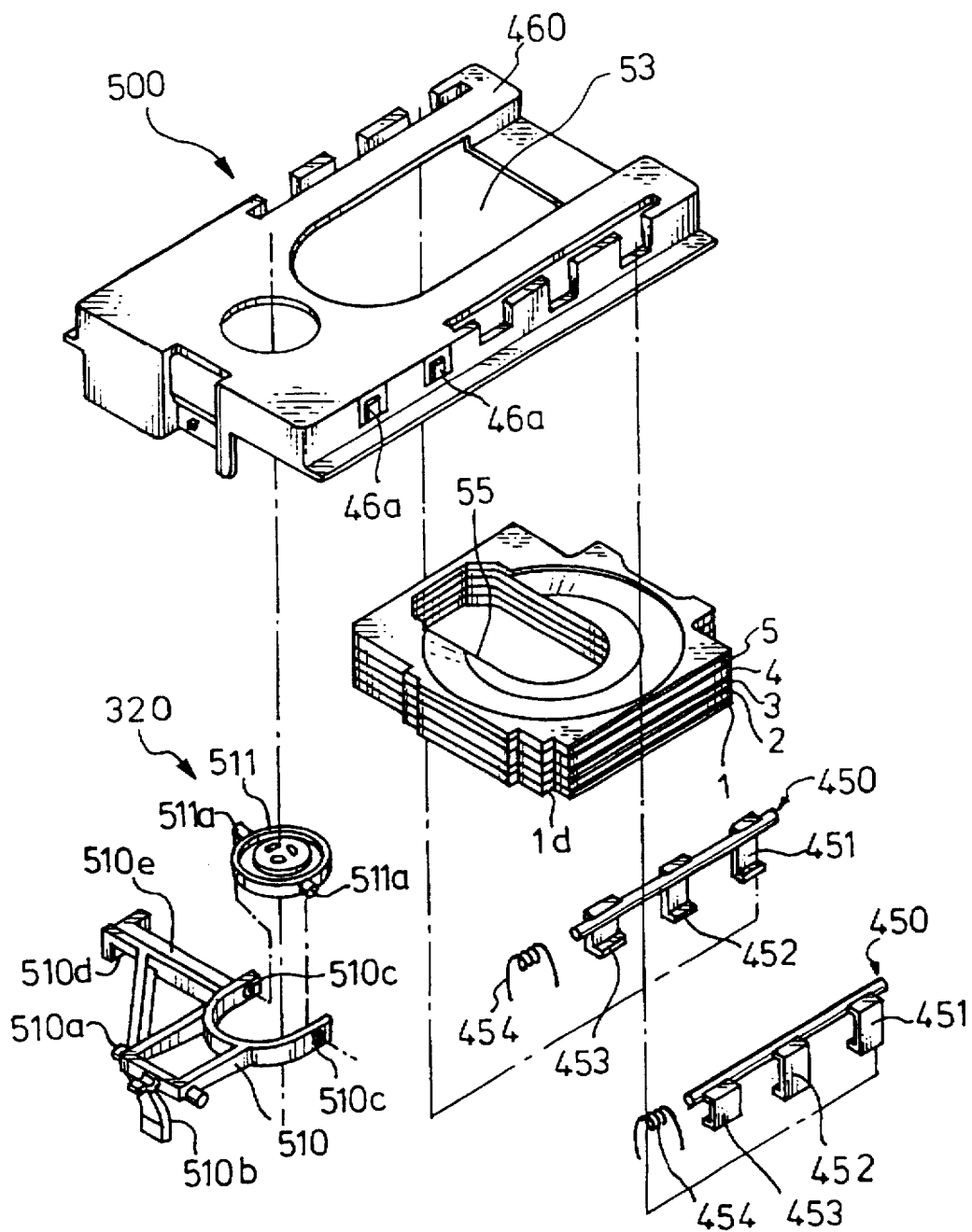
FIG. 23 is an exploded perspective view showing a cover unit 500 in a disk loading apparatus of a second embodiment.

In the disk loading apparatus of the second embodiment, a cover unit 500 shown in FIG. 23 is configured in a manner different from that of the first embodiment. Hereinafter, the cover unit 500 will be described.

[Configuration of the Cover Unit 500]

FIG. 23 is an exploded perspective view showing the cover unit 500 in the disk loading apparatus of the second embodiment.

The cover unit 500 shown in FIG. 23 is disposed above the base unit 100 having the driving mechanism and houses the plural stacked trays 1, 2, 3, 4, and 5.

In FIG. 23, hook portions 450 which serve as the storage means are disposed on the inner side faces of a cover frame 460 covering the base unit 100, respectively. Each of the hook portions 450 has first and second hooks 451 and 452. The hook portions 450 engagingly hold the tray 2 at the lowest position among the stacked trays 2, 3, 4, and 5. The hook portions 450 are urged by torsion coil springs 454 so as to be rotated in opposite directions, and sandwich a tray placed between the hook portions 450 so as to hold the tray. When the tray 2 at the lowest position is to be moved to the reproduction position or the like, the first and second hooks 451 and 452 are pushed in a direction of widening the hooks, so that the engagement of the tray 2 and the hook portions 450 is detached.

In each of the hook portions 450, a cam portion 453 is fixed so as to be coaxial with the first and second hooks 451 and 452. The cam portion 453 is disposed so as to engage with a tray in the tray return waiting state.

In the second embodiment, the region where the stacked trays are supported by the hook portions 450 is the tray storage section 53. The tray storage section 53 is disposed on the tray ejection side (front side) of the cover frame 460.

Plural (four in the second embodiment) trays 2, 3, 4, and 5 are stored in a stacked manner in the tray storage section 53. The tray 1 which is directly below the tray 2 at the lowest position in the tray storage section 53 is placed on the tray ejection frame 20 which is in the tray storage state and slidably supported by the base frame 40.

Under the state in which the hook portions 450 disengage from the tray, the trays 2, 3, 4, and 5 of the tray storage section 53 are placed by means of their own weight on the tray 1 at the lowest position. In this state, projections (not shown) formed inside the cover frame 460 engage with the trays. Therefore, the stacked trays 1, 2, 3, 4, and 5 can be moved only in vertical directions and are inhibited from being moved in the longitudinal directions.

As shown in FIG. 23, a clamp unit 320 is disposed on the back face of the cover frame 460. The clamp unit 320 cooperates with the turn table 6a of the reproduction device 6 so as to clamp a disk placed on the reproduction device 6, thereby securing the disk to the reproduction position.

A clamp lever 510 of the clamp unit 320 disposed inside the cover frame 460 is supported by the cover frame 460 so as to be rotatable about a pin portion 510a. The clamp lever 510 is downward rotated by its gravity. A receiving portion 510b is hangingly projected from the back face of the clamp lever 510. The receiving portion 510b abuts against a rib 460a (FIG. 24) projected from the inner face of the back of the cover frame 460, thereby restricting the lower position of the clamp lever 510. The clamp lever 510 is provided with two supporting portions 510c. Clamper pins 511a disposed at the sides of a clamper 511 are inserted into holes of the supporting portions 510c, respectively, thereby rotatably supporting the clamper 511. In the damper 511, a magnet for securing a disk is sandwiched between fixing plates.

As shown in FIG. 23, an arm portion 510e is formed on the side face of one of the supporting portions 510c of the clamp lever 510. The arm portion 510e has an abutting portion 510d which is downward projected. When a tray is elevated from the reproduction waiting position to the reproduction position, the abutting portion 510d makes contacts a part of the tray so as to be lifted together with the clamp lever 510.

In the same manner as the first embodiment, the supporters 46a are disposed on the side faces of the cover frame 460. The supporters 46a are used for holding a tray which is lifted to the highest level in the reproduction region, i.e., the tray return waiting position, to that position.

[Tray Transferring Operation from the Tray Ejection State to the Reproduction State]

Next the tray transferring operation in the disk loading apparatus of the second embodiment will be described with reference to the figures. FIGS. 24 to 27 are side views showing the main internal mechanism in the disk loading apparatus of the second embodiment and operation states in the tray transferring operation.

Figure 24:
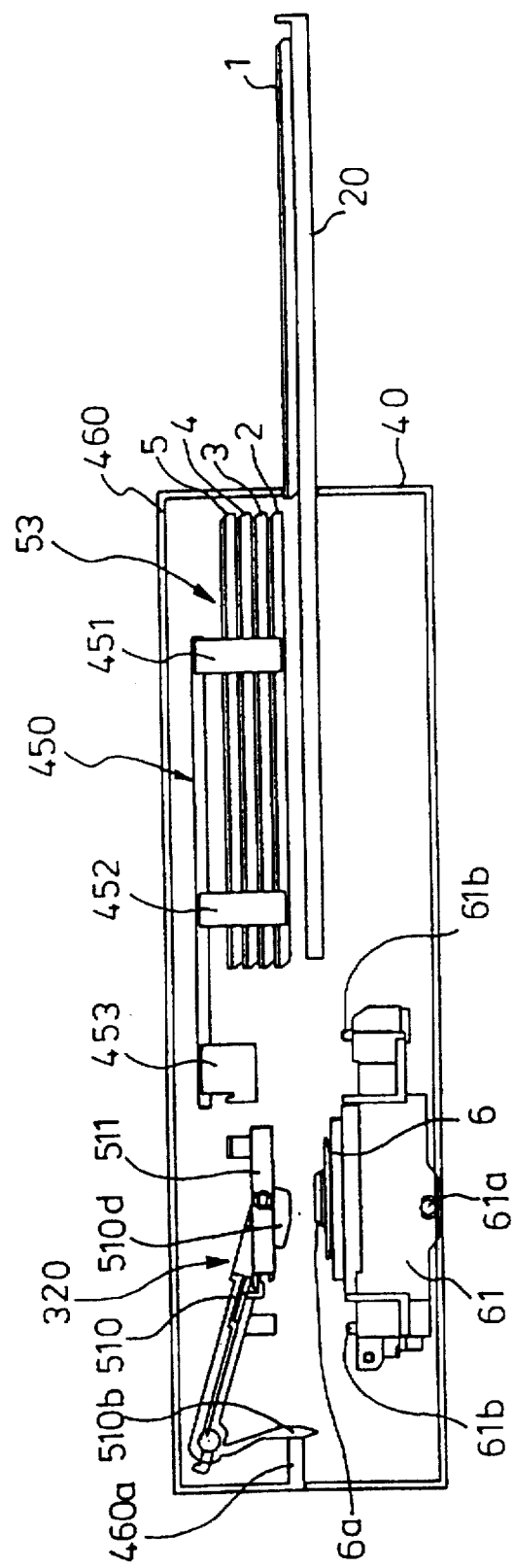
FIG. 24 is a side view showing the main internal mechanism in the disk loading apparatus of the second embodiment.

FIG. 24 is a side view showing the tray ejection state in which the tray ejection frame 20 is pulled out. In the tray ejection state shown in FIG. 24, a disk which is to be reproduced is loaded onto the tray 1 on the tray ejection frame 20, or a disk on the tray 1 is exchanged with another one. In the tray ejection state, the other trays 2, 3, 4, and 5 in the disk loading apparatus are held to the tray storage section 53 by the hook portions 450 which are disposed on the side faces of the cover frame 460 so as to be opposed to each other. The method of holding the trays 2, 3, 4, and 5 by means of the hook portions 450 will be described in detail later.

Figure 25:
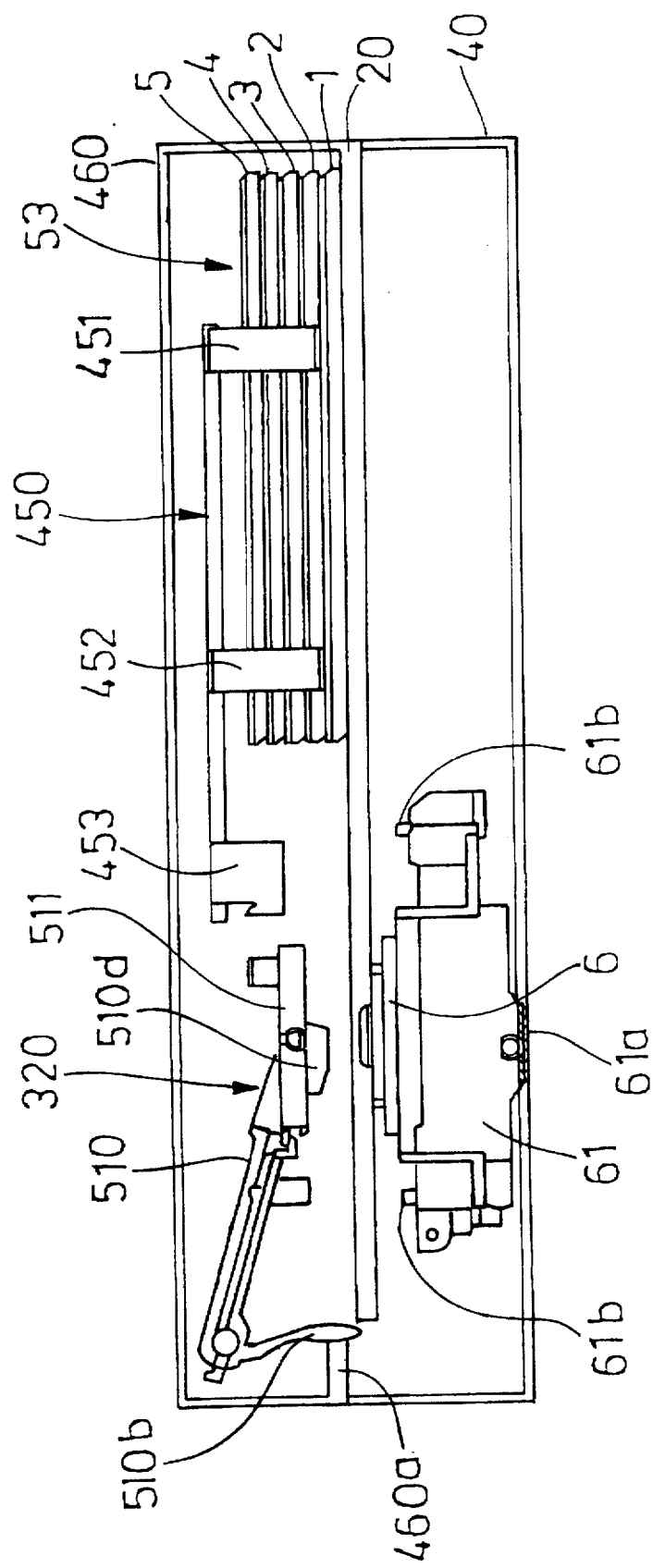
FIG. 25 is a side view showing the main internal mechanism in the disk loading apparatus of the second embodiment.

FIG. 25 is a side view showing the tray storage state in which the tray ejection frame 20 is housed in the disk loading apparatus. This state is substantially identical with the tray storage state which has been described in the first embodiment with reference to A of FIG. 7. In the tray storage state, the tray 1 on the tray ejection frame 20 is situated directly below the trays 2, 3, 4, and 5 which are stored in a stacked manner in the tray storage section 53.

Figure 26:
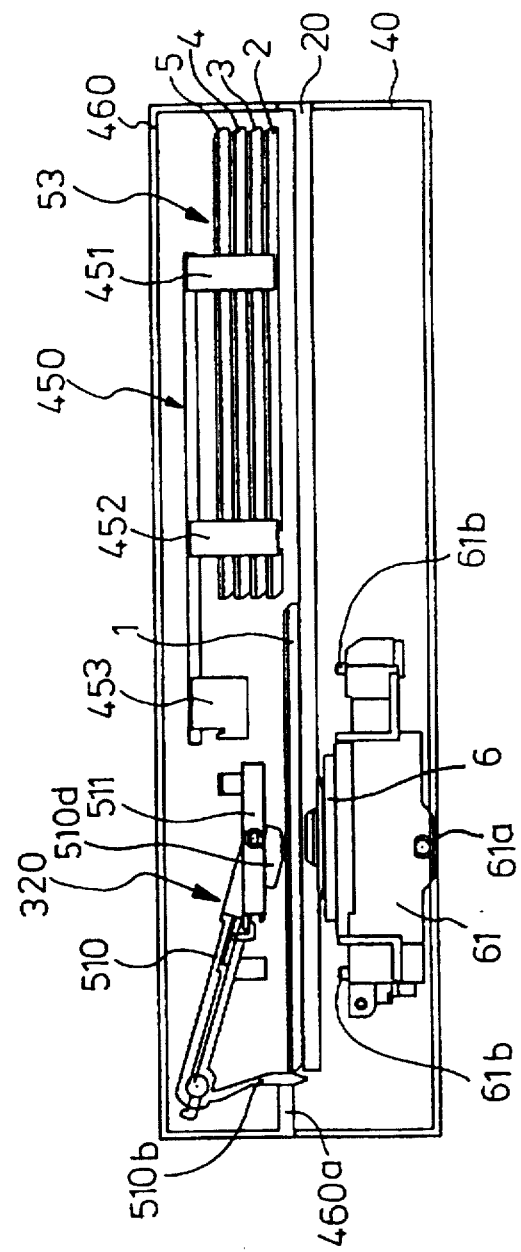
FIG. 26 is a side view showing the main internal mechanism in the disk loading apparatus of the second embodiment.

FIG. 26 is a side view showing the reproduction waiting state in which the tray 1 is transported to a position above the reproduction device 6. This state is substantially identical with the reproduction waiting state which has been described in the first embodiment with reference to B of FIG. 7.

Figure 27:
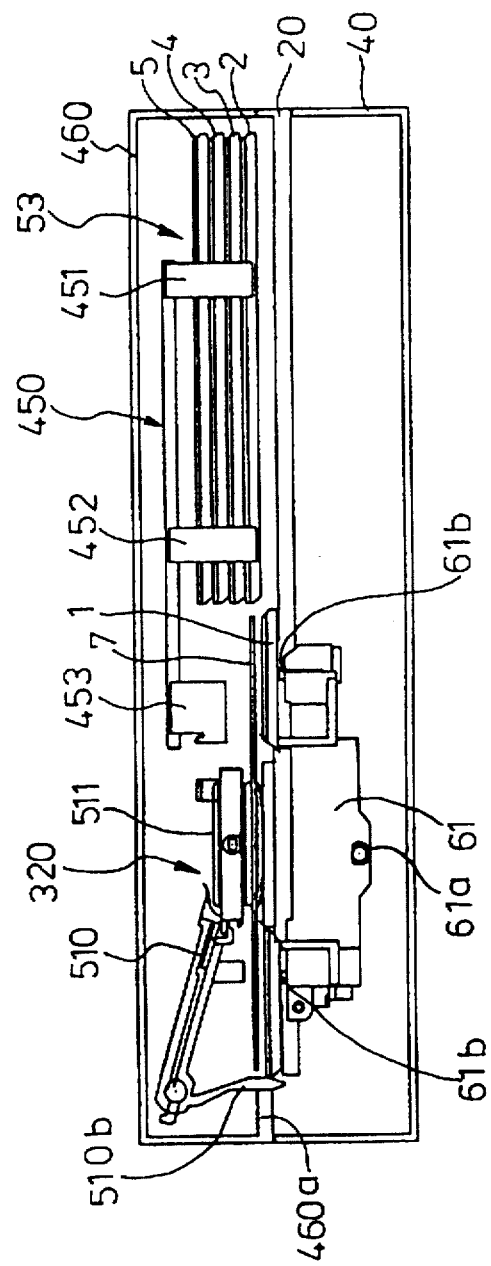
FIG. 27 is a side view showing the main internal mechanism in the disk loading apparatus of the second embodiment.

FIG. 27 is a side view showing the reproduction state in which the reproduction device 6 in the reproduction waiting state is elevated and the disk 7 is played (reproduced). In the reproduction state, the disk 7 is sandwiched between the turn table 6a of the reproduction device 6 and the magnet of the damper 511.

Figure 28:
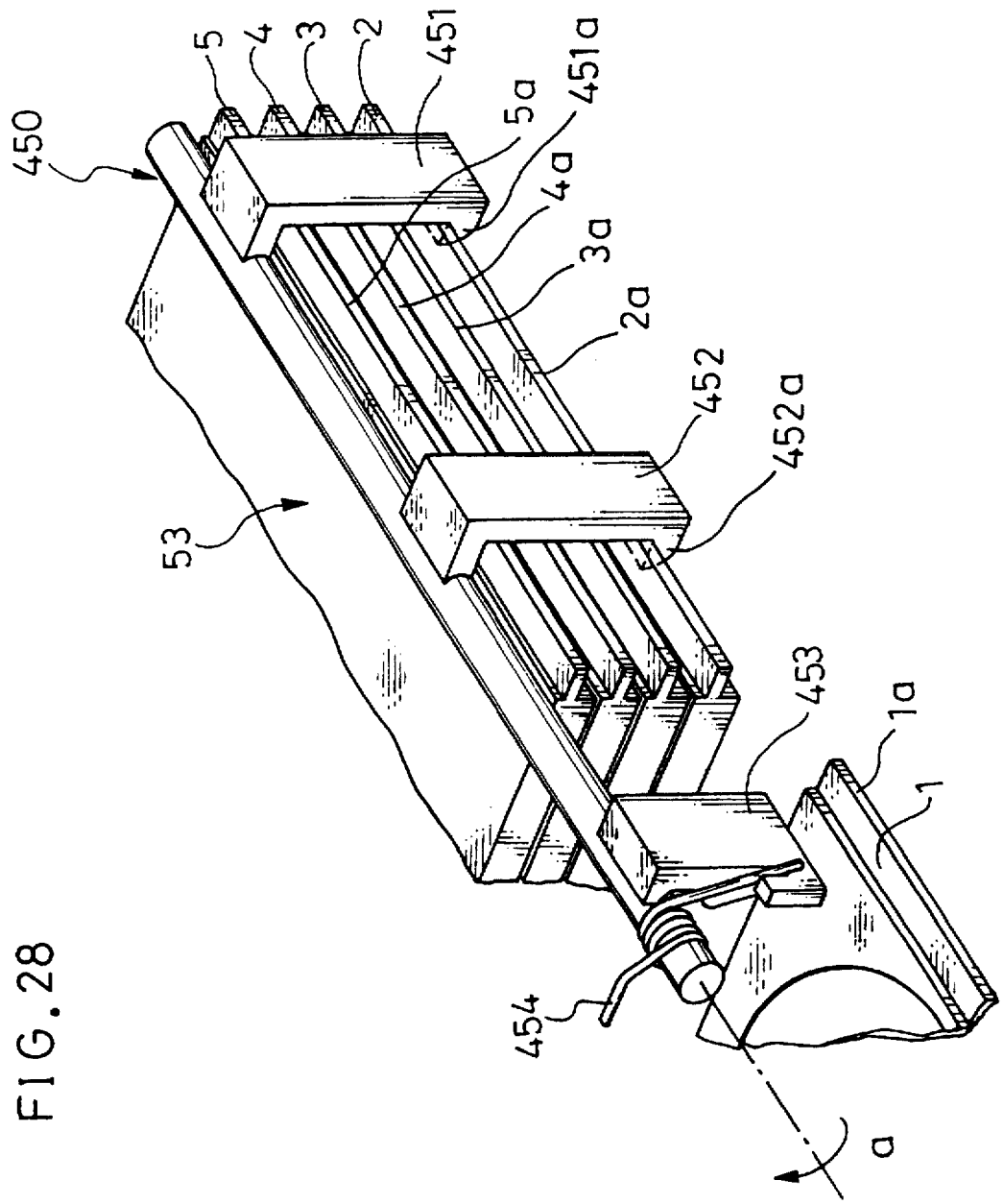
FIG. 28 is a perspective view showing the main internal mechanism in the disk loading apparatus of the second embodiment.

FIG. 28 is a perspective view showing the trays 2, 3, 4, and 5, the hook portion 450, etc. in the tray storage section 53 in the reproduction state shown in FIG. 27. As shown in FIG. 28, the first and second hooks 451 and 452 are disposed in the vicinity of the front of and the center of the hook portions 450 which are placed in the sides of the cover frame 460, respectively. The cam portion 453 is disposed in the vicinity of the back face of each of the hook portions 450. In the reproduction state shown in FIG. 28, the hook portions 450 are urged by the pressing forces of the respective torsion coil springs 454 so as to be rotated in the direction of the arrow a. Therefore, guide portions 2a formed on the side faces of the tray 2 are supported by the first and second hooks 451 and 452 of the hook portions 450. As a result, the tray 2 and the trays 3, 4, and 5 which are stacked on the upper face of the tray 2 are surely supported in the tray storage section 53, and the tray 2 is held with being separated by a predetermined gap from the upper face of the tray ejection frame 20.

When the disk 7 in the reproduction state shown in FIG. 27 is to be ejected to the outside of the apparatus, the disk loading apparatus of the second embodiment is shifted to the reproduction waiting state shown in FIG. 26, passes through the tray storage state shown in FIG. 25, and is then shifted to the tray ejection state (FIG. 24).

In the states shown in FIGS. 24 to 27, the trays 2, 3, 4, and 5 stacked in the tray storage section 53 in the front side which is the nonreproduction region in the disk loading apparatus are held by the hook portions 450 at a predetermined height from the tray ejection frame 20, i.e., at a height corresponding to the thickness of one tray. When the reproduction state is to be shifted to the ejection state, therefore, the tray 1 can be moved below the tray storage section 53. Therefore, the disk loading apparatus of the second embodiment can rapidly conduct the operation of taking out a disk in the reproduction state and hence has responsivity which is excellent in the view point of operability.

In the disk loading apparatus in the states shown in FIGS. 24 to 27, the trays 2, 3, 4, and 5 in the tray storage section 53 are surely held above the nonreproduction region, only by the hook portions 450, and make no contact with the tray 1 placed on the tray ejection frame 20. As shown in FIG. 24, therefore, the disk loading apparatus of the second embodiment can eject the tray 1 to the outside of the apparatus without causing the tray 1 to overlap with the trays 2, 3, 4, and 5 stacked in the tray storage section 53. In other words, the tray 1 is ejected to a position which does not overlap with the trays 2, 3, 4, and 5 in the tray storage section 53 as seen from the top of the apparatus.

As described above, a substantially whole face of the tray 1 is pulled out from the front face of the apparatus so that the operations of loading a disk onto the tray 1 and exchanging disks can be easily conducted. Therefore, the disk loading apparatus of the second embodiment has excellent operability.

[Tray Holding Operation of the Hook Portions 450]

Next the tray holding operation of the hook portions 450 in the tray circulating operation will be described.

In the disk loading apparatus in the reproduction state shown in FIG. 27, when the reproduction device 6 is further elevated to a higher position as a result of the driving of the tray elevation unit 130 (FIG. 10) described in the first embodiment, a plurality of pin portions 61b formed on the upper face of the chassis 61 which holds the reproduction device 6 support the back face of the tray 1 and elevate the tray 1 to the tray return waiting position.

Figure 29:
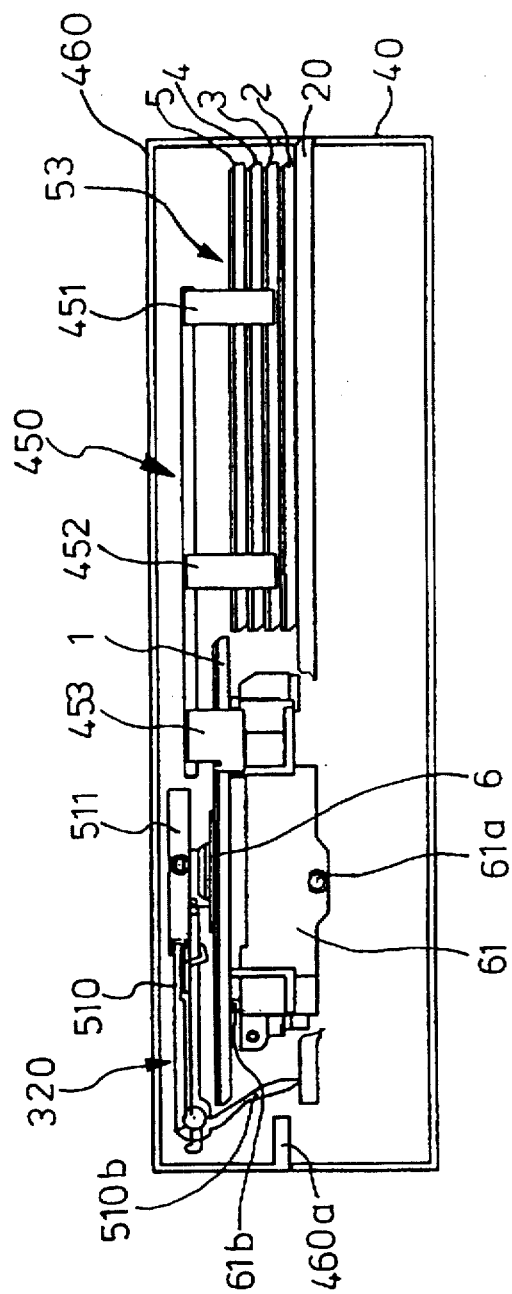
FIG. 29 is a side view showing the main internal mechanism in the disk loading apparatus of the second embodiment.

FIG. 29 is a side view showing the main internal mechanism in the disk loading apparatus in the tray return waiting state. In the tray return waiting state shown in FIG. 29, in accordance with the elevation of the tray 1, the abutting portion 510d of the arm portion 510e is pushed up by the tray 1, and hence the clamp lever 510 is upward rotated about the pin portion 510a and situated at a higher position. The tray 1 makes contact with the cam portions 453 of the hook portions 450 so that the cam portions 453 are outward pushed. At this time, the tray 1 is held at the tray return waiting position by the supporters 46a disposed on the sides of the cover frame 460.

Figure 30:
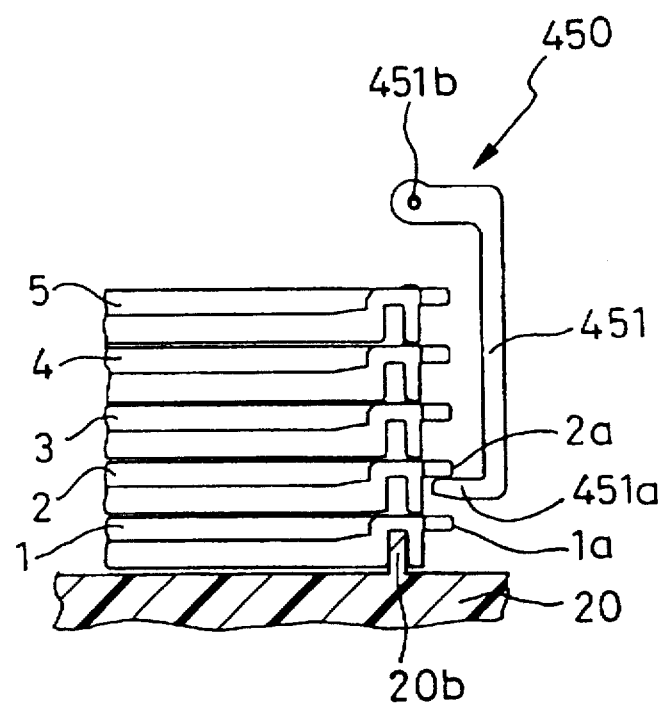
FIG. 30 is a section view showing an engagement state of a first hook 451 and trays 1 to 5 in the tray storage state shown in FIG. 25.

FIG. 30 is a section view showing the engagement state of the first hook 451 of the hook portions 450 and the tray 2 in the tray storage state shown in FIG. 25. As shown in FIG. 30, the tray 2 at the lowest position in the tray storage section 53 is supported by a claw 451a of the first hook 451 and the trays 3, 4, and 5 are placed on the tray 2. The tray 1 is placed on the tray ejection frame 20 and engages with a guide rib 20b of the tray ejection frame 20. The guide rib 20b is formed on the upper face of the tray ejection frame 20 and, when a tray is moved on the tray ejection frame 20, guides the movement direction of the tray.

Figure 33:
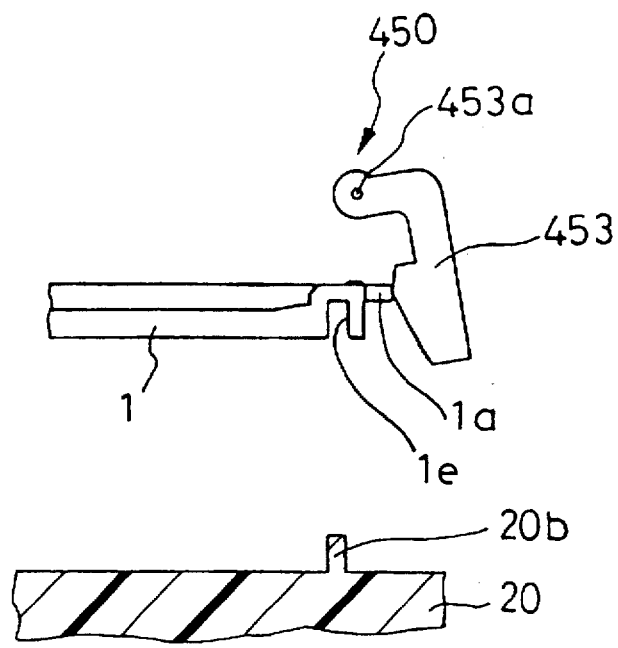
FIG. 33 is a section view showing an engagement state of the cam portion 453 and the tray 1 in the tray return waiting state shown in FIG. 29.
Figure 34:
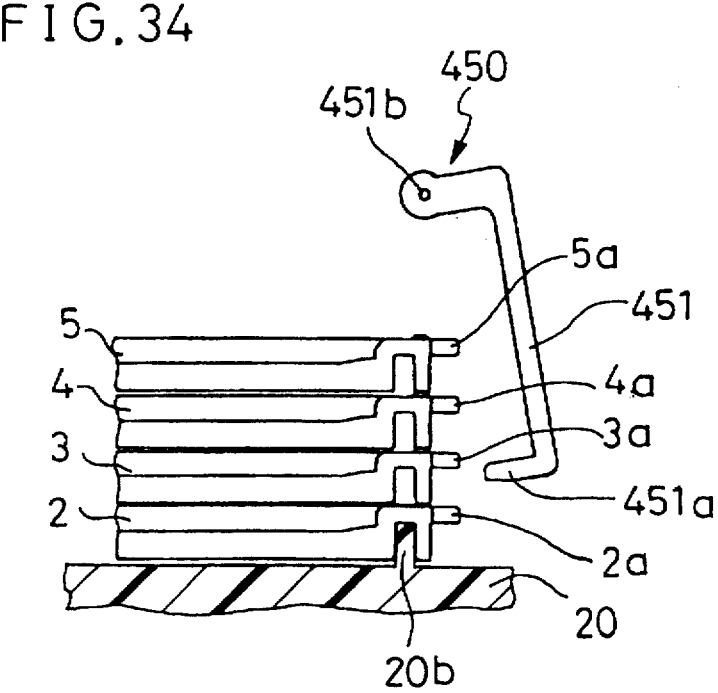
FIG. 34 is a section view showing an engagement state of the first hook 451 and the trays 2, 3, 4, and 5 in the tray return waiting state shown in FIG. 29.

FIG. 31 is a section view showing relationships between the cam portion 453 and the tray 1 in the reproduction waiting state shown in FIG. 26. FIG. 32 is a section view showing the engagement state of the first hook 451 and the tray 2 in the reproduction waiting state. FIG. 33 is a section view showing the engagement state of the cam portion 453 and the tray 1 in the tray return waiting state shown in FIG. 29. FIG. 34 is a section view showing the state of the first hook 451 in the tray return waiting state.

In the states shown in FIGS. 30 and 32, the trays 2, 3, 4, and 5 in the tray storage section 53 are held by the first hook 451 and the tray 1 is placed on the tray ejection frame 20. On the other hand, in the tray return waiting state shown in FIG. 33, a guide portion 1a of the tray 1 pushes the cam portion 453 of the hook portion 450 so that the hook portion is inclined to the outside, and hence the cam portion 453 is rotated by a predetermined angle about its shaft 453a. At this time, also the first and second hooks 451 and 452 of the hook portion 450 are simultaneously rotated so that the first and second hooks 451 and 452 disengage from the guide portion 2a of the tray 2, with the result that, as shown in FIG. 34, the trays 2, 3, 4, and 5 stacked in the tray storage section 53 drop onto the tray ejection frame 20.

FIGS. 30 to 34 show only one of the hook portions 450 disposed in the sides of the cover frame 460. With respect to the other hook portion 450 which is opposed to the one hook portion, the same disengaging operation as the above-described operation of the one hook portion 450 is conducted in a synchronized manner.

Figure 35:
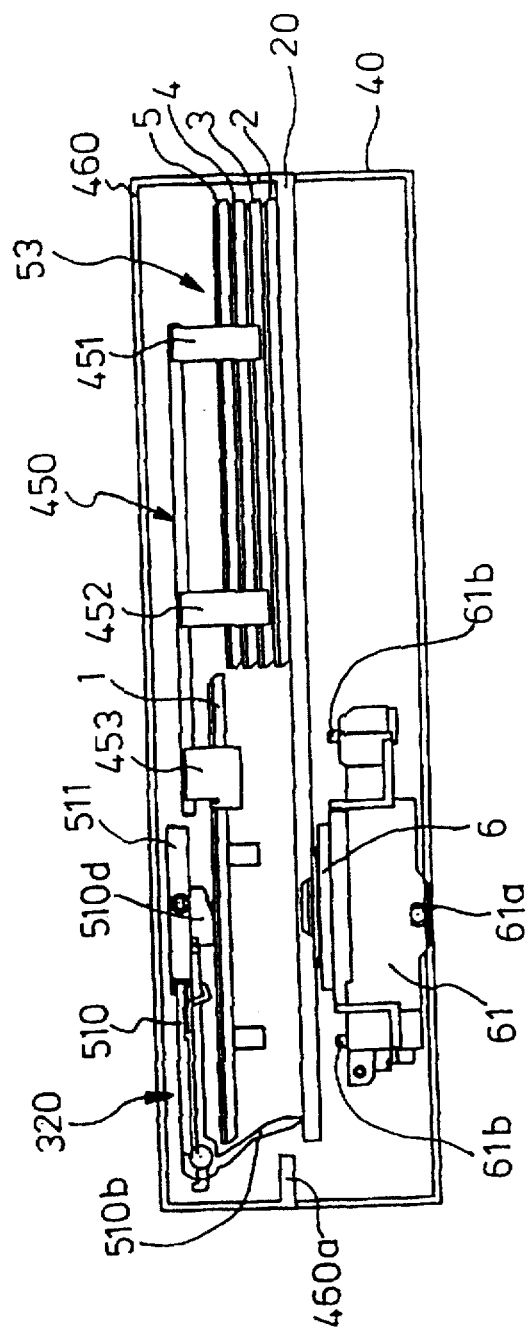
FIG. 35 is a side view of the disk loading apparatus showing while reproduction device return state in which a reproduction device 6 is lowered in the tray return waiting state shown in FIG. 29.

FIG. 35 is a side view showing the internal mechanism in the reproduction device return state in which only the reproduction device 6 is lowered in the tray return waiting state shown in FIG. 29. In this state, the tray 1 is supported by the supporters 46a which are disposed on the cover frame 460, and held at the tray return waiting position.

Figure 36:
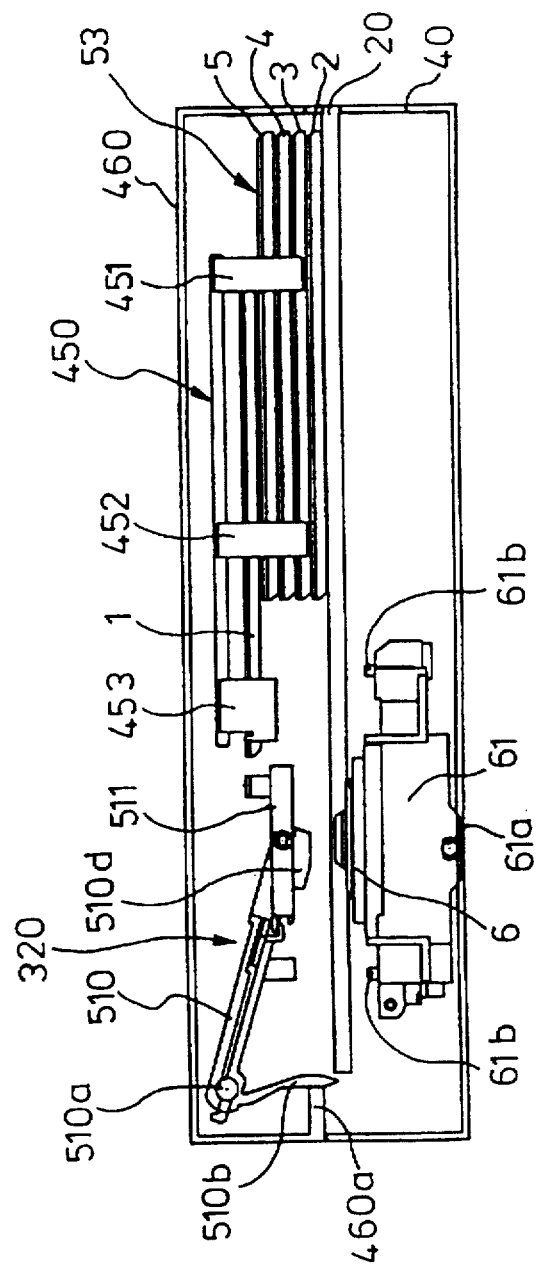
FIG. 36 is a side view of the disk loading apparatus showing a state which is on the way of returning the tray 1 at the tray return waiting position to a tray storage section 53.

FIG. 36 shows a state which is on the way of returning the tray 1 at the tray return waiting position to the tray storage section 53. In FIG. 36, the abutting portion 510d formed on the clamp lever 510 is released from the upward pushing force exerted by the upper face of the tray 1. Therefore, the clamp lever 510 is downward rotated by its gravity about the pin portion 510a. At this time, the receiving portion 510b of the clamp lever 510 abuts against the rib 460a formed on the inner face of the back of the cover frame 460. This causes the clamp lever 510 to be held at a predetermined lower position shown in FIG. 36.

In the state shown in FIG. 36, the cam portion 453 of the hook portions 450 is pushed by the guide portion 1a of the tray 1. Consequently, the first and second hooks 451 and 452 are inclined to the outside so that the hook portions 450 engage with none of the trays 2, 3, 4, and 5 in the tray storage section 53.

When the operation of returning the tray 1 to the tray storage section 53 is ended, the cam portions 453 of the hook portions 450 do not make contact with the guide portion 1a of the tray 1, and hence the hook portions 450 on the sides of the cover frame 460 are rotated in opposing directions so as to sandwich the tray in the tray storage section 53. As a result, the claw 451a of the first hook 451 and a claw 452a of the second hook 452 engage with a guide portion 3a of the tray 3 so that the trays 3, 4, 5, and 1 are held in the tray storage section 53. At this time, the tray 2 is placed on the tray ejection frame 20.

Figure 37:
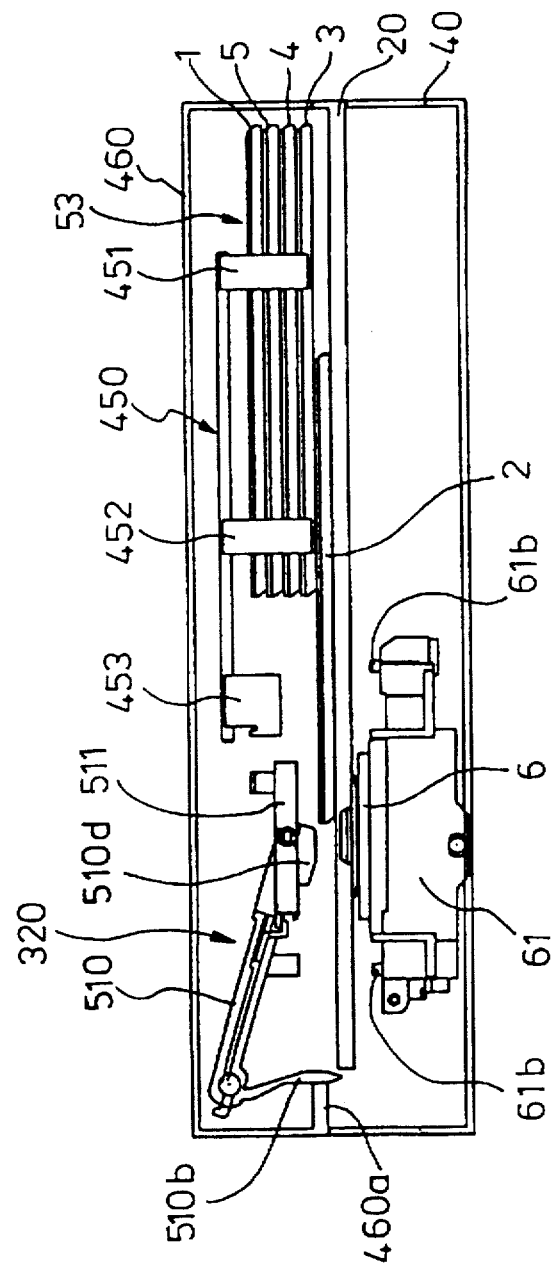
FIG. 37 is a side view of the disk loading apparatus showing a state which is on the way of shifting the tray 2 from the tray storage state to the reproduction waiting state.

The tray 2 which is situated directly below the tray storage section 53 is moved on the tray ejection frame 20 by the tray driving mechanism which has been described in the first embodiment, and then to the reproduction waiting position. FIG. 37 is a side view of the disk loading apparatus showing a state which is on the way of shifting the tray 2 from the tray storage state to the reproduction waiting state. The state shown in FIG. 37 is substantially identical with the state in which the tray storage state of FIG. 25 is shifted to the reproduction waiting state of FIG. 26. In this way, the tray 2 enters the reproduction state via the reproduction waiting state, and the above-described tray circulating operation is then conducted.

In the manner described above, the disk loading apparatus of the second embodiment conducts the tray circulating operation, so that the disks on the trays which are stacked in the tray storage section 53 are sequentially reproduced.

In the disk loading apparatus of the second embodiment, since the hook portions 450 interlocking with the tray moving operation are disposed, a plurality of trays can be surely housed in the tray storage section 53 in a stacked manner. In the tray circulating operation, the movement of a tray which has passed through the reproduction state causes the engagement between a tray in the tray storage section and the hook portions to be once canceled, and only the tray at the lowest position in the tray storage section is placed at a predetermined position on the tray ejection frame 20, and the remaining trays are again surely held in the tray storage section 53 in a stacked manner. Consequently, the disk loading apparatus of the second embodiment is an apparatus of high reliability.

<Third Embodiment>

Hereinafter, a third embodiment of the disk loading apparatus of the present invention will be described with reference to FIGS. 38 and 39. In the disk loading apparatus of the third embodiment, the hook portions 450 of the disk loading apparatus of the second embodiment are modified and the other components are configured in the same manner as those of the second embodiment.

Figure 38:
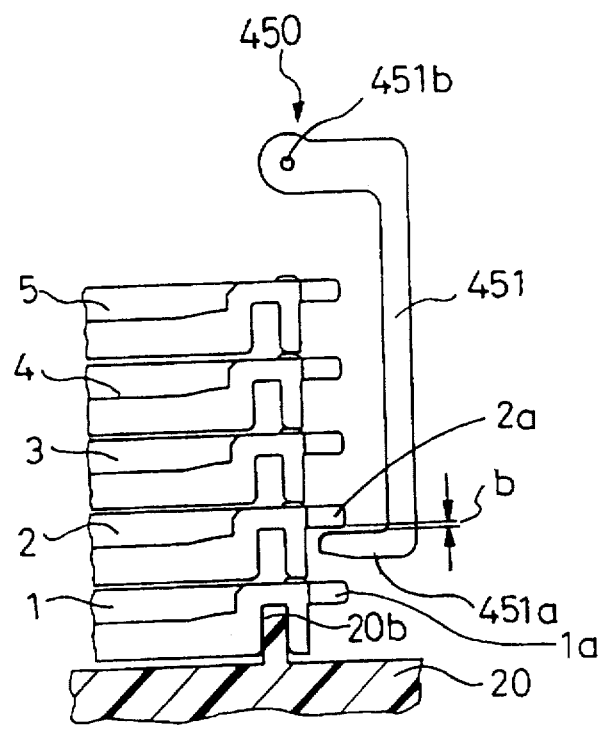
FIG. 38 is a section view showing the stacked trays 1 to 5 in the tray storage state shown in the second embodiment, and the first hook 451 of a hook portion 450.

FIG. 38 is a section view showing the trays 1, 2, 3, 4, and 5 stacked on the tray ejection frame 20 in the tray storage state shown in the second embodiment, and the first hook 451 of the hook portion 450. In FIG. 38, the claw 451a of the first hook 451 is situated below the guide portion 2a of the tray 2.

The above-described disk loading apparatus of the second embodiment is configured so that, on the way of shifting the tray return waiting state to the tray storage state, the first and second hooks 451 and 452 are rotated in a direction along which the stacked trays are sandwiched therebetween and the claws of the first and second hooks 451 and 452 enter a space below the guide portion 2a of the tray 2. When the tray 1 on the tray ejection frame 20 is moved from the tray storage position to the reproduction waiting position, therefore, the guide portion 2a of the tray 2 engages with the claws of the first and second hooks 451 and 452 so that trays 3, 4, and 5 are surely held as well as the tray 2 at the tray storage position by the hook portions 450.

In the disk loading apparatus of the second embodiment, as shown in FIG. 38, it is required to form a gap b between the upper face of the claw 451a of the first hook portion 451 and the lower face of the guide portion 2a of the tray 2, in order that the claw 451a of the first hook portion 451 surely enters a space below the guide portion 2a of the tray 2. In other words, the claw 451a of the first hook portion 451 is disposed in such a manner that the gap b is formed between the upper face of the claw 451a and the lower face of the guide portion of the tray at the second lowest position among the trays stacked on the tray ejection frame 20.

As a result, when the tray 1 at the lowest position among the trays 1, 2, 3, 4, and 5 stacked on the tray ejection frame 20 is moved to the reproduction waiting position, or when the tray 1 is ejected together with the tray ejection frame 20 to the front of the apparatus, the tray 2 which is at the second step and above the ejected tray 1 is lowered by a distance corresponding to the size of the gap b. When the tray 1 on the tray ejection frame 20 again passes directly below the tray storage section 53 under this state, the tray 1 must lift the trays 2, 3, 4, and 5 stacked in the tray storage section 53, by the distance corresponding to the gap b. Consequently, the disk loading apparatus of the second embodiment has problems in that the load in the tray driving operation is increased and that a collision noise is produced during the movement of the tray.

The disk loading apparatus of the third embodiment can solve the problems.

Figure 39:
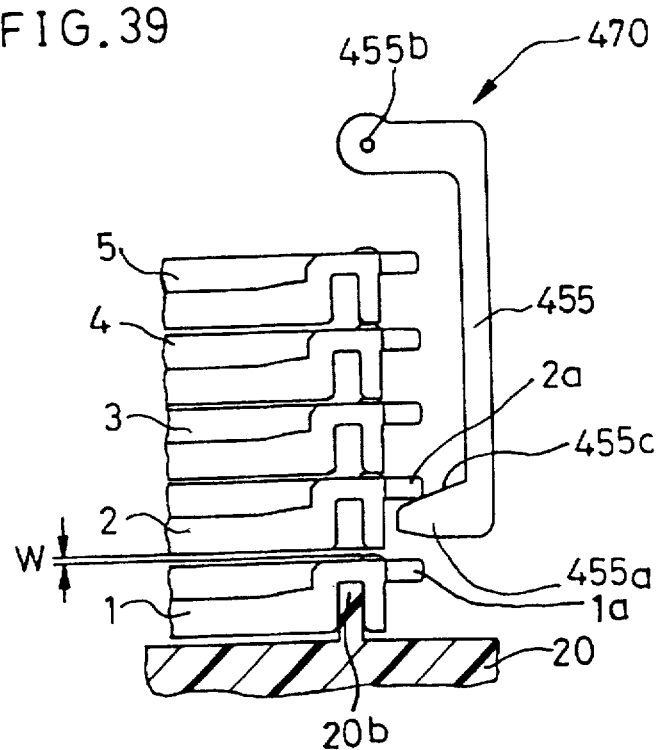
FIG. 39 is a section view showing the tray storage state in which the trays 1 to 5 are stacked on a tray ejection frame 20.

FIG. 39 is a section view showing the tray storage state in which the trays 1, 2, 3, 4, and 5 are stacked on the tray ejection frame 20. As shown in FIG. 39, a hook portion 470 in the third embodiment comprises a first hook 455 having a bent claw 455a at its tip end. The claw 455a of the first hook 455 has a tapered shape. The upper face 455c of the claw 455a is inclined so as to face the stacked trays. In the same manner as the second embodiment, the hook portion 470 in the third embodiment comprises a second hook. In the same manner as the first hook 455, the second hook is provided with a claw having a tapered shape.

In the third embodiment, the torsion coil springs (not shown) which urge the hook portions 470 disposed at the sides of the cover frame 460 in opposite directions exert an urging force which is greater than that exerted by the torsion coil springs 454 used in the second embodiment. The torsion coil springs used in the third embodiment have an increased number of turns and a larger wire diameter so as to exert a greater urging force.

FIG. 39 shows the tray storage state in which the stacked trays 2, 3, 4, and 5 are held by the first hook 455. In a state attained before this tray storage state, i.e., in the state in which the five trays 1, 2, 3, 4, and 5 are placed on the tray ejection frame 20 in a stacked manner, the first hook 455 is rotated about its shaft 455b, and the front end of the claw 455a of the first hook 455 enters the space below the guide portion 2a of the tray 2 at the second lowest step among the stacked trays 1, 2, 3, 4, and 5. At this time, since the upper face 455c of the claw 455a of the first hook 455 has a tapered shape, the claw 455a gradually pushes up the lower face of the guide portion 2a of the tray 2. Therefore, a gap W is formed between the tray 1 at the lowest position among the trays stacked on the tray ejection frame 20, and the tray 2 at the second step. At this time, the force of pushing up the trays 2, 3, 4, and 5 is given by the urging forces of the torsion coil springs by which the hook portions 450 are urged so as to be rotated.

In the disk loading apparatus of the third embodiment, when a tray at the reproduction waiting position of the tray ejection frame 20 is ejected together with the tray ejection frame 20 to the front of the apparatus passing directly below the tray storage section 53, the tray on the tray ejection frame 20 can be moved smoothly and quietly without making any contact with the trays stacked in the tray storage section 53.

<Fourth Embodiment>

Hereinafter, a fourth embodiment of the disk loading apparatus of the present invention will be described in detail with reference to FIGS. 40 to 55. In the fourth embodiment, components which are similar in configuration and function as those of the first embodiment and the second embodiment are designated by the same reference numerals and their description is omitted.

As shown in FIG. 33 in the second embodiment, on the way of elevating the tray 1 in order to shift it from the reproduction state to the tray return waiting state, the guide portion 1a of the tray 1 pushes the hook portion 450 so that the hook portion is inclined to the outside. As a result, the trays 2, 3, 4, and 5 stacked in the tray storage section 53 drop onto the tray ejection frame 20. In this case, the trays 2, 3, 4, and 5 in the tray storage section 53 drop from the height approximately corresponding to the thickness of one tray, so that a large collision noise is produced between the tray 2 and the tray ejection frame 20. Therefore, in the disk loading apparatus of the second embodiment, there is such a problem that an unpleasant sound is produced during the operation of circulating the trays, thereby lowering the grade of the disk loading apparatus of the present invention as a sound apparatus.

In order to solve the problem of the second embodiment, the disk loading apparatus of the fourth embodiment has been developed.

Figure 40:
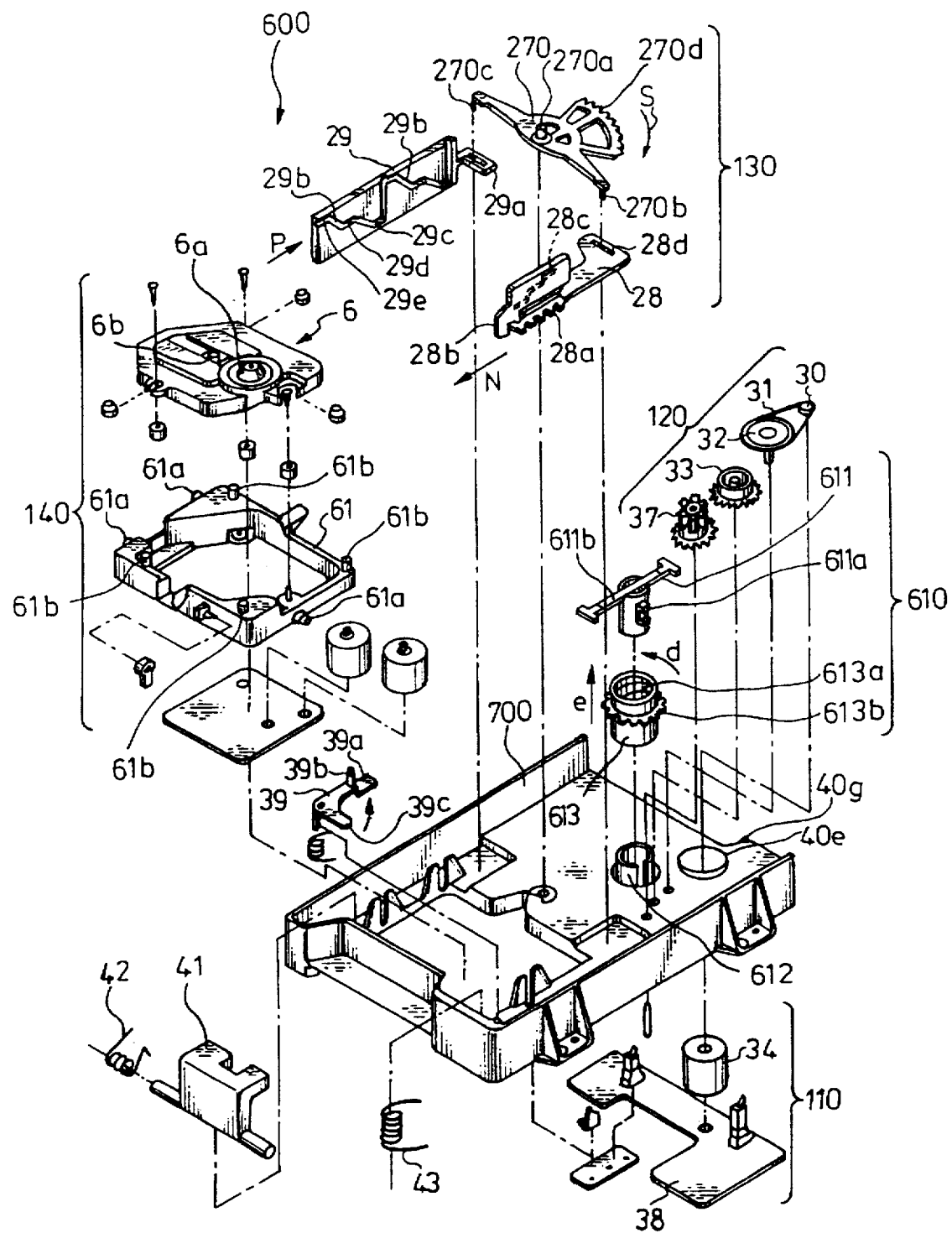
FIG. 40 is an exploded perspective view showing a base unit 600, etc. in a disk loading apparatus of a fourth embodiment.
Figure 41:
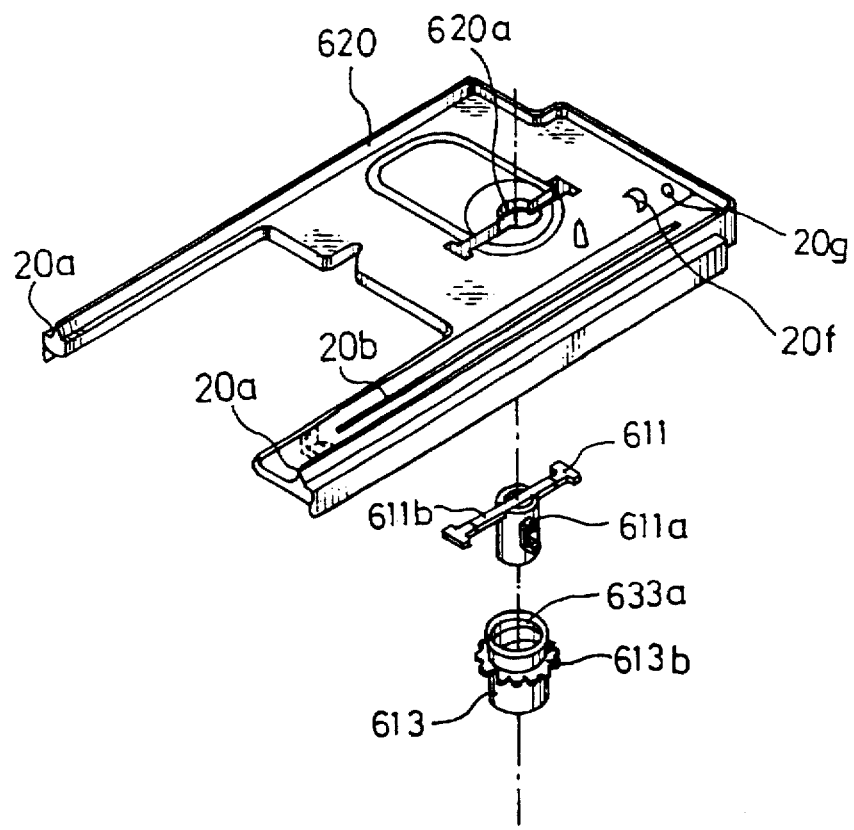
FIG. 41 is an exploded perspective view showing a tray ejection frame 620, etc. in the disk loading apparatus of the fourth embodiment.

FIG. 40 is an exploded perspective view showing a base unit 600, etc. in the disk loading apparatus of the fourth embodiment, and FIG. 41 is an exploded perspective view showing a tray ejection frame 620, etc. in the disk loading apparatus of the fourth embodiment.

As shown in FIG. 40, the base unit 600 in the fourth embodiment comprises the driving section 110, the reduction gear section 120, and the reproduction unit 140, and is configured in the same manner as the first embodiment.

The tray elevation unit 130 comprises a converting lever 270, the first slide plate 28, and the second slide plate 29. First and second pins 270b and 270c formed at the ends of the converting lever 270 slidably engage with a slot 28d formed in the first slide plate 28, and a slot 29a of the second slide plate 29, respectively. The converting lever 270 is disposed so as to be rotatable in relation to the base frame 700 around a shaft 270a. According to this configuration, the second slide plate 29 is slidingly moved by the sliding movement of the first slide plate 28, in a direction opposite to the sliding movement. A gear 270d having a pitch circle centered at the shaft 270a is formed in the converting lever 270.

As shown in FIG. 40, a tray support unit 610 is disposed in the base frame 700 of the base unit 600. The tray support unit 610 is situated directly below the tray storage section 53. The center shaft of the tray support unit 610 elongates along the vertical line of the center of gravity of a tray in the tray storage section 53. The tray support unit 610 comprises: a tubular support portion 612 which is secured to the base frame 700, an elevation gear 613 which is rotatably disposed so as to be coaxial with and outside the support portion 612, and an elevation lever 611 which is held in a vertically movable manner inside the support portion 612. A guide portion 611a having a U-letter like shape is projected from the side face of the elevation lever 611. The guide portion 611a engages with a slit which is formed in the support portion 612 so as to vertically elongate, thereby restricting the elevation lever 611 to move only in the vertical directions. Furthermore, the U-shaped guide portion 611a engages with a helical cam rib 613a which is formed on the inner face of the elevation gear 613. Therefore, the rotation of the elevation gear 613 causes the guide portion 611a engaging with the helical cam rib 613a to be vertically moved, and the elevation lever 611 to be moved upward or downward.

A gear 613b is formed on the outer periphery of the elevation gear 613 of the tray support unit 610. The gear 613b meshes with the gear 270d of the converting lever 270 of the tray elevation unit 130. Consequently, the sliding movement of the first slide plate 28 causes the converting lever 270 to be rotated. In accordance with the rotation, the elevation gear 613 is rotated.

As shown in FIG. 41, a bar-like support lever 611b which horizontally elongates is formed on the elevation lever 611. A hole 620a through which the support lever 611b can pass is formed in the tray ejection frame 620. When the elevation lever 611 is elevated, therefore, the support lever 611b passes through the hole 620a formed in the tray ejection frame 620 and is then situated at a position of supporting the tray at the lowest position of the tray storage section 53.

In the disk loading apparatus of the fourth embodiment shown in FIG. 40, when the apparatus is shifted from the reproduction waiting state to the tray return waiting state via the reproduction state, the first slide plate 28 is moved in the direction of the arrow N, and the converting lever 270 is rotated in the direction of the arrow S. At this time, the elevation gear 613 of the tray support unit 610 which meshes with the gear 270d of the converting lever 270 is rotated in the direction of the arrow d so that the elevation lever 611 is elevated in the direction of the arrow e. The support lever 611b formed on the elevation lever 611 passes through the hole 620a formed in the tray ejection frame 620 and is then elevated to a position of supporting the tray at the lowest position of the tray storage section 53.

[Elevating Operation of the Tray Support Unit 610]

Next the elevating operation of the tray support unit 610 will be described in detail with reference to FIGS. 42 to 45.

Figure 42:
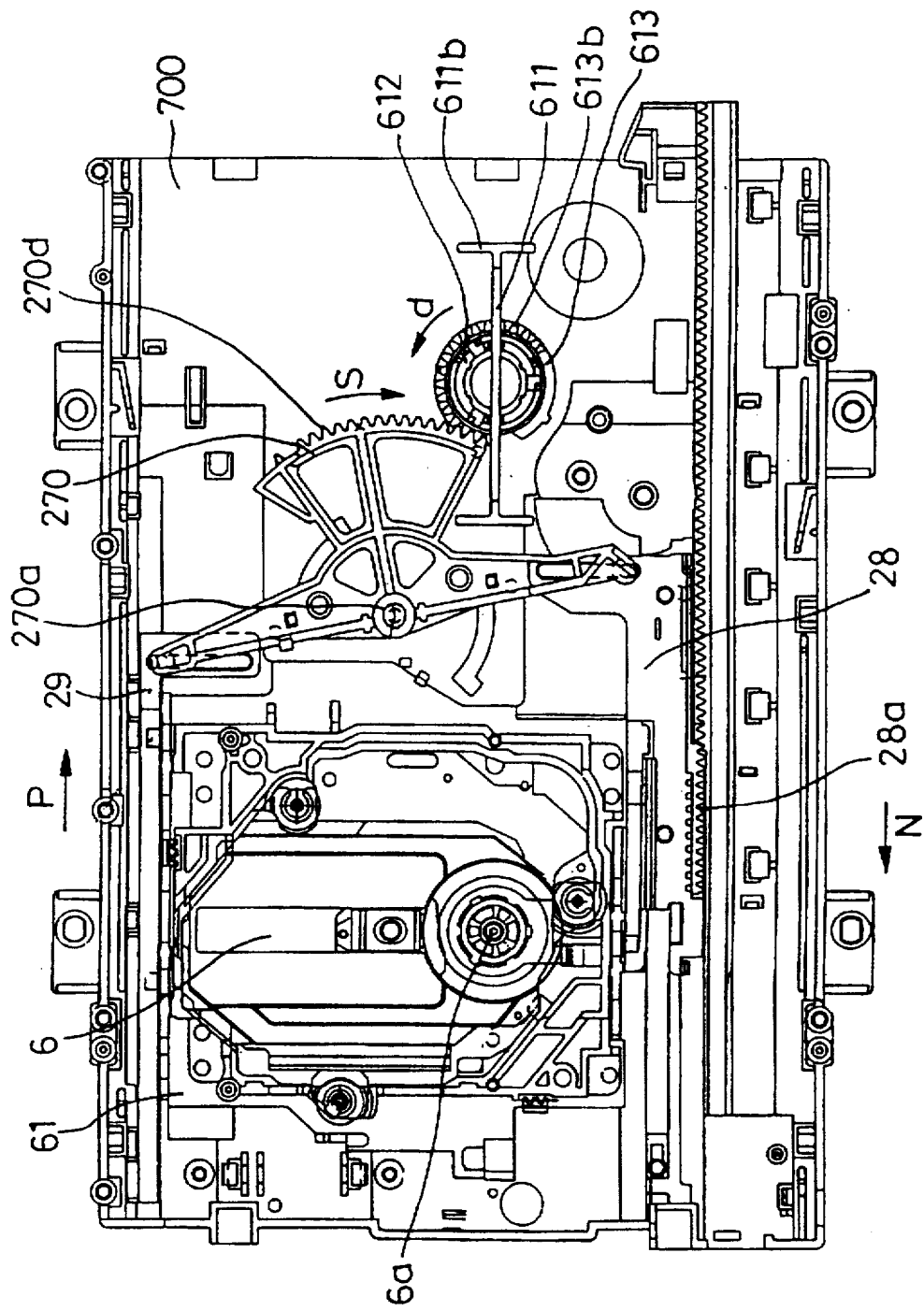
FIG. 42 is a plan view showing the main internal mechanism in the reproduction waiting state of the disk loading apparatus of the fourth embodiment.
Figure 43:
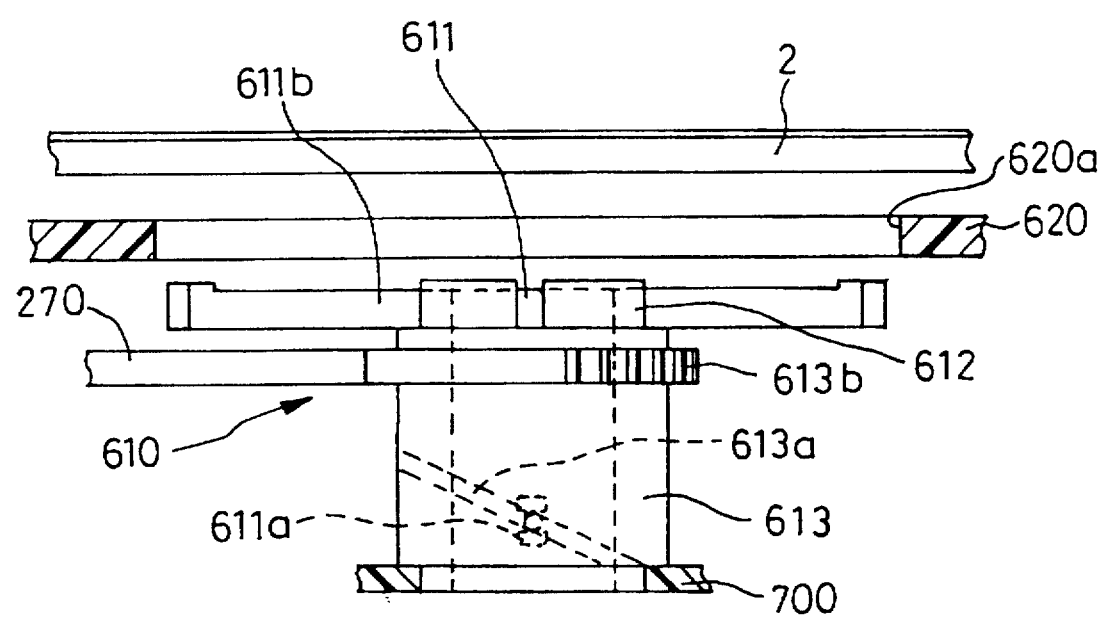
FIG. 43 is a side view showing the operation state of a tray support unit 610 in the reproduction waiting state.
Figure 44:
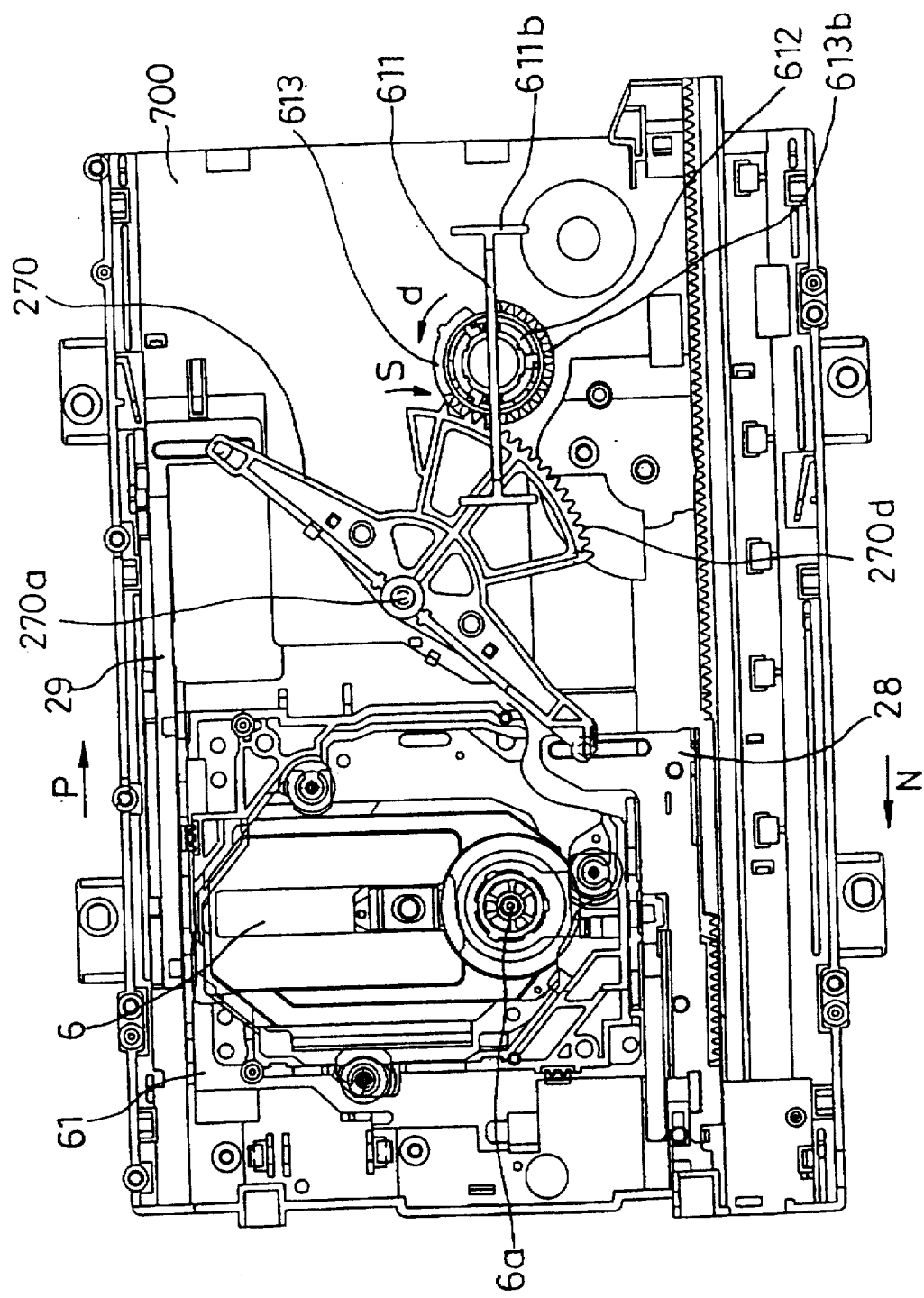
FIG. 44 is a plan view showing the main internal mechanism in the tray return waiting state of the disk loading apparatus.
Figure 45:
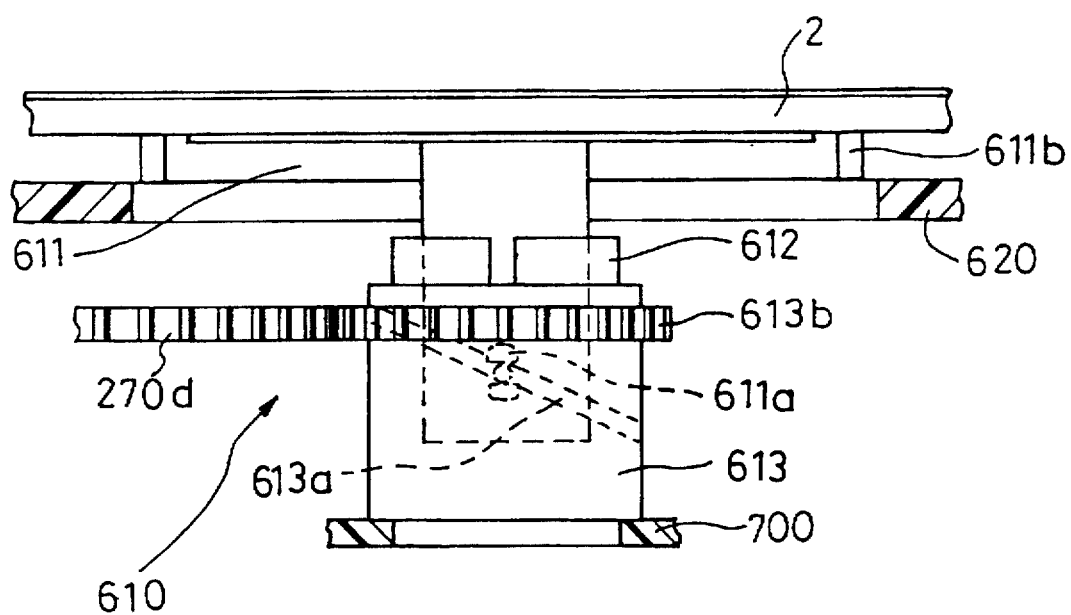
FIG. 45 is a side view showing the operation state of the tray support unit 610 in the tray return waiting state.

FIG. 42 is a plan view showing the main internal mechanism in the reproduction waiting state of the disk loading apparatus of the fourth embodiment. FIG. 43 is a side view showing the operation state of the tray support unit 610 in the reproduction waiting state. FIG. 44 is a plan view showing the main internal mechanism in the tray return waiting state of the disk loading apparatus. FIG. 45 is a side view showing the operation state of the tray support unit 610 in the tray return waiting state.

In the reproduction waiting state shown in FIG. 42, as described in the first embodiment, the driving force of the tray driving motor of the driving section is transmitted to the slide plate rack 28a of the first slide plate 28 and causes the first slide plate 28 to be moved in the direction of the arrow N. Consequently, the converting lever 270 is rotated in the direction of the arrow S about the shaft 270a so that the second slide plate 29 is moved in the direction of the arrow P. At the same time, the elevation gear 613 is rotated in the direction of the arrow d. As described in the first embodiment, the movements of the first and second slide plates 28 and 29 in the opposite directions cause the reproduction device 6 to be elevated and shifted from the reproduction waiting state to the reproduction state.

In the tray support unit 610 in the reproduction waiting state shown in FIG. 43, the rotating force transmitted to the elevation gear 613 via the gear 270d of the converting lever 270 causes the elevation lever 611 to be elevated because the cam rib 613a formed on the inner face of the elevation gear 613 meshes with the guide portion 611a formed on the side face of the elevation lever 611. Accordingly, the support lever 611b of the elevation lever 611 passes through the hole 620a formed in the tray ejection frame 620 and is then elevated to the highest position where the tray at the lowest position of the tray storage section 53 is supported.

FIG. 44 shows the tray return waiting state or a state in which the converting lever 270 is rotated in the direction of the arrow S and reaches the final position. In FIG. 44, the elevation gear 613 is rotated in the direction of the arrow d and reaches the final position, and the elevation lever 611 is elevated to the highest position.

FIG. 45 shows the tray support unit 610 in the tray return waiting state. The support lever 611b of the elevation lever 611 is elevated to the highest position and supports the tray 2 at the lowest position of the tray storage section 53.

Next the converting lever 270 in the tray return waiting state shown in FIG. 45 is rotated in a direction opposite to that of the arrow S (FIG. 44). Consequently, the reproduction device 6 is lowered, and the elevation lever 611 passes through the hole 620a of the tray ejection frame 620 and then gradually lowered, with the result that the tray 2 supported by the support lever 611b is quietly placed on the tray ejection frame 620.

[Tray Transferring Operation and the Elevating Operation of the Tray Support Unit 610]

The relationships between the tray transferring operation and the elevating operation of the tray support unit 610 in the disk loading apparatus of the fourth embodiment will be described with reference to FIGS. 46 to 55. FIGS. 46 to 50 are side views showing the operation of the main internal mechanism in various states in the disk loading apparatus of the fourth embodiment.

Figure 46:
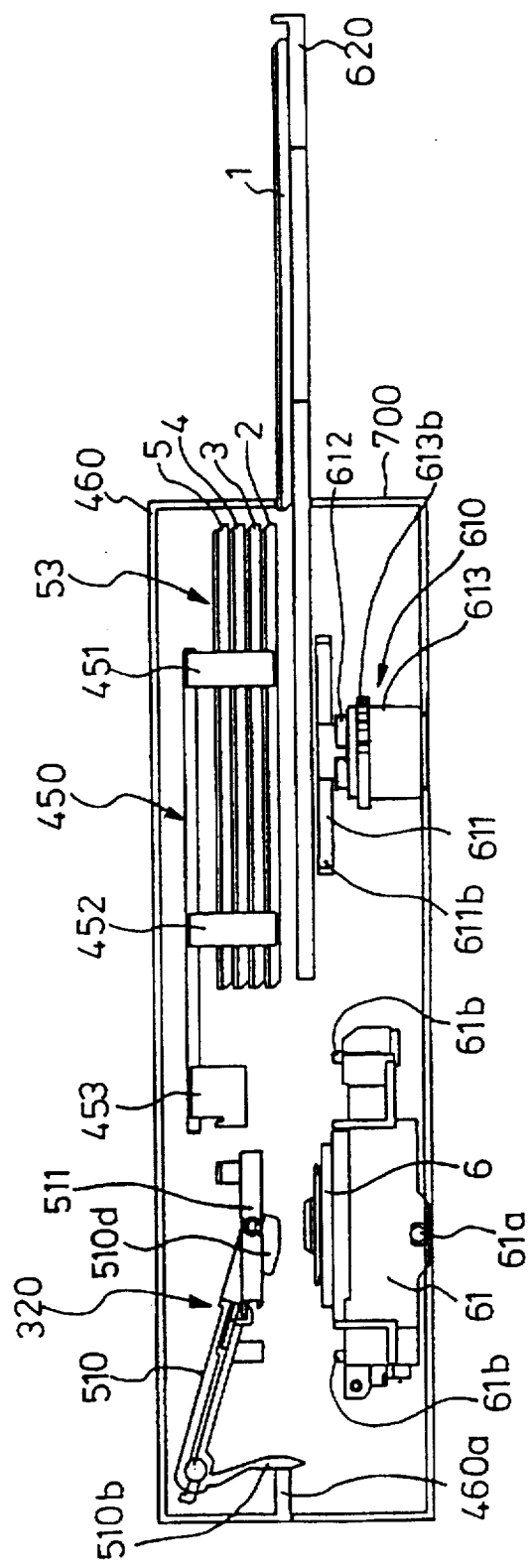
FIG. 46 is a side view showing the operation state of the main internal mechanism in the disk loading apparatus of the fourth embodiment.

FIG. 46 shows the tray ejection state in which the tray ejection frame 620 is pulled out. In the tray ejection state, the elevation lever 611 of the tray support unit 610 is at the lowest position.

Figure 47:
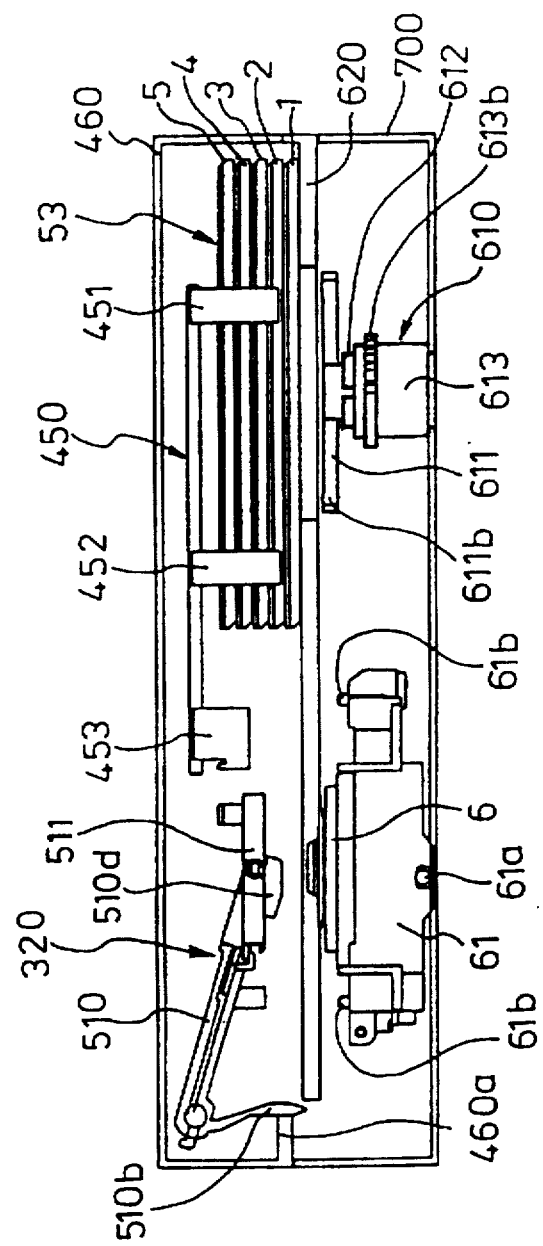
FIG. 47 is a side view showing the operation state of the main internal mechanism in the disk loading apparatus of the fourth embodiment.

FIG. 47 shows the tray storage state in which the tray ejection frame 620 is housed in the disk loading apparatus. This state is substantially identical with the tray storage state which has been described in the second embodiment with reference to FIG. 25. In the tray storage state, the elevation lever 611 is held at the lowest position in the same manner as the tray ejection state.

Figure 48:
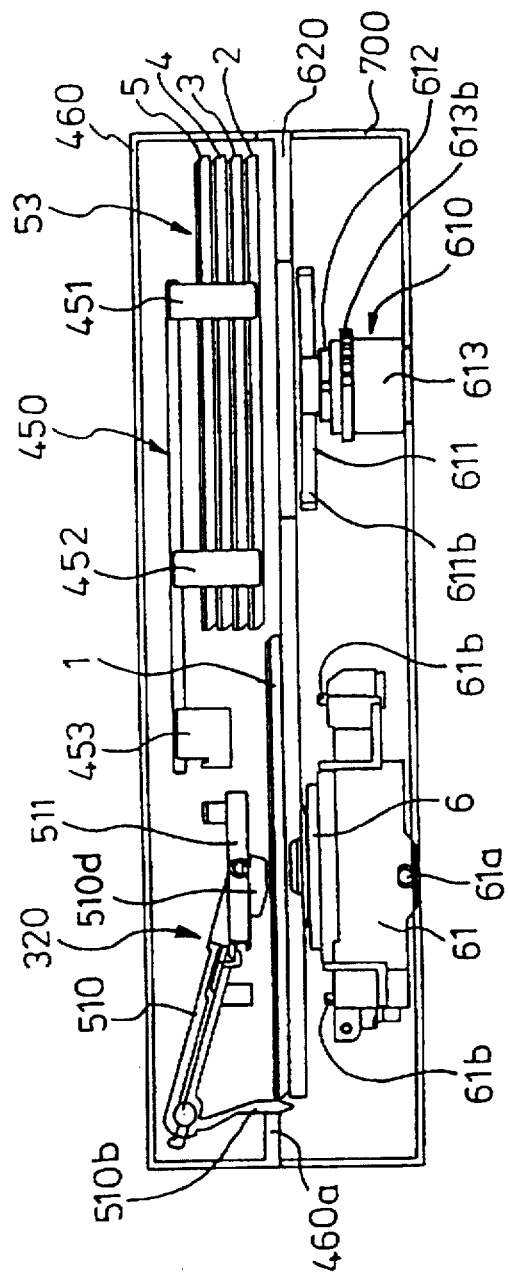
FIG. 48 is a side view showing the operation state of the main internal mechanism in the disk loading apparatus of the fourth embodiment.

FIG. 48 shows the reproduction waiting state in which the tray 1 is transported to a space above the reproduction device 6. This state is substantially identical with the reproduction waiting state which has been described in the second embodiment with reference to FIG. 26. In the reproduction waiting state, the elevation lever 611 remains to be held at the lowest position.

Figure 49:
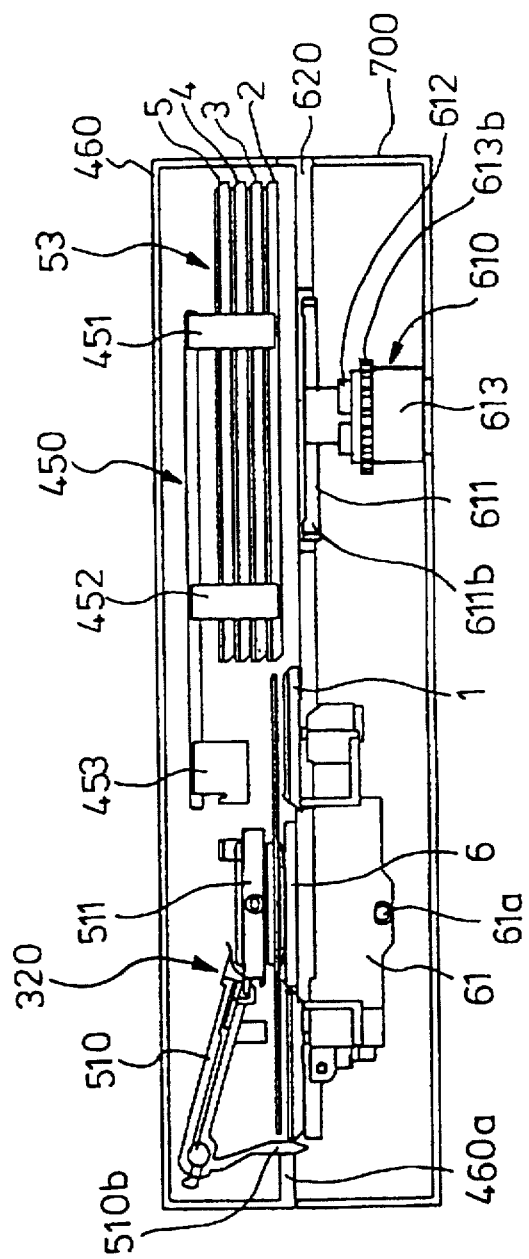
FIG. 49 is a side view showing the operation state of the main internal mechanism in the disk loading apparatus of the fourth embodiment.

FIG. 49 shows the reproduction state in which the reproduction device 6 in the reproduction waiting state is elevated and the disk 7 is played (reproduced). Since the shift from the reproduction waiting state to the reproduction state is conducted by the rotation of the converting lever 270 (FIG. 43), the rotation of the converting lever 270 causes the reproduction device 6 to be elevated to the middle position, and also the elevation lever 611 of the tray support unit 610 to be elevated to the middle position.

Figure 50:
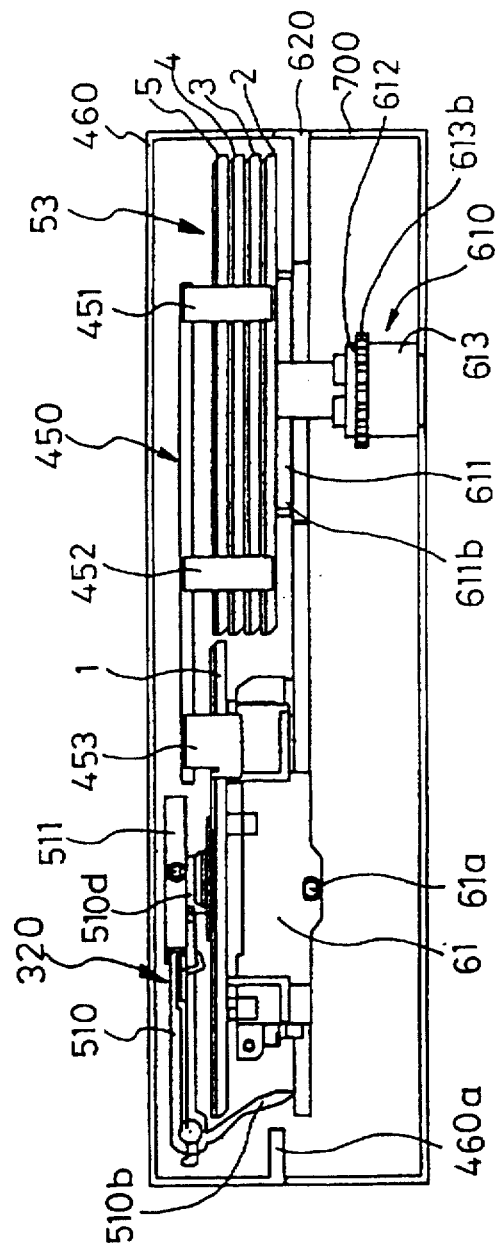
FIG. 50 is a side view showing the operation state of the main internal mechanism in the disk loading apparatus of the fourth embodiment.

FIG. 50 is a side view showing the internal mechanism in the tray return waiting state. In the tray return waiting state, the reproduction device 6 is elevated to a higher position and the elevation lever 611 of the tray support unit 610 is elevated to the highest position. The highest position of the elevation lever 611 is a position where the support lever 611b substantially makes contact with the back face of the tray 2 at the lowest step in the tray storage section 53.

Figure 51:
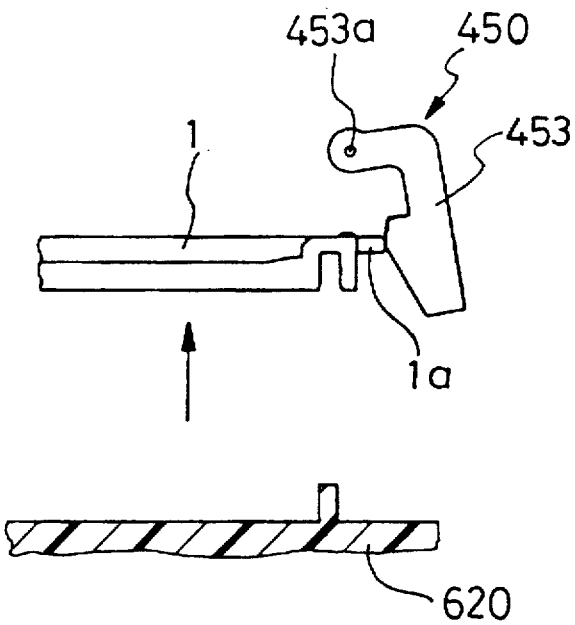
FIG. 51 is a section view showing a state in which a guide portion 1a of the tray 1 pushes the cam portion 453 of the hook portion 450 so that the hook portion is outward opened.
Figure 52:
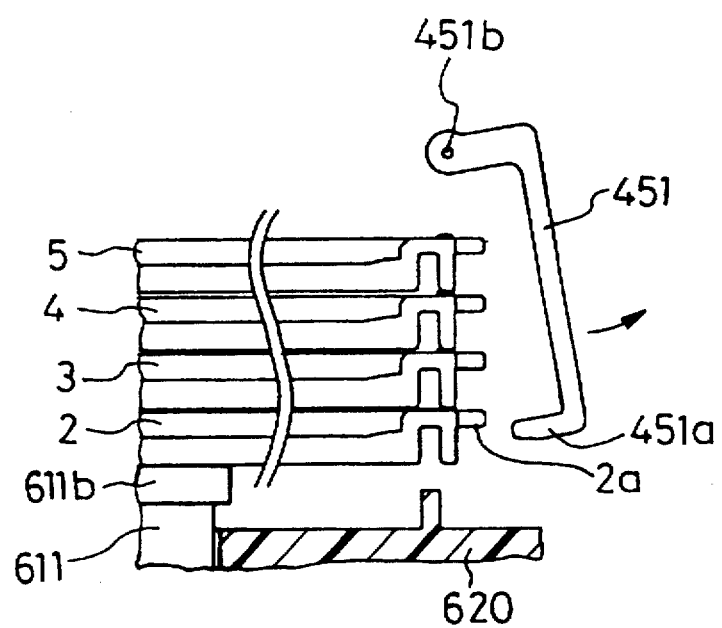
FIG. 52 is a section view showing a state in which the first hook 451 of the hook portion 450 disengages from the tray 2.

In the tray return waiting state shown in FIG. 50, the guide portion 1a of the tray 1 pushes the cam portion 453 of the hook portion 450 so that the hook portion is inclined to the outside. FIG. 51 is a section view showing the state in which the guide portion 1a of the tray 1 pushes the cam portion 453 of the hook portion 450 so that the hook portion is inclined to the outside. Consequently, the hook portion 450 does not hold any longer the trays 2, 3, 4, and 5 stacked in the tray storage section 53, and the trays 2, 3, 4, and 5 are supported by the support lever 611b of the tray support unit 610. FIG. 52 is a section view showing the state in which the claw 451a of the first hook 451 of the hook portion 450 disengages from the guide portion 2a of the tray 2 and the stacked trays 2, 3, 4, and 5 are supported by the upper face of the support lever 611b.

As described above, in the tray transferring operation of the disk loading apparatus of the fourth embodiment, the trays in the tray storage section 53 are prevented from suddenly dropping, and a noise due to the drop of a tray onto the tray ejection frame during the tray circulating operation is prevented from being produced.

Figure 53:
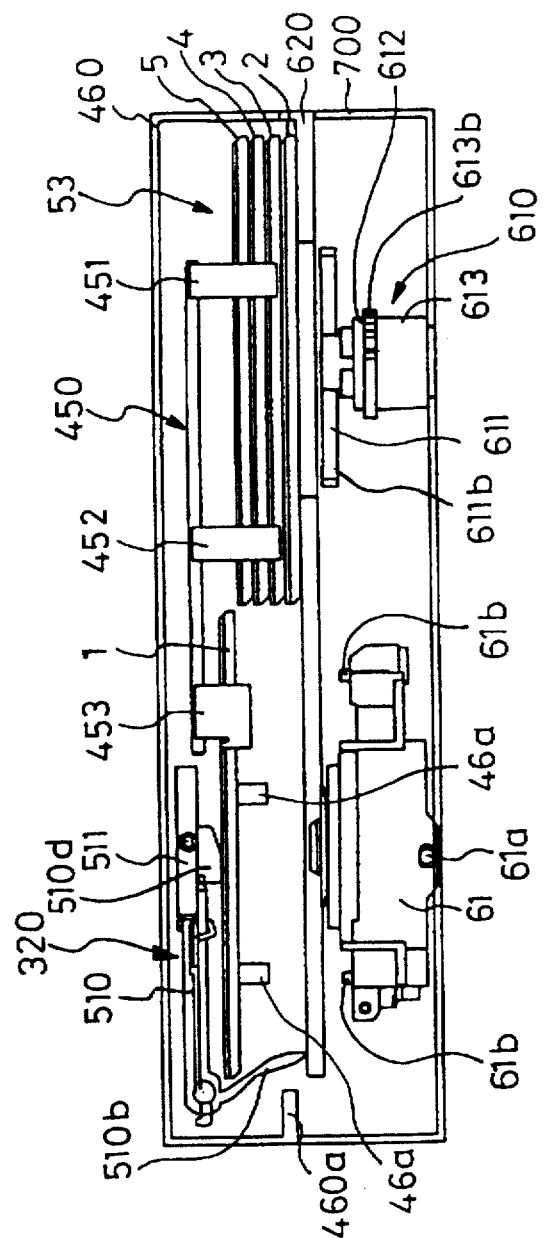
FIG. 53 is a side view showing the internal mechanism in which the reproduction device 6 in the tray return waiting state is lowered and the reproduction device return state is established.

FIG. 53 is a side view showing the internal mechanism in which the reproduction device 6 in the tray return waiting state is lowered and the reproduction device return state is established. At this time, the tray 1 is held at the tray return waiting position by the supporters 46a formed on the cover frame 460. In accordance with the descent of the reproduction device 6, while supporting the tray 2, the support lever 611b of the elevation lever 611 passes through the hole 620a of the tray ejection frame 620 and is gradually lowered. Accordingly, the tray 2 is placed surely and quietly at a predetermined position on the tray ejection frame 620.

Figure 54:
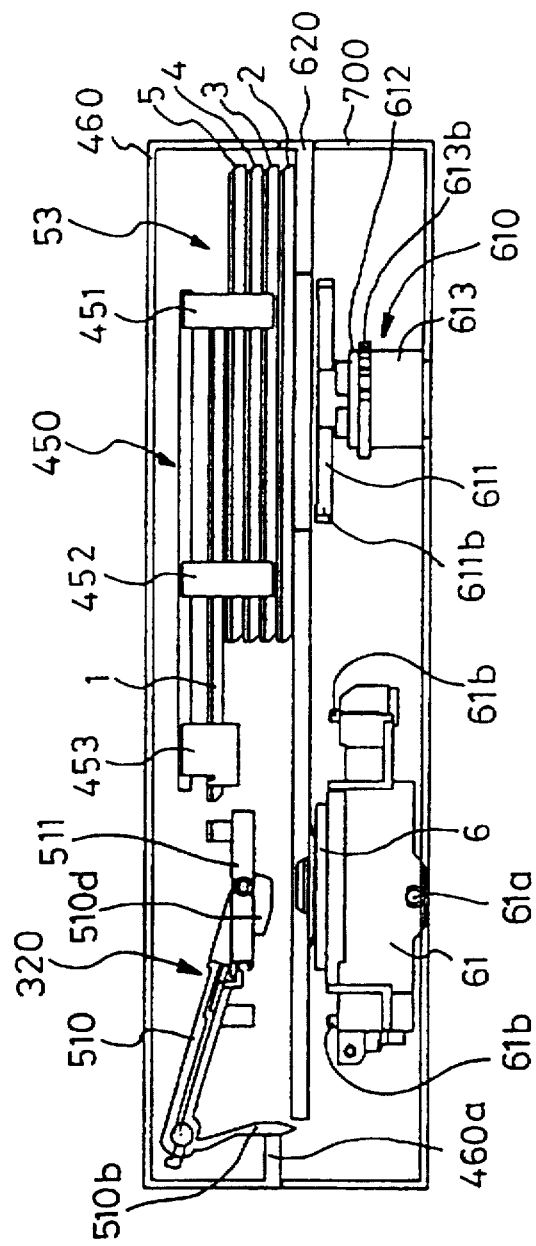
FIG. 54 is a side view of the disk loading apparatus of the fourth embodiment showing a state which is on the way of returning the tray 1 at the tray return waiting position to the upper portion of the tray storage section 53.

FIG. 54 is a side view showing a state which is on the way of returning the tray 1 at the tray return waiting position to the upper portion of the tray storage section 53.

As shown in FIG. 54, the tray 1 which has been supported at the tray return waiting position by the supporters 46a is returned to the tray storage section 53. After the state shown in FIG. 54, the cam portions 453 of the hook portions 450 are released from the pushing due to the guide portion 1a of the tray 1. Therefore, the hook portions 450 disposed at the sides of the cover frame 460 are rotated in opposite directions, thereby attaining the initial state, i.e., the tray storage state (the state shown in FIG. 30 in the second embodiment). As a result, the first and second hooks 451 and 452 of the hook portions 450 engage with the guide portion 3a of the tray 3 and the trays 3, 4, 5, and 1 are surely held in the tray storage section 53.

Figure 55:
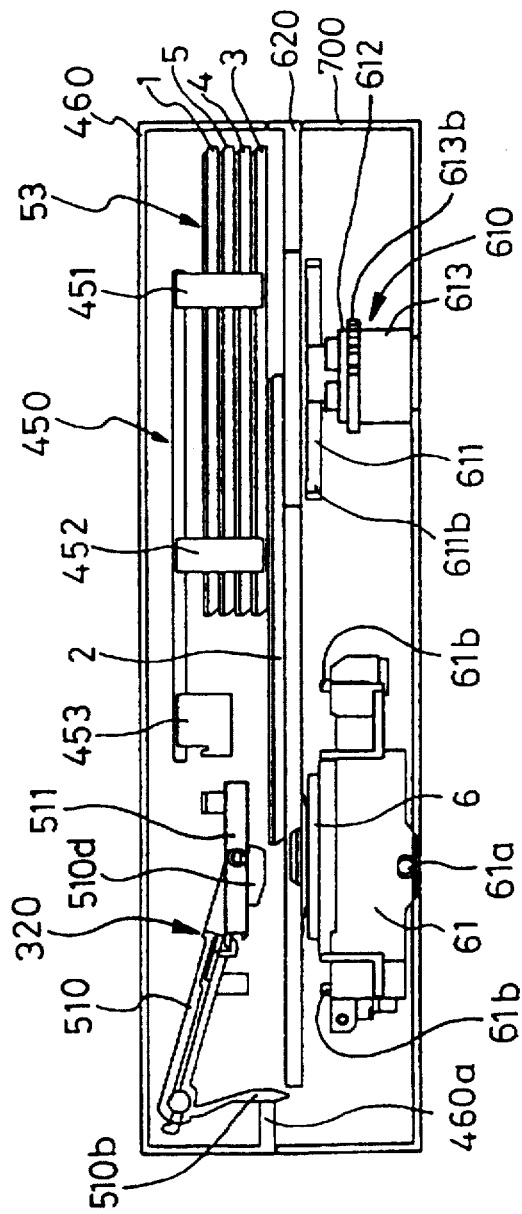
FIG. 55 is a side view of the disk loading apparatus of the fourth embodiment showing a state which is on the way of shifting the tray 2 on the tray ejection frame 620 from the tray storage state to the reproduction waiting state.

FIG. 55 is a side view of the disk loading apparatus of the fourth embodiment showing a state which is on the way of shifting the tray 2 on the tray ejection frame 620 from the tray storage state to the reproduction waiting state. The state shown in FIG. 55 is identical with the shifting state from the tray storage state of FIG. 47 to the reproduction waiting state of FIG. 48. In this way, the tray 2 enters the reproduction state shown in FIG. 49 via the reproduction waiting state, and the above-mentioned tray circulating operation is conducted.

In the disk loading apparatus of the fourth embodiment, the configuration for holding stacked trays uses the hook portions 450 which have been described in the second embodiment. Alternatively, the configuration for holding stacked trays may use the hook portions 470 each having the tapered claw 455a which have been described in the third embodiment.

As described above, according to the disk loading apparatus of the fourth embodiment, the tray circulating operation is quietly conducted so that disks on the trays stacked in the tray storage section 53 are sequentially reproduced or a desired disk is selected and reproduced.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the present invention.

What is claimed is:

1. A disk loading apparatus comprising:

a plurality of trays on which a disk is to be placed;

a frame having storage means for supporting said trays in a stacked manner;

reproducing means for reproducing disks placed on said trays, at a reproduction position;

tray ejecting means for ejecting said trays outside of said frame; and tray driving means for, in said frame, moving a tray at a lowest position among said trays which are supported in a stacked manner by said storage means, to said reproduction position and sequentially returning said tray from said reproduction position onto a tray at a highest position among said stacked trays in said storage means, thereby circulating said stacked trays, wherein said tray driving means ejects a tray at the reproduction position to the outside of said frame passing said tray below a tray at the lowest position among said trays stacked by said storage means, said tray driving means moving by means of a circulating operation wherein a tray at a tray storage position is supported by said storage means to the lowest position of said tray storage position, and thereafter said tray is ejected to outside of said frame.

2. A disk loading apparatus comprising:

a plurality of trays on which a disk is to be placed;

a frame having storage means for supporting said trays in a stacked manner;

reproducing means for reproducing disks placed on said trays, at a reproduction position;

tray electing means for ejecting said trays outside of said frame; and tray driving means for, in said frame, moving a tray at a lowest position among said trays which are supported in a stacked manner by said storage means, to said reproduction position, and sequentially returning said tray from said reproduction position onto a tray at a highest position among said stacked trays in said storage means, thereby circulating said stacked trays, wherein said reproducing means is elevated and lowered by said tray driving means among a reproduction waiting position at a lower level, said reproduction position at a middle level, and a tray return waiting position at a higher level, and said frame being configured so that, when said reproducing means is elevated to said tray return waiting position, a tray having been elevated with said reproducing means is held at said tray return waiting position.

3. A disk loading apparatus in-accordance with claim 2, wherein said tray driving means comprises:

a carrier which transfers said tray at said lowest position among said trays which are supported in a stacked manner by said storage means, from a tray ejection position outside said frame to said reproduction waiting position; and tray elevating means for, after said carrier is moved to said reproduction waiting position, elevating said reproducing means.

4. A disk loading apparatus in accordance with claim 3, wherein said carrier comprises:

a hook portion which, when said tray at said lowest position among said trays which are supported in a stacked manner by said storage means is transferred to said reproduction position, engages with a hook receiving portion formed on said tray; and tray returning means for transferring said tray at said tray return waiting position onto a tray at the highest position among said trays supported by said storage means, said tray returning means being rotatable.

5. A disk loading apparatus in accordance with claim 4, wherein, when said tray at said tray return waiting position is transferred to a tray storage position and moved from said tray storage position to said tray ejection position, said tray returning means abuts against an edge of a tray which is supported in a stacked manner by said storage means and is rotated, and said tray returning means is slidingly moved on a lower face of said tray at the lowest position.

6. A disk loading apparatus in accordance with claims 5, wherein said tray driving means further comprises:

a driving gear which is connected to a driving source via a reduction mechanism;

a driving rack plate on which a rack meshing with said driving gear is formed and which is moved in front and rear directions of said frame;

two speed increasing gear means each of which has large and small gears which are coaxially formed and are respectively disposed in the vicinity of front and rear ends of said driving rack plate; and a rack formed on said carrier meshes with said large gears of said speed increasing gear means, and a rack formed on said frame meshes with said small gears of said speed increasing gear means.

7. A disk loading apparatus in accordance with claim 6, wherein said tray elevating means comprises a slide plate, and, when said carrier reaches said reproduction waiting position, said small gears of said speed increasing gear means unmesh from said rack of said frame and mesh with a rack formed on said slide plate, said slide plate being driven by rotation of said speed increasing gear means to said reproduction waiting position, said reproduction position, and said tray ejection position.

8. A disk loading apparatus in accordance with claim 6, wherein said tray ejecting means comprises a tray ejection frame on which a tray is to be detachably placed, and said tray ejection frame engages with said carrier and is moved between said tray storage position and said tray ejection position.

9. A disk loading apparatus in accordance with claim 8, wherein said disk loading apparatus further comprises:

a cushion rack which is disposed at a position corresponding to a toothless portion formed at an intermediate position of said rack of said driving rack plate, which is slidable with respect to said driving rack plate, and which has a rack having the same pitch as said rack of said driving rack plate; and a frame lock lever which, when said carrier is moved between said tray storage position and said reproduction waiting position, secures said tray ejection frame to said frame, and, when said carrier reaches said tray storage position, causes said driving gear to be shifted from said rack of said driving rack plate to said rack of said cushion rack, thereby releasing said tray ejection frame connected to said frame.

10. A disk loading apparatus in accordance with claim 6, wherein said apparatus further comprises clamping means for securing a disk on a tray to said reproducing means while interlocking with the elevation of said reproducing means when said reproducing means is elevated from the reproduction waiting position to said reproduction position by said tray elevating means.

11. A disk loading apparatus comprising:

a plurality of trays on which a disk is to be placed, the trays being arranged in a stacked manner;

reproducing means for reproducing disks placed on said trays, at a reproduction position;

a frame which houses said reproducing means and said stacked trays;

tray ejecting means for ejecting said trays outside of said frame;

tray driving means for, in said frame, sequentially returning a tray at a lowest position among said stacked trays from said reproduction position onto a tray at a highest position among said stacked trays, thereby circulating said stacked trays; and storage means for, in said frame, engaging with a tray at the lowest position among said stacked trays and supporting said tray at a predetermined position, canceling the engagement with said tray at the lowest position among said stacked trays and placing said stacked trays on said tray ejecting means, while interlocking with the circulating operation of said tray driving means during the movement of said tray from said reproduction position to a tray return waiting position, and engaging with a tray at a second lowest position among said stacked trays and supporting said tray in a stacked manner wherein the reproducing means is elevated and lowered by the tray driving means among a reproduction waiting position at a lower level, the reproduction position at a middle level and the tray return position at a higher level, and said frame is configured so that, when said reproducing means is elevated to said tray return waiting position, a tray having been elevated with said reproducing means is held at said tray return waiting position.

12. A disk loading apparatus in accordance with claim 11, wherein said storage means comprises:

at least one hook which is disposed on sides of a cover frame constituting an upper portion of said frame, and which has a claw which supports said tray at the lowest position among said stacked trays;

a cam portion which, during the tray movement from said reproduction position to said tray return waiting position, is pushed by an end face of said tray, thereby rotating said hook; and a hold lever spring which constantly urges said hook and said cam portion in one direction.

13. A disk loading apparatus in accordance with claim 12, wherein said claw is formed on said hook of said storage means, said hook being disposed on sides of said cover frame, said hook having an upper face with a tapered shape which is downward inclined in an opposing direction.

14. A disk loading apparatus comprising:

a plurality of trays on which a disk is to be placed, the trays being arranged in a stacked manner;

reproducing means for reproducing disks placed on said trays, at a reproduction position;

a frame which houses said reproducing means and said stacked trays;

trays ejecting means having a tray ejection frame which ejects said trays outside of said frame;

tray driving means for, in said frame, sequentially returning a tray at a lowest position among said stacked trays from the reproduction position on to a tray at a highest position among said stacked trays, thereby circulating said stacked trays;

storage means for, in said frame, engaging with a tray at the lowest position among said stacked trays and supporting said tray at a predetermined position, canceling the engagement with said tray at the lowest position among said stacked trays and placing said stacked trays on said tray ejecting means, while interlocking with the circulating operation of said tray driving means during the movement of said tray from said reproduction position to a tray return waiting position, and engaging with a tray at a second lowest position among said stacked trays and supporting said tray in a stacked manner; and tray supporting means which is vertically moved below the stacked trays while interlocking with said tray driving means and which holds at a highest level said tray at the lowest position, said tray being disengaged from said storage means, and which lowers said tray onto said tray ejection frame.

15. A disk loading apparatus in accordance with claim 14, wherein said tray driving means vertically moves the reproducing means between a reproduction waiting position and the tray return waiting position via the reproduction position, and said tray supporting means comprises: an elevation gear which is rotated by said tray driving means; and an elevation lever which is vertically moved by rotation of said elevation gear, so that when said reproducing means in vertically moved by said tray driving means between the reproduction waiting position and said tray return waiting position via said reproduction position, said elevation lever is vertically moved while passing through said tray ejection frame.

\* \* \* \* \*